United States Patent
Chiba et al.

(10) Patent No.: US 6,629,906 B1
(45) Date of Patent: Oct. 7, 2003

(54) TRACTION DRIVE ROTARY ASSEMBLY AND PROCESS FOR PRODUCING ROLLING ELEMENT THEREOF

(75) Inventors: Nobutaka Chiba, Yokohama (JP); Toshikazu Nanbu, Kanagawa (JP); Makoto Kano, Yokohama (JP); Jun Watanabe, Yokohama (JP); Kenshi Ushijima, Kanagawa (JP); Masahiro Omata, Kanagawa (JP); Minoru Oota, Kanagawa (JP); Hiroo Ueda, Kanagawa (JP); Manabu Wakuta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 133 days.

(21) Appl. No.: 09/657,361

(22) Filed: Sep. 7, 2000

(30) Foreign Application Priority Data

| Sep. 7, 1999 | (JP) | ............................................. 11-252574 |
| May 19, 2000 | (JP) | ....................................... 2000-147364 |
| Aug. 28, 2000 | (JP) | ....................................... 2000-258160 |

(51) Int. Cl.$^7$ ............................................. F16H 55/32

(52) U.S. Cl. ............................. 476/72; 476/73; 476/40

(58) Field of Search ............................. 476/72, 40, 41, 476/42, 43, 44, 45, 46, 73; 82/104, 905, 96, 143, 144, 147, 173

(56) References Cited

U.S. PATENT DOCUMENTS

| 2,020,677 A | 11/1935 | Erban .......................... 74/200 |
| 2,847,861 A | 8/1958 | Weisel ........................ 74/190.5 |
| 4,684,754 A | * 8/1987 | Tsubouchi et al. ............. 252/73 |
| 5,662,546 A | * 9/1997 | Takata et al. .................. 476/40 |
| 5,735,769 A | 4/1998 | Takemura et al. ............. 476/40 |
| 5,962,381 A | * 10/1999 | Bovington .................. 506/463 |
| 6,152,605 A | * 11/2000 | Takemura et al. .......... 384/462 |
| 6,174,257 B1 | 1/2001 | Imanishi et al. ............... 476/40 |
| 6,328,669 B1 | * 12/2001 | Imanishi et al. ............... 476/40 |

FOREIGN PATENT DOCUMENTS

| DE | 198 29 631 | 2/1998 |
| JP | 62-251559 | 11/1987 |
| JP | 8-296709 | * 11/1996 |

OTHER PUBLICATIONS

JIS Handbook 1988, Japanese Standards Association, "Ferrous Materials and Metallurgy", pp. 1691–1695; 2014–2018.

DIN EN ISO 13565–1 (8 sheets) and DIN EN ISO 13565–2 (9 sheets), (Apr. 1998).

JIS B 0601, "Surface roughness—Definitions and designation", pp. 1–25, (1994).

Patent Abstracts of Japan, Publication No. 9–210162 (Aug. 12, 1997), Satoshi Utsunomiya, "Epicyclic Roller Power Transmission", Application No. 8–015591 (Jan. 31, 1996), © 1997, JPO, 1 page.

Patent Abstracts of Japan, Publication No. 9–264394 (Oct. 7, 1997), Kazuhiko Tanaka, "Roller for Toroidal Continuously Variable Transmission and its Manufacture", Application No. 8–070603 (Mar. 26, 1996), ©1997, JPO, 1 page.

Patent Abstracts of Japan, Publication No. 10–231908 (Sep. 2, 1998), Yoichi Watanabe, "Roller for Toroidal Type Continuously Variable Transmission and its Manufacture", Application No. 9–035253 (Feb. 19, 1997), ©1998, JPO, 1 page.

(List continued on next page.)

*Primary Examiner*—Henry W. H. Tsai
(74) *Attorney, Agent, or Firm*—Foley & Lardner

(57) ABSTRACT

A rotary assembly for traction drives, including a plurality of rolling elements having a rotation axis and traction contact surfaces around the rotation axis and associating with each other to transmit a motive power between the rolling elements via a traction oil film formed between the traction contact surfaces, in which at least one of the traction contact surfaces has a microstructure with irregularities which sizes are larger than a thickness of the traction oil film. The process for the traction contact surface is also disclosed.

69 Claims, 24 Drawing Sheets

OTHER PUBLICATIONS

Akira Ishibashi et al., "Effects of Difference in Hardness and Running–in of Rollers on Rolling Contact Fatigue", (1975), pp. 134–141, Jpn. Soc. Lubr. Eng. XP–000986507.

Yoshitsugu Kimura et al., "Wear During Lubricated Rolling Contact", *Asle Transactions,* vol. 24, No. 1, pp. 15–22 (Jan. 1981).

Fan Yujin et al., "A Study on the limit criterion of full and partial lubrication", *Wear,* vol. 143, pp. 221–229, © Elsevier Sequoia, printed in The Netherlands, (1991).

JIS G 4052, Structural Steels with Specified Hardenability Bands, pp. 542, 543 and 560. (1979).

* cited by examiner

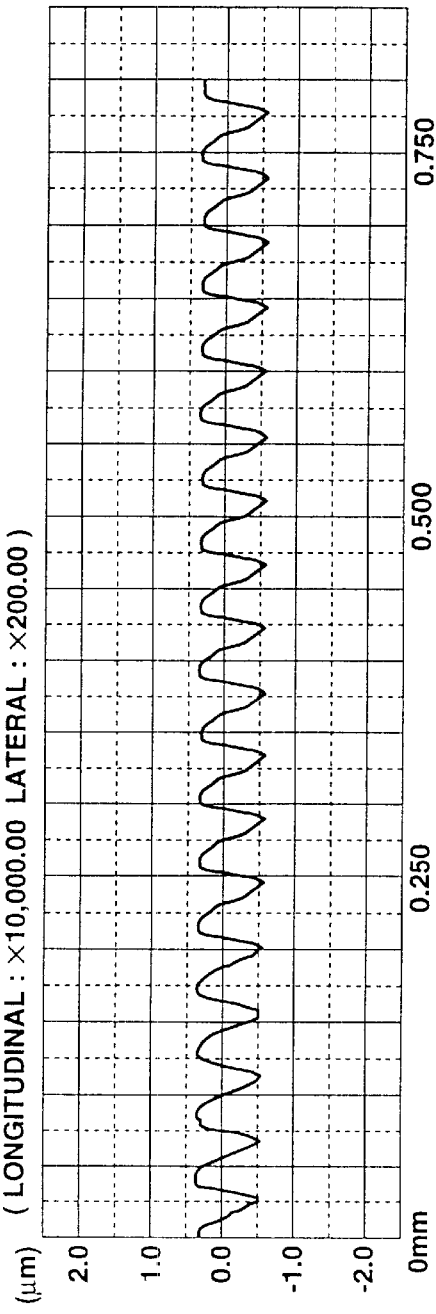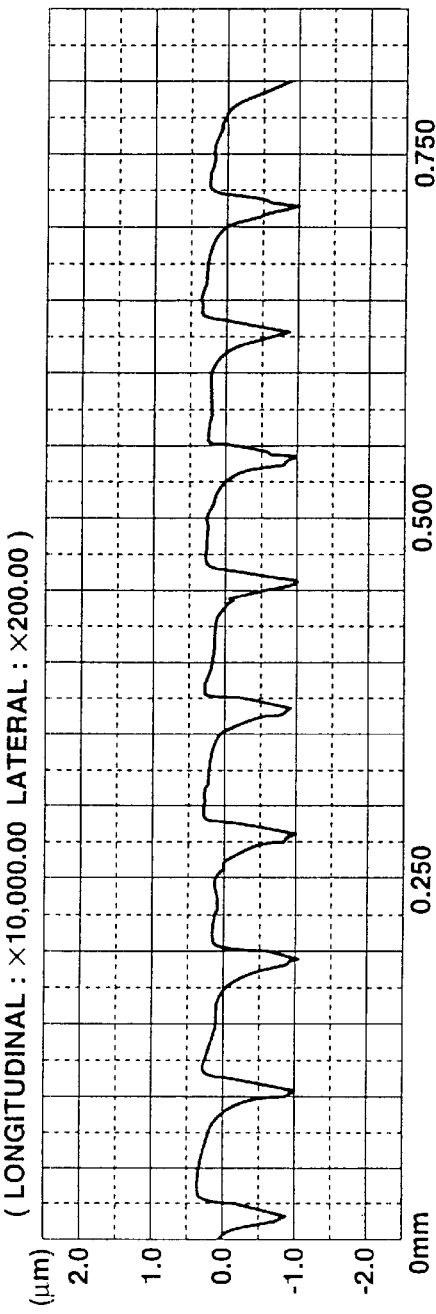

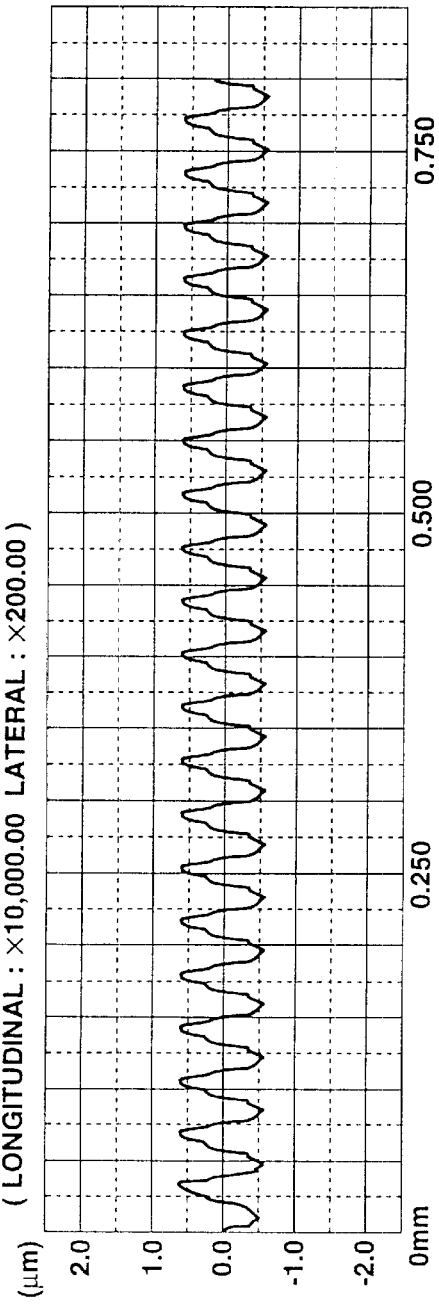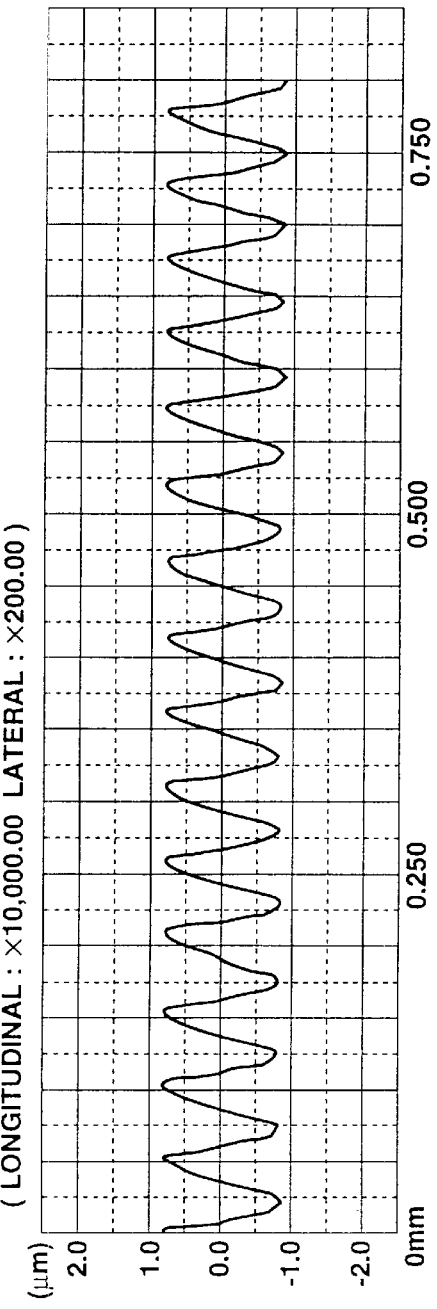

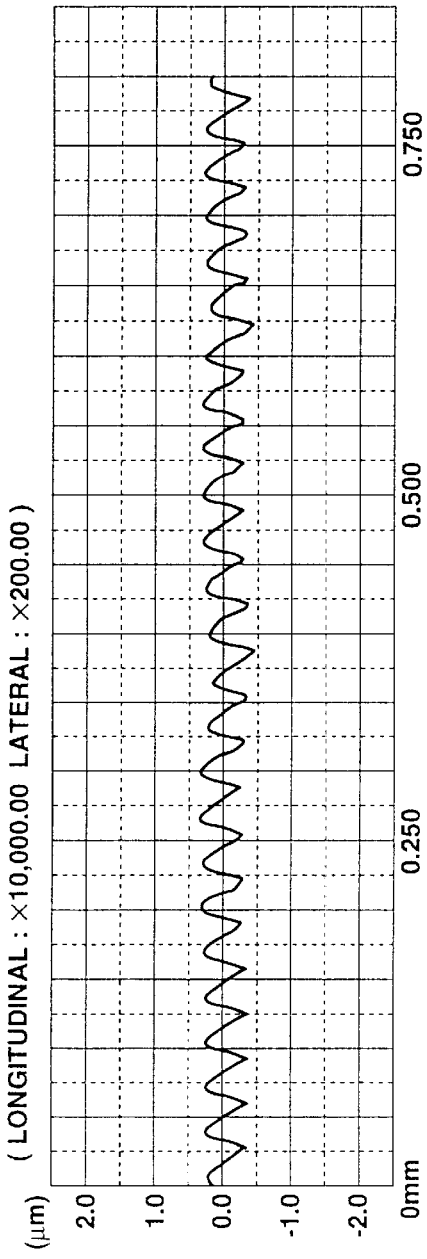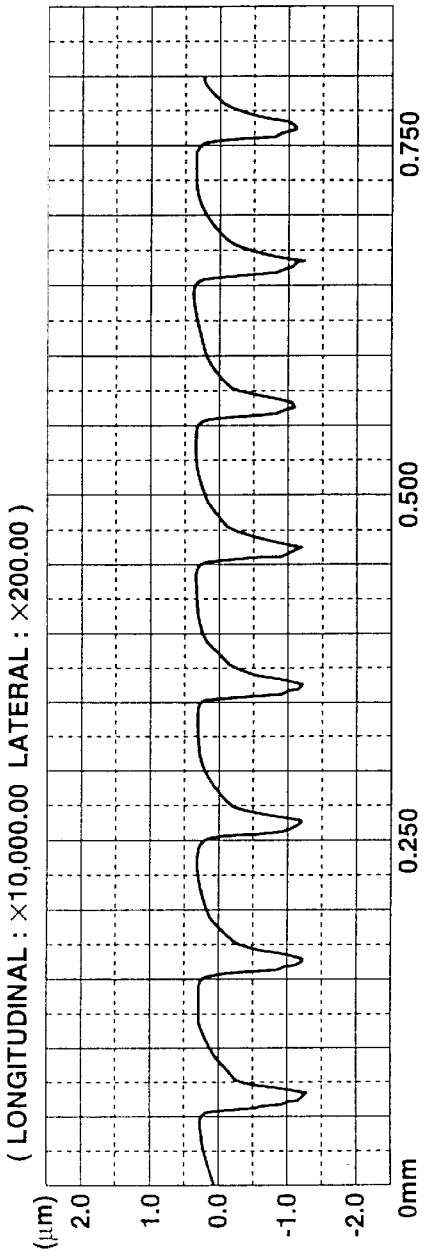

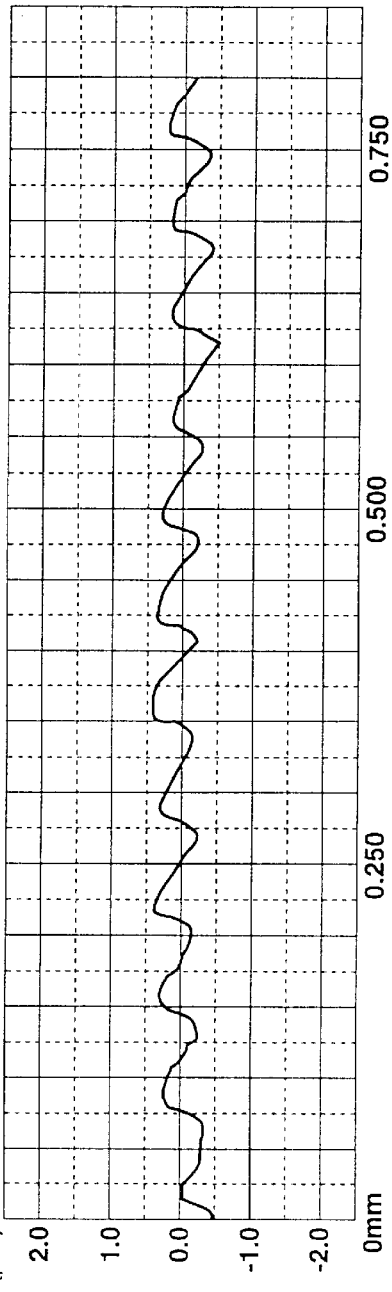
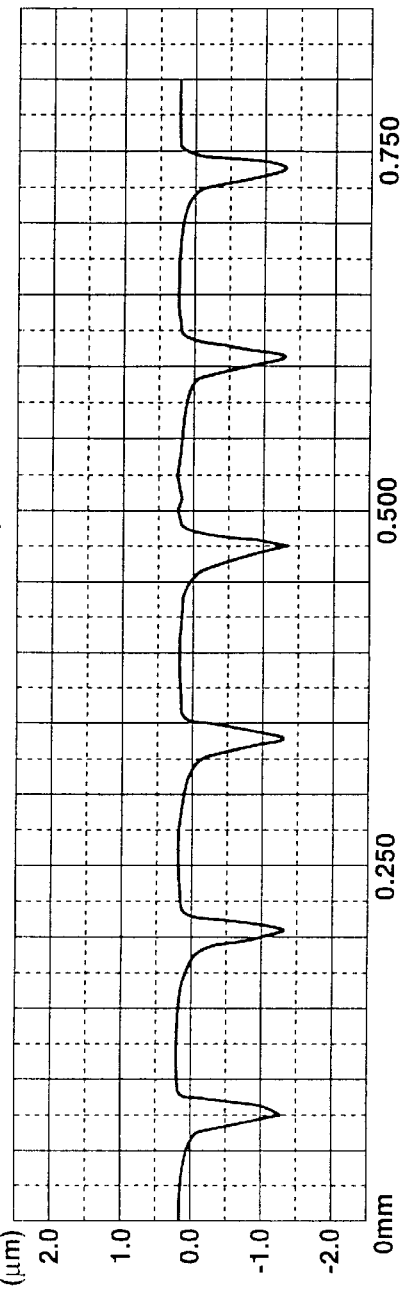

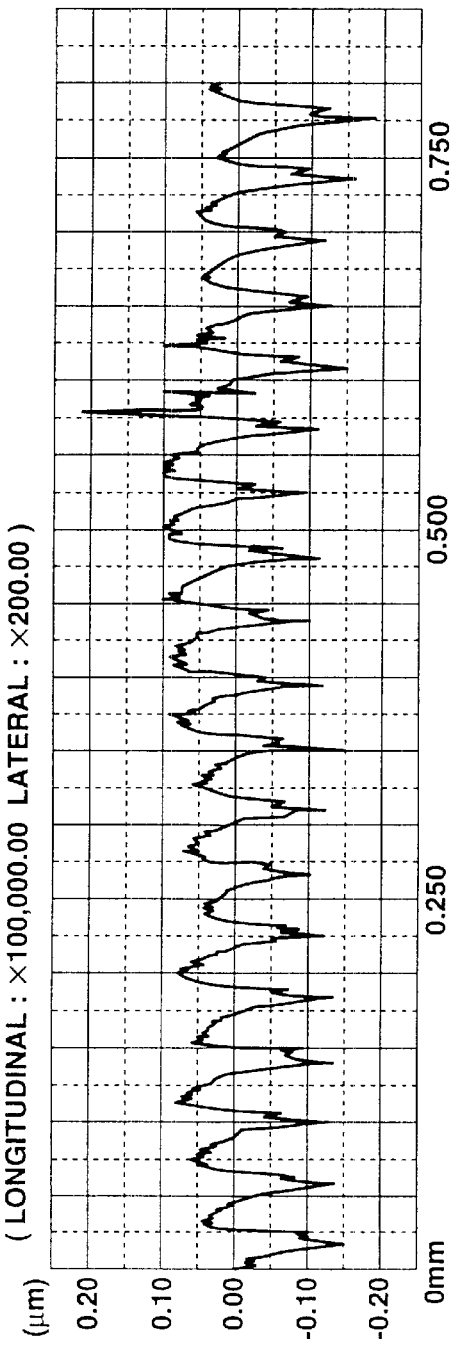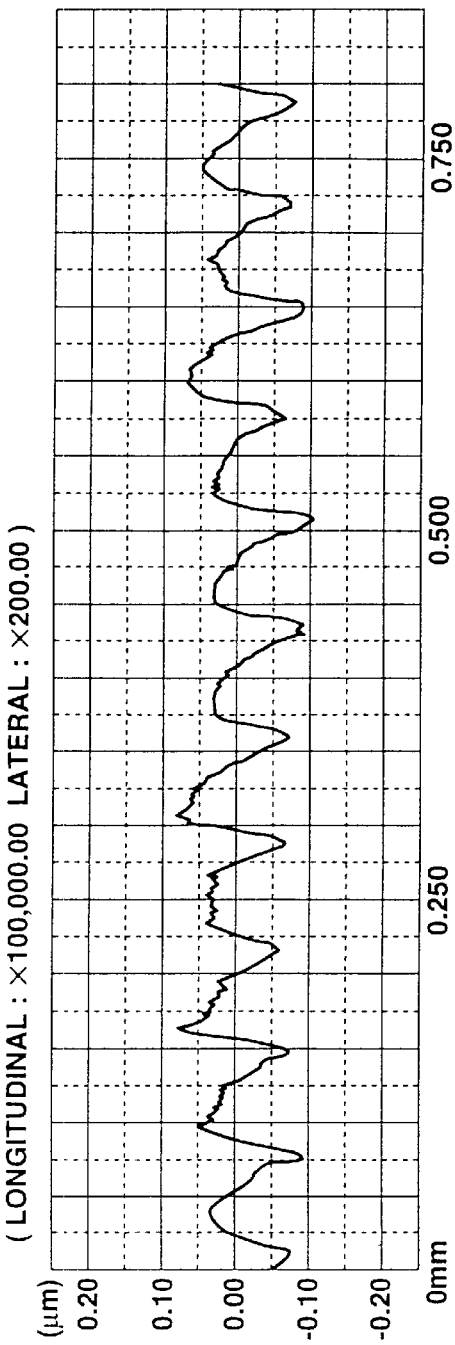

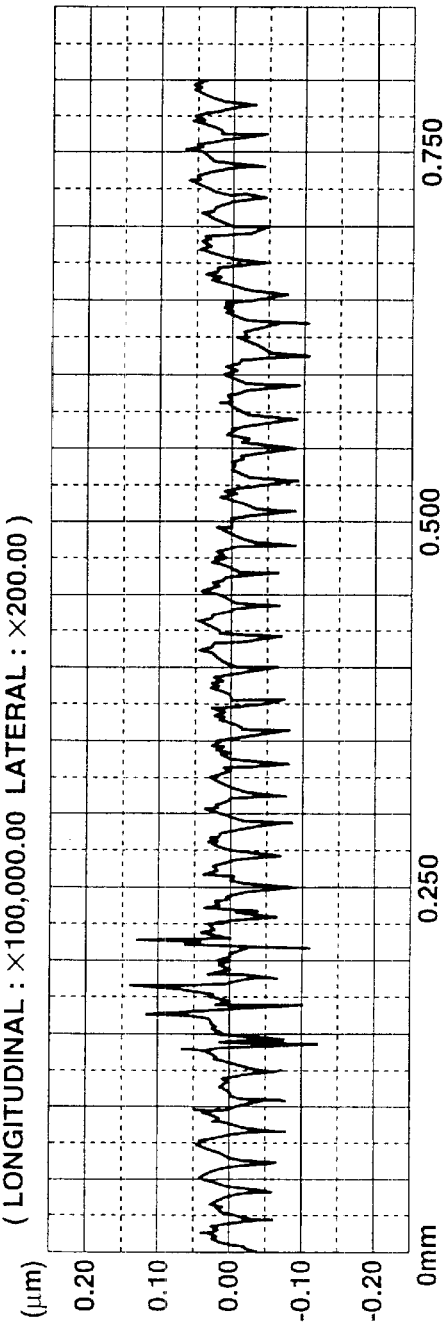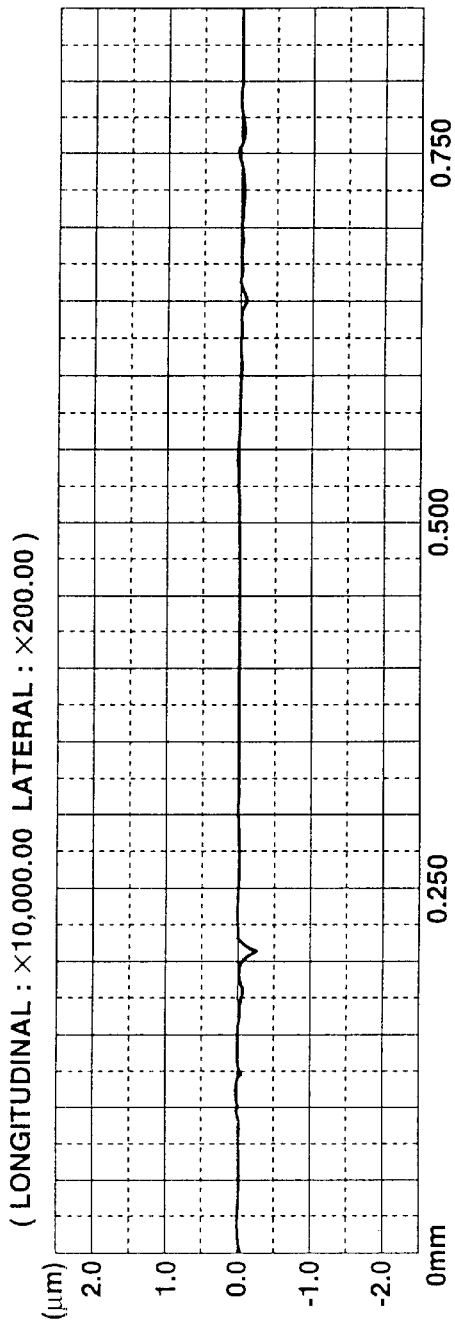

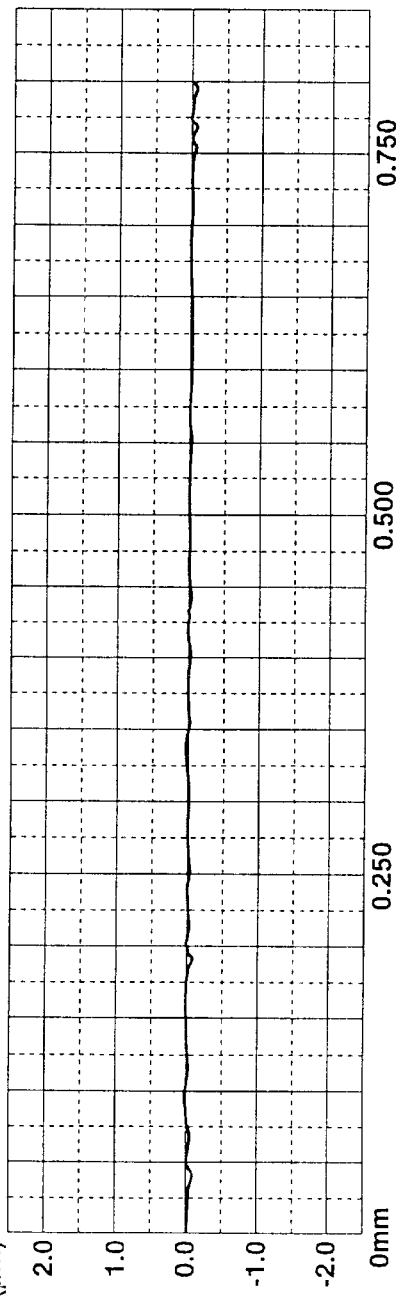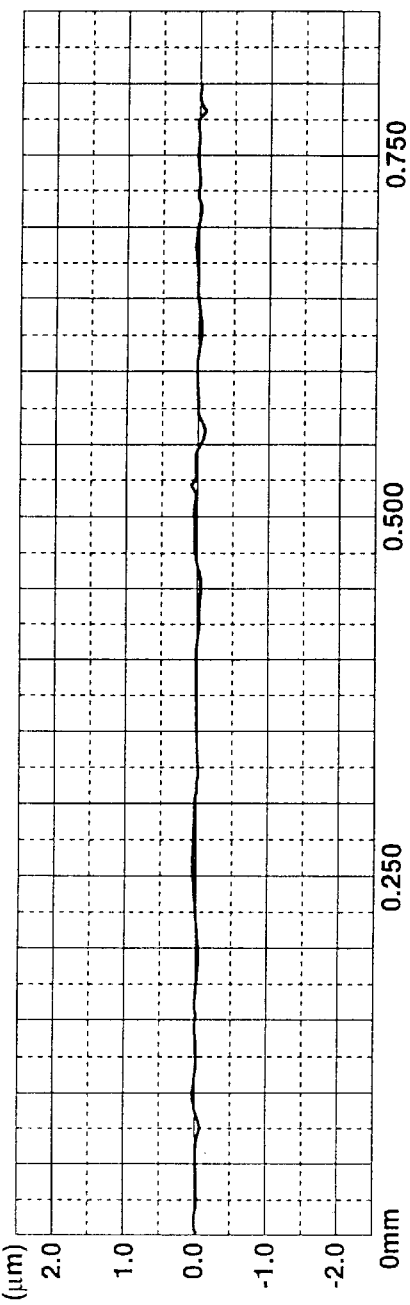

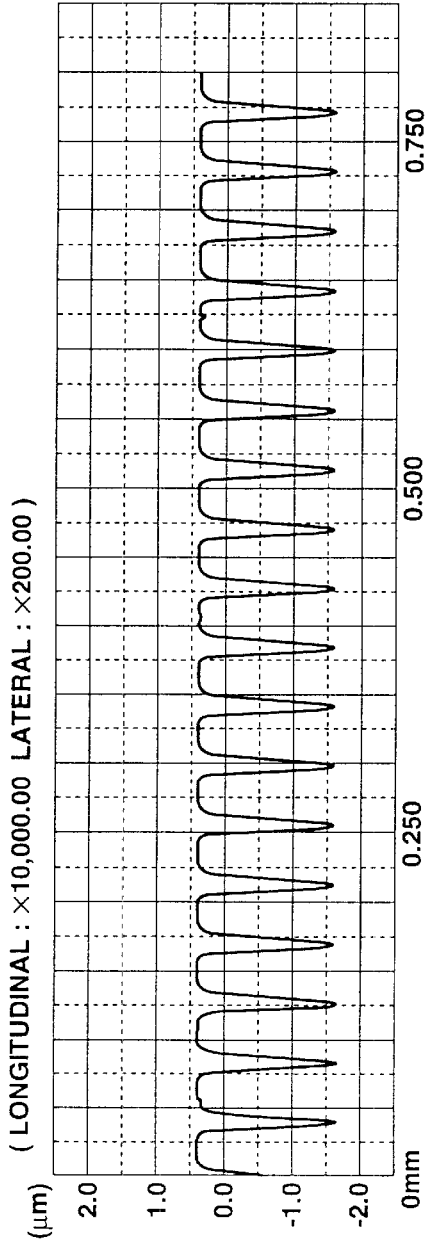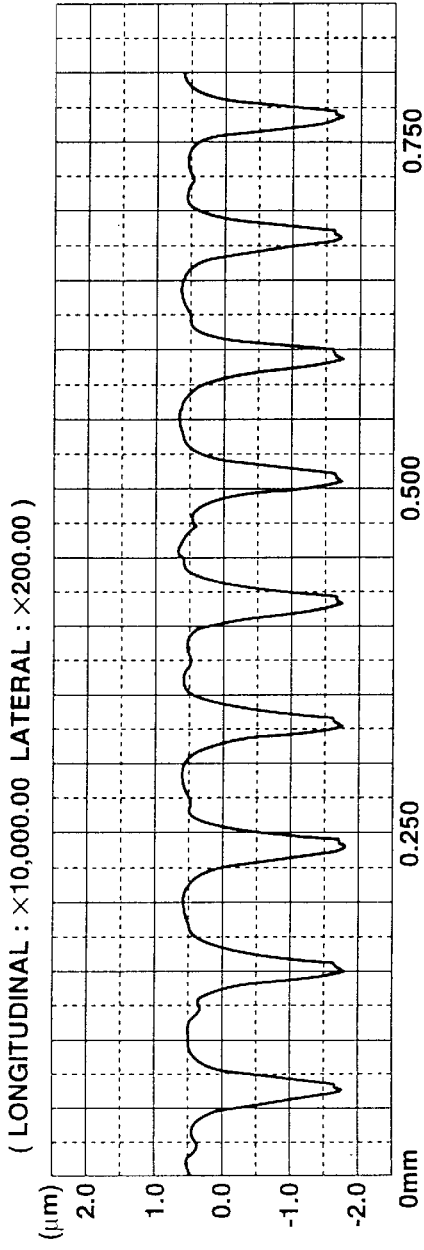

TRACTION DRIVE ROTARY ASSEMBLY AND PROCESS FOR PRODUCING ROLLING ELEMENT THEREOF

BACKGROUND OF THE INVENTION

1. Field of the Invention

The present invention relates to a continuously variable transmission (CVT) for traction drives which is used to transmit rotation from an input side to an output side while continuously varying the speed by traction drive in a power transmission device of an automobile, industrial machinery and so forth, and more particularly, to a rotary assembly for traction drives which includes a rolling element having a traction contact surface which exhibits excellent traction characteristics as surface properties.

Various researches have been conducted on CVTs because of their excellent motive power transmission properties and absence of high-speed shock. In particular, researches have been conducted on systems (traction drive systems: rolling systems) that transmit motive power between traction contact surfaces by means of traction oil for the purpose of transmitting large motive power.

Traction drive systems which transmit motive power between traction contact surfaces by means of traction oil have a mechanism applicable to high-power engines. As shown, for example, in FIG. 1, the basic structure of rotary assembly 1 for traction drive type CVTs. Rotary assembly 1 includes two metal rolling elements, namely, two disks (input disk 3 circumferentially fixed on input shaft 2 and output disk 5 circumferentially fixed on output shaft 4), and power roller 6 interposed between the rolling elements and contacted therewith through a traction oil. Power roller 6 has a tiltable roller shaft such that power roller 6 is inclined relative to input and output disks 3 and 5 when the roller shaft tilts. Owing to the inclination of power roller 6, the contact between power roller 6 and input and output disks 3 and 5 shifts. This changes the ratio of the torque radius of input disk 3 to that of output disk 5 to thereby continuously change the transmission ratio. A half toroidal type CVT is one of traction drive CVTs.

FIG. 42 illustrates a toroidal type CVT which includes input shaft 101 and output shaft 102 coaxial with input shaft 101 and rotatable relative thereto. An engine torque is supplied via fluid coupling 103 to input shaft 101. Forward and reverse input gears 104 and 105 are disposed on input shaft 101 so as to make a unitary rotation therewith. Two input disks 106 and 107 are drivingly connected with each other through hollow shaft 112 extending parallel to input shaft 101. Two output disks 108 and 109 are arranged in an opposed relation to input disks 106 and 107 and connected with each other via shaft 111 extending inside hollow shaft 112. Drive plate 110 is disposed between input disks 106 and 107 and drivingly connected therewith by loading cams 114 and 115. Gear 113 integrally formed with drive plate 110 is engageable with forward input gear 104. Two power rollers 116 are disposed between opposed input and output disks 106 and 8 and in friction contact with traction contact surfaces 106a and 108a thereof. Two power rollers 117 are disposed between opposed input and output disks 107 and 109 and in friction contact with traction contact surfaces 107a and 109a thereof. Power rollers 116 and 117 are rotatable about axes 116a and 117a thereof to transmit the torque from input disks 106 and 107 to output disks 108 and 109, respectively. Power rollers 116 and 117 are also adapted to offset or swing in directions of axes 116b and 117b extending perpendicular to axes 116a and 117a, respectively. Forward/reverse change mechanism 123 is disposed on final drive shaft 119 disposed coaxially with input shaft 101. Gear 120 rotatably supported on final drive shaft 119 is engageable with reverse input gear 105. Forward/reverse change mechanism 123 includes forward clutch 121 connecting final drive shaft 119 with output disk 109 and reverse clutch 122 connecting final drive shaft 119 with gear 120. Final drive shaft 119 is also connected with output shaft 102 via chain transmission mechanism 124. Such a toroidal type CVT is disclosed in Japanese Patent Application First Publication No. 62-251559.

SUMMARY OF THE INVENTION

The rolling elements, namely, input disk 3, output disk 5, power roller 6, of rotary assembly 1 shown in FIG. 1, are required to have excellent traction characteristics and high rolling fatigue life characteristics under high temperature and high bearing pressure. In addition, in consideration of the future burden on the environment, it is necessary that vehicle weight be reduced to achieve further improvement of fuel economy. In order to accomplish this, the unit size must be reduced, and in the case of units of the same size, it is necessary to increase the motive power that can be transmitted.

In consideration of the problems of the prior art described above, the object of the present invention is to provide a traction drive rotary assembly capable of transmitting large motive power and having excellent traction characteristics.

According to one aspect of the present invention, there is provided a rotary assembly for traction drives, comprising:
a plurality of rolling elements having a rotation axis and traction contact surfaces around the rotation axis and associating with each other to transmit a motive power between the rolling elements via a traction oil film formed between the traction contact surfaces;
at least one of said traction contact surfaces having a microstructure with irregularities which sizes are larger than a thickness of the traction oil film.

According to a further aspect of the present invention, there is provided a rotary assembly for traction drives comprising a plurality of rolling elements having a rotation axis and traction contact surfaces around the rotation axis and associating with each other to transmit a motive power between the rolling elements via a traction oil film formed between the traction contact surfaces, at least one of said traction contact surfaces having a microstructure with irregularities which sizes are larger than a thickness of the traction oil film, wherein the traction contact surface is formed by a process, the process comprising:
subjecting a surface of the rolling element to shot peening to form recesses and projections therein; and
subsequent to the shot peening, machining the projections by either one of lapping, mirror polishing, super finishing, cutting and grinding to form the top-flat lands and thus produce the traction contact surface.

According to a still further aspect of the present invention, there is provided a rotary assembly for traction drives comprising a plurality of rolling elements having a rotation axis and traction contact surfaces around the rotation axis and associating with each other to transmit a motive power between the rolling elements via a traction oil film formed between the traction contact surfaces, at least one of said traction contact surfaces having a microstructure with irregularities which sizes are larger than a thickness of the traction oil film, the microstructure being represented by an unfiltered primary profile curve including alternately arranged recesses and top-flat lands, wherein the traction contact surface is produced by a process, the process comprising:

forming recesses each having a depth of 10 μm or less at equal intervals in a surface of the rolling element to form alternate arrangement of the recesses and projections between the recesses; and subsequent to the forming, machining the projections such that a height difference between a top of each top-flat land and a bottom of each recess is within a range of 0.5-2.5 μm, to produce the traction contact surface.

According to a still further aspect of the present invention, there is provided a rotary assembly for traction drives comprising a plurality of rolling elements having a rotation axis and traction contact surfaces around the rotation axis and associating with each other to transmit a motive power between the rolling elements via a traction oil film formed between the traction contact surfaces, at least one of said traction contact surfaces having a microstructure with irregularities which sizes are larger than a thickness of the traction oil film, the microstructure being represented by an unfiltered primary profile curve including alternately arranged recesses and top-flat lands, wherein the traction contact surface is produced by a process, the process comprising:

making a surface roughness of a surface of the rolling element a ten-point mean roughness (Rz) of 100 nm or less; and subsequent to the making, forming recesses each having a depth of 0.5-2.5 μm at equal intervals in the surface of the rolling element to form alternate arrangement of the recesses and top-flat lands between the recesses and thus produce the traction contact surface.

BRIEF DESCRIPTION OF THE DRAWINGS

FIG. 3 is a graph showing an unfiltered primary profile curve of the traction contact surface of one of the rolling elements that is used in Example 25;

FIG. 4 is a graph showing an unfiltered primary profile curve of the traction contact surface of one of the rolling elements that is used in Example 26;

FIG. 7 is a graph showing an unfiltered primary profile curve of the traction contact surface of one of the rolling elements that is used in Example 29;

FIG. 8 is a graph showing an unfiltered primary profile curve of the traction contact surface of one of the rolling elements that is used in Example 30;

FIG. 9 is a graph showing an unfiltered primary profile curve of the traction contact surface of one of the rolling elements that is used in Example 31;

FIG. 10 is a graph showing an unfiltered primary profile curve of the traction contact surface of one of the rolling elements that is used in Example 32;

FIG. 11 is a graph showing an unfiltered primary profile curve of the traction contact surface of one of the rolling elements that is used in Example 33;

FIG. 12 is a graph showing an unfiltered primary profile curve of the traction contact surface of one of the rolling elements that is used in Example 34;

FIG. 15 is a graph showing an unfiltered primary profile curve of the traction contact surface of one of the rolling elements that is used in Comparative Example 9;

FIG. 16 is a graph showing an unfiltered primary profile curve of the traction contact surface of one of the rolling elements that is used in Comparative Example 10;

FIG. 17 is a graph showing an unfiltered primary profile curve of the traction contact surface of one of the rolling elements that is used in Comparative Example 11;

FIG. 18 is a graph showing an unfiltered primary profile curve of the traction contact surface of the other of the rolling elements that is used in Examples 25–35 and Comparative Examples 8–11;

FIG. 19 is a graph showing an unfiltered primary profile curve of the traction contact surface of one of the rolling elements that is used in Comparative Example 12;

FIG. 20 is a graph showing an unfiltered primary profile curve of the traction contact surface of the other of the rolling elements that is used in Comparative Example 12;

FIG. 33 is a graph showing an unfiltered primary profile curve of the traction contact surface of one of the rolling elements in Example 36;

FIG. 34 is a graph showing an unfiltered primary profile curve of the traction contact surface of one of the rolling elements in Example 37;

DETAILED DESCRIPTION OF THE INVENTION

Figure 1:
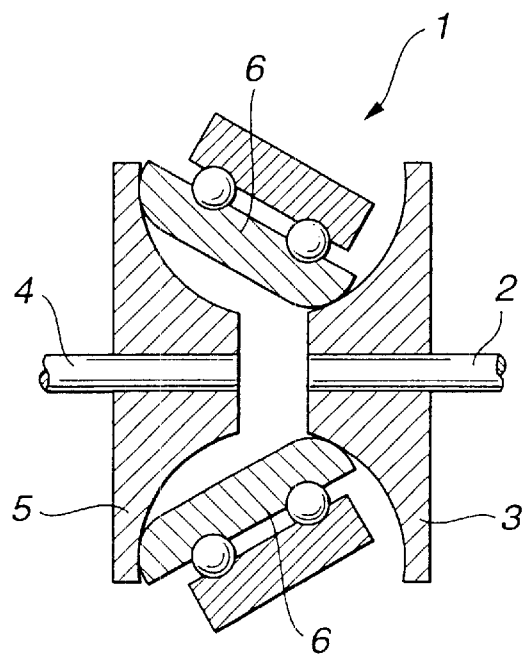
FIG. 1 is an explanatory cross-sectional view showing the basic construction of a rotary assembly for a traction drive continuously variable transmission (CVT)

The traction drives rotary assembly of the present invention includes rolling elements having a rotation axis and traction contact surfaces around the rotation axis which associate with each other to transmit a motive power between the rolling elements via a traction oil film formed between the traction contact surfaces, wherein at least one of the traction contact surfaces has a microstructure with irregularities which sizes are larger than a thickness of the traction oil film. The sizes of the irregularities can be effectively associated with the thickness of a traction oil film in EHL (Elasto-Hydrodynamic Lubrication) that is formed upon rotation of the drive-side and driven-side rolling elements. This contemplates improving coefficient of traction between the drive-side and driven-side rolling elements. There are two mechanisms for improving the traction coefficient, as follows:

(1) The oil film is locally thinned at the projection of the traction contact surface so that shearing rate $\gamma$ increases. This shearing rate $\gamma$ is expressed by the following formula:

$$\gamma = (U1 - U2)/hc$$

wherein U1 indicates rotation speed (m/s) of the drive-side rolling element, U2 indicates rotation speed (m/s) of the driven-side rolling element, and hc indicates central oil film thickness ($\mu$m) of in EHL. Since the shearing rate $\gamma$ is in proportion to an inverse number of the oil film thickness, the formation of recesses and projections on the traction contact surface causes an average shearing rate to increase. As the shearing rate increases, viscous friction of the traction oil increases so that coefficient of traction is improved.

(2) The formation of recesses and projections on the traction contact surface causes ununiformity of pressure in the EHL oil film such that the pressure at the projections becomes higher. The viscosity $\eta$ of the oil is expressed by the formula:

$$\eta = \eta o \cdot \exp(\alpha \cdot P)$$

wherein $\eta o$ indicates oil viscosity under atmospheric pressure, $\alpha$ indicates exponent of pressure viscosity, and P indicates pressure at the contact portion. Since the viscosity $\zeta$ is in proportion to exponential function of the pressure P, the formation of recesses and projections on the traction contact surface causes increase in the average oil viscosity so that coefficient of traction is improved.

In the traction drive rotary assembly of the present invention, the microstructure of the traction contact surface is so configured to have an oil retention volume Vo of $7 \times 10^{-6}$ to $3 \times 10^{-4}$ mm$^3$/mm$^2$ and an oil retention depth ratio K within the range of 0.9–2.0. The oil retention volume Vo and the oil retention depth ratio K are expressed by the following formulas:

$$Vo = [(100 - Mr2) \times Rvk(\mu m)]/200000 (mm^3/mm^2) \quad K = Rvk/Rk$$

wherein Mr2 indicates material portion, Rvk indicates reduced valley depth, and Rk indicates core roughness depth, as defined by DIN EN ISO 13565-2. With this arrangement, large traction force can be generated while holding metal contact to a low level and large motive power can be transmitted.

In the traction drive rotary assembly of the present invention, the irregularities of the microstructure of the traction contact surface are in the form of alternately arranged dimples and top-flat lands and the dimples include dimples having a diameter of 5–30 $\mu$m and a depth of 0.1–1.0 $\mu$m that extends substantially perpendicular to the diameter, and occupying 5–40% of a reference area of the traction contact surface. With the arrangement, large traction force can be generated such that large motive power can be transmitted. If the surface area ratio of the dimples having the diameter of 5–30 $\mu$m and the depth of 0.1–1.0 $\mu$m is less than 5%, traction characteristics do not greatly improve, while if the surface area ratio exceeds 40%, it is likely that the metal contact will occur which will cause undesirable effect on durability.

In the traction drive rotary assembly of the present invention, the microstructure of the traction contact surface can exhibit more stable excellent traction characteristics by forming approximately 10–30 dimples per 100 $\mu$m$^2$ which have a diameter of 5–30 $\mu$m and a depth of 0.1–1.0 $\mu$m extending substantially perpendicular to the diameter. If the number of the dimples is less than 10 per 100 $\mu m^2$, traction characteristics do not greatly improve, while if the number of the dimples is greater than 30 per 100 $\mu m^2$, it is likely that the metal contact will occur which will cause undesirable effect on durability.

In the traction drive rotary assembly of the present invention, excellent traction characteristics can be obtained over a long period of time due to more stable excellent traction characteristics and satisfactory wear resistance by making the surface roughness of the traction contact surface such that arithmetical mean roughness (Ra) is 0.07–0.15 $\mu m$ or maximum height (Ry) is 0.4–1.0 $\mu m$. If the arithmetical mean roughness is less than 0.07 $\mu m$ or the maximum height is less than 0.4 $\mu m$, traction characteristics are not greatly improved. In addition, if the arithmetical mean roughness is greater than 0.15 $\mu m$ or the maximum height is greater than 1.0 $\mu m$, it is likely that the metal contact will occur which will cause undesirable effect on durability.

In the traction drive rotary assembly of the present invention, excellent traction characteristics can be obtained over e long period of time due to satisfactory wear resistance by making the surface hardness of the traction contact surface a Vickers hardness of Hv850 or more.

In the traction drive rotary assembly of the present invention, the rolling element, which has satisfactory wear resistance and excellent traction characteristics, can be easily produced by forming the traction contact surface having the microstructure with alternately arranged dimples and top-flat lands which is produced by subjecting a surface of the rolling element to shot-peening to form recesses and projections therein and then machining the projections by either one of lapping, mirror polishing, super finishing, cutting or grinding to form the lop-flat lands and thus produce the traction contact surface.

In the traction drive rotary assembly of the present invention, the irregularities of the microstructure of the traction contact surface are in the form of alternately arranged circumferentially extending grooves and top-flat lands, in which the grooves have a width of 2–10 $\mu m$ extending along the rotation axis of the rolling element, a pitch or interval of 10–30 $\mu m$ between the adjacent two grooves, and a depth of 0.1–1.0 $\mu m$ extending from a bottom thereof in a direction substantially perpendicular to the rotation axis of the rolling element. As a result, a large motive power can be transmitted and excellent traction characteristics can be exhibited.

In the traction drive rotary assembly of the present invention, the surface roughness of the traction contact surface is made such that an arithmetical mean roughness (Ra) is 0.03–0.13 $\mu m$ or a maximum height (Ry) is 0.2–0.9 $\mu m$. This results in more stable and excellent traction characteristics and satisfactory wear resistance of the traction contact surface, causing remarkable traction characteristics can be obtained over a long period of time. If the arithmetical mean roughness is less than 0.03 $\mu m$ or the maximum height is less than 0.2 $\mu m$, the improvement in traction characteristics is not considerable. In addition, if the arithmetical mean roughness exceeds 0.13 $\mu m$ or the maximum height exceeds 0.9 $\mu m$, it is likely that the metal contact will occur which will cause undesirable effect on durability.

The traction drive rotary assembly of the present invention can exhibit better traction characteristics by making a ratio (Sm/a) of a mean space (Sm) between the irregularities of the microstructure of the traction contact surface to a half (a) of a major axis diameter of a Hertzian contact ellipse 0.08 or less.

In the traction drive rotary assembly of the present invention, the microstructure of the traction contact surface of the rolling element is represented by an unfiltered primary profile curve including alternately arranged recesses and top-flat lands. The unfiltered primary profile curve is measured using a surface roughness tester (without passing through a filter). A portion of each land higher than a center line with respect to the unfiltered primary profile curve, namely, a line drawn at a mean height determined by integrally converting the unfiltered primary profile curve in the direction of length, has either one shape selected from a generally trapezoidal shape, a generally trapezoidal shape with rounded corners, a generally trapezoidal shape with chamfered corners, a generally crowning shape, a part of a generally elliptic arc shape, a generally sinusoidal shape and a generally triangular shape with a rounded apex. This can generate large traction force while holding metal contact to a low level, and transmit large motive power.

In the traction drive rotary assembly of the present invention, the traction contact surface has the microstructure in which a height difference between a top of each land and a bottom of each recess is 0.5–2.5 $\mu m$. This can transmit large motive power and exhibit excellent traction characteristics. If the height difference is less than 0.5 $\mu m$, traction characteristics are not greatly improved, and if the height difference is greater than 2.5 $\mu m$, it is likely that the metal contact will occur which will cause undesirable effect on durability.

In the traction drive rotary assembly of the present invention, the traction contact surface has the microstructure in which a height difference between a top of each land and a bottom of each recess is 2.0–2.5 $\mu m$. This can exhibit more stable and better traction characteristics. The traction drive rotary assembly of the present invention can further lower concern over the occurrence of metal contact causing undesirable effect on durability and have better traction characteristics, with an arrangement in which the height difference between the top of each land and the bottom of each recess is 0.8–1.2 $\mu m$.

In the traction drive rotary assembly of the present invention, the traction contact surface has the microstructure in which with respect to the center line separated into segments by crossing with the unfiltered primary profile curve, a ratio of a total length of the segments corresponding to the recesses to a reference length of the center line is within a range of 15–60%. Namely, a ratio of a length of the segment corresponding to the land to a length of the segment corresponding to the recess is within a range of 5.7–0.6. This can demonstrate a large traction coefficient with greater stability. If the ratio is less than 15%, traction characteristics are not greatly improved, and if the ratio is greater than 60%, it is likely that the metal contact will occur which will cause undesirable effect on durability.

In the traction drive rotary assembly of the present invention, the traction contact surface has the microstructure in which with respect to the center line separated into segments by crossing with the unfiltered primary profile curve, a ratio of a total length of the segments corresponding to the recesses to a reference length of the center line is within a range of 25–40%. Namely, a ratio of a length of the segment corresponding to the land to a length of the segment corresponding to the recess is within a range of 3.0–1.5. This can exhibit better traction characteristics with greater stability.

In the traction drive rotary assembly of the present invention, the traction contact surface has the microstructure in which the ratio of a total length of the segments corresponding to the recesses to the reference length of the center line is within a range of 27–35%. Namely, the ratio of a length of the segment corresponding to the land to a length of the segment corresponding to the recess is within a range of 2.7–1.8. This can further lower concern over the occurrence of metal contact causing undesirable effect on durability and have better traction characteristics.

In the traction drive rotary assembly of the present invention, the traction contact surface has the microstructure in which the ratio of a total length of the segments corresponding to the recesses to the reference length of the center line is within a range of 30–57%. Namely, the ratio of a length of the segment corresponding to the land to a length of the segment corresponding to the recess is within a range of 2.3–0.8. This can exhibit better traction characteristics with much greater stability.

In the traction drive rotary assembly of the present invention, the traction contact surface has the microstructure in which with respect to the center line separated into segments by crossing with the unfiltered primary profile curve, a pitch of the recesses is within a range of 10–150 μm. This can exhibit excellent traction characteristics with greater stability. If the pitch is greater than 150 μm, traction characteristics are not greatly improved, and if the pitch is less than 10 μm, it is likely that the metal contact will occur which will cause undesirable effect on durability.

In the traction drive rotary assembly of the present invention, the traction contact surface has the microstructure in which the pitch of the recesses is within a range of 40–120 μm. This can exhibit better traction characteristics with much greater stability.

In the traction drive rotary assembly of the present invention, the traction contact surface has the microstructure in which the surface roughness (as measured with an interatomic microscope) of a top portion of each land is made such that a ten-point mean roughness (Rz) is 100 μm or less. This can demonstrate a large traction coefficient. If the surface roughness is such that Rz is greater than 100 nm, it is likely that the metal contact will occur which will cause undesirable effect on durability.

In the traction drive rotary assembly of the present invention, the traction contact surface has the microstructure in which the surface roughness of the top portion of the land is made such that Rz is 40 nm or less. This can further lower concern over the occurrence of metal contact causing undesirable effect on durability and exhibit better traction characteristics.

In the traction drive rotary assembly of the present invention, the traction contact surface has the microstructure in which a length (width) of each segment corresponding to each recess is within a range of 10–40 μm. This can demonstrate a large traction coefficient. If the length of the recess is less than 10 μm, the improvement in traction characteristics is not remarkable, and if the length of the recess is greater than 40 μm, it is likely that the metal contact will occur which will cause undesirable effect on durability.

In the traction drive rotary assembly of the present invention, the traction contact surface has the microstructure in which a ratio of a pitch of the recesses to a major axis diameter of a Hertzian contact ellipse made at a maximum load, which extends perpendicular to a rotating direction of the rolling element, is within a range of 1.2–9%. This can demonstrate a large traction coefficient with stability and lower concern of metal contact causing undesirable effect on durability. The ratio of the pitch of the recesses to the major axis diameter of the Hertzian contact ellipse made at the maximum load is preferably within a range of 2.4–6%. This can exhibit better traction characteristics with greater stability.

In the traction drive rotary assembly of the present invention, the traction contact surface has the microstructure in which, with respect to the center line separated into segments by crossing with the unfiltered primary profile curve, a ratio of a length of each segment corresponding to each recess to the major axis diameter of the Hertzian contact ellipse made at the maximum load, which extends perpendicular to the rotating direction of the rolling element, is within a range of 0.6–2%. This can demonstrate a large traction coefficient with stability and lower concern over the occurrence of metal contact causing undesirable effect on durability.

In the traction drive rotary assembly of the present invention, the traction contact surface has the microstructure in which the ratio of a length of each segment corresponding to each recess to the minor axis diameter of the Hertzian contact ellipse made at the maximum load, which extends parallel to the rotating direction of the rolling element, is within a range of 0.8–3.2%. This can demonstrate a large traction coefficient with stability and lower concern over the occurrence of metal contact causing undesirable effect on durability.

In the traction drive rotary assembly of the present invention, the traction contact surface has the microstructure in which the recesses are grooves which are disposed substantially parallel to the rolling direction of the rolling element. This can demonstrate a large traction coefficient. If the direction of the recesses is not substantially parallel to the rolling direction of the rolling element, traction characteristics are not greatly improved.

In the traction drive rotary assembly of the present invention, the traction contact surface has the microstructure in which the recesses are grooves which spirally extend along the rolling direction of the rolling element. This can demonstrate a large traction coefficient and can produce efficiently in a short time by the formation of the continuous recesses.

In the traction drive rotary assembly of the present invention, thus traction contact surface has the microstructure in which the recesses extend longer than at least a minor axis diameter of the Hertzian contact ellipse. This can demonstrate a large traction coefficient. If the recesses extend shorter than the minor axis diameter of the Hertzian contact ellipse, traction characteristics are not greatly improved.

In the traction drive rotary assembly of the present invention, the traction contact surface has the microstructure in which a radius of curvature of a top portion of each top-flat land of the unfiltered primary profile curve measured using the surface roughness tester which is set at equal longitudinal and lateral magnifications, is 0.1–170 mm. This can demonstrate a larger traction coefficient. If the radius of curvature of the top portion of the projection is less than 0.1 mm, it is likely that the metal contact will occur which will cause undesirable effect on durability.

In the traction drive rotary assembly of the present invention, the traction contact surface has the microstructure in which a radius of curvature of a top portion of each top-flat land of the unfiltered primary profile curve measured using the surface roughness tester which is set at equal longitudinal and lateral magnifications, is 0.8–170 mm. This can further lower concern over the occurrence of metal contact causing undesirable effect on durability and can demonstrate a larger traction coefficient. If the radius of curvature of the top portion of the land is greater than 170 mm, traction characteristics are not greatly improved.

In the traction drive rotary assembly of the present invention, the traction contact surface has the microstructure in which a radius of curvature of a top portion of the top-flat land of the unfiltered primary profile curve measured using the surface roughness tester which is set at equal longitudinal and lateral magnifications, is 0.8–10 mm. This can further lower concern over the occurrence of metal contact causing undesirable effect on durability and can demonstrate a larger traction coefficient. If the radius of curvature of the top portion of the land is limited to 10 mm or less, better traction characteristics can be obtained.

In the traction drive rotary assembly of the present invention, the traction contact surface of one of the drive-side and driven-side rolling elements has the microstructure with irregularities, and the traction contact surface of the other of the drive-side and driven-side rolling elements has an arithmetical mean roughness Ra of 0.05 μm or less. This can demonstrate a large traction coefficient with greater stability and cause little concern over the occurrence of metal contact causing undesirable effect on durability.

In the traction drive rotary assembly of the present invention, the material of the rolling element and heat treatment therefor is selected from carburizing-quenching-tempering of case hardening steel, carbonitriding-quenching-tempering of case hardening steel, quenching-tempering of bearing steel, carburizing-quenching-tempering of bearing steel and carbonitriding-quenching-tempering of bearing steel. This can exhibit satisfactory wear resistance and excellent traction characteristics and transmit large motive power over a long period of time.

The traction drive rotary assembly of the present invention can be used as an element of a half-toroidal continuously variable transmission that is capable of transmitting large motive power, reducing unit size and weight, and increasing power output per unit volume and unit weight. The traction drive rotary assembly of the invention includes rotatably and coaxially arranged input and output disks, having opposed traction contact surfaces in the shape of an annular concaved surface, and power rollers that are juxtaposed between the traction contact surfaces of the input and output disks, formed with annular convexed traction contact surfaces rotatable relative to the traction contact surfaces of the input and output disks, and have rotation axes inclinable relative to a rotation axis of the disks.

In the traction drive rotary assembly of the present invention, the at least one of the traction contact surfaces of the rolling elements can be readily produced with high accuracy by forming recesses having a depth of 10 μm or less in a surface of the rolling element at equal intervals to form alternate arrangement of the recesses and projections, and, subsequent to the forming, machining the projections such that a height difference between a top of each top-flat land of the unfiltered primary profile curve and a bottom of each recess thereof is within a range of 0.5–2.5 μm. As a result, a shape of the top-flat lands of the unfiltered primary profile curve, a height difference between the recesses and the lands of the unfiltered primary profile curve, a ratio of a total length of the segments of the center line which correspond to the recesses of the unfiltered primary profile curve, to a reference length of the center line, a pitch of the recesses and a surface roughness of the lands and the like, are formed to the predetermined shapes and values.

In the traction drive rotary assembly of the present invention, the at least one of the traction contact surfaces of the rolling elements can be readily produced with high accuracy by making a surface roughness of a surface of the rolling element a ten-point mean roughness Rz of 100 nm or less, and then by forming recesses each having a depth of 0.5–2.5 μm at equal internals in the surface of the rolling element to form alternate arrangement of the recesses and top-flat lands between the recesses. By the former making of the surface roughness, top portions of the top-flat lands has the roughness Rz of 100 nm or less. By the latter forming of the recesses, a shape of the lands of the unfiltered primary profile curve, a height difference between the recesses and lands of the unfiltered primary profile curve, a ratio of a total length of the segments of the center line, which correspond to the recesses of the unfiltered primary profile curve, to a reference length of the center line, a pitch of the recesses and the like, are formed to the predetermined shapes and values.

In the traction drive rotary assembly of the present invention, the at least one of the traction contact surfaces of the rolling elements can be produced with high accuracy by forming recesses by at least one machining selected from cutting, grinding, blasting, laser machining and etching and by forming top-flat lands by at least one machining selected from super finishing, lapping, cutting, grinding and electrolytic polishing. A shape of the top-flat lands of the unfiltered primary profile curve, a height difference between the recesses and the lands of the unfiltered primary profile curve, a ratio of a total length of the segments of the center line, which correspond to the recesses of the unfiltered primary profile curve, to a reference length of the center line, a pitch of the recesses and a surface roughness of the lands and the like, are formed to the predetermined shapes and values. As a result, the high-accurately formed microstructure can be provided corresponding to variety of the irregularities by selecting the machining for the recesses and the lands, respectively.

In the traction drive rotary assembly of the present invention, the at least one of the traction contact surfaces of the rolling elements can be produced with high accuracy and in a short period of time, by forming recesses and projections by at least one machining selected from shot peening, grinding, cutting and super finishing and by forming the projections into top-flat lands having smoothened surfaces by roller burnishing. A shape of the top-flat lands of the unfiltered primary profile curve, a height difference between the recesses and the lands of the unfiltered primary profile curve, a ratio of a total length of the segments of the center line, which correspond to the recesses of the unfiltered primary profile curve, to a reference length of the center line, a pitch of the recesses and a surface roughness of the lands and the like, are formed to the predetermined shapes and values. The process by roller burnishing serves for reducing the time required for forming the lands as compared with the process by lapping and mirror polishing, so that the production cost can be lowered. Further, durability of the traction contact surface can be improved as a result of compression residual stress generated in the surface of the rolling element during the working and work hardening caused by the stress. Furthermore, the top-flat lands can be provided with the edges more rounded than the edges of the lands formed by, for instance, lapping. This can considerably reduce occurrence of damage caused by the edges of the lands onto the traction contact surface, further improving the durability.

In the traction drive rotary assembly of the present invention, the at least one of the traction contact surfaces of the rolling elements can be produced in which the recesses of a predetermined dimension are formed with high accuracy using a tool having a blade tip end that has at least one shape selected from a single R (radius), a trapezoidal shape, a V-shape and a complex R and a width of 4–150 μm at a location spaced from the blade tip end by 0.5–2.5 μm.

In the traction drive rotary assembly of the present invention, the at least one of the traction contact surfaces of the rolling elements can be produced in which the recesses of a predetermined dimension are formed with high accuracy by turning using a tool having a round blade tip end having an R of 0.2 mm or less.

In the traction drive rotary assembly of the present invention, the at least one of the traction contact surfaces of the rolling elements can be formed in a short time by simultaneously forming recesses and top-flat lands using a single tool that has cutting blades corresponding to the recesses and the lands, respectively, and has a dimensional difference therebetween is 0.5–2.5 μm. As a result, a height difference between the recesses and the top-flat lands of the unfiltered primary profile curve of the traction contact surface is within a range of 0.5–2.5 μm.

In the traction drive rotary assembly of the present invention, thus at least one of the traction contact surfaces of the rolling elements in which the ten-point mean roughness Rz of top portions of top-flat lands of the unfiltered primary profile curve is 100 nm or less or 40 nm or less, can be formed by machining the lands using a fixed abrasive grain tool having abrasive grains of a mean grain diameter of 9 μm or less.

In the traction drive rotary assembly of the present invention, the at least one of the traction contact surfaces of the rolling elements in which the ten-point mean roughness Rz of top portions of the top-flat lands of the unfiltered primary profile curve is 100 nm or less or 40 nm or less, can be produced by forming the lands using an elastic grindstone having abrasive grains of a mean grain diameter of 30 μm or less.

In the traction drive rotary assembly of the present invention, the at least one of the traction contact surfaces of the rolling elements can be produced in the following manner. The rolling element is rotated about a center axis and at the same time the rolling element and a tool are relatively moved in at least one direction selected from a direction of the center axis of the rolling element and a direction perpendicular to the center axis while being in contact with each other. By the process, the microstructure of the traction contact surface can be formed in which the recesses are formed continuously and in a short period of time along the rotating direction of the rolling element, and in the case of performing grinding after forming the recesses, abrasive grains or cuttings can be smoothly discharged because the recesses are spirally shaped, so that grinding can be performed with a good cutting edge at all times and finishing machining can be performed efficiently.

EXAMPLES

Examples 1–10 and Comparative Example 1 are Explained Hereinafter.

Example 1

Two rolling elements (test pieces) 22 and 24 of the traction drive rotary assembly of the invention were produced in the following manner. One (flat test piece) 24 of the rolling elements was made of JIS SCM420H steel (chromium molybdenum steel) subjected to carburizing-quenching-tempering and formed to a cylindrical shape having a diameter of 40 mm and a thickness of 20 mm and a flat cylindrical outer surface which was to be formed as the traction contact surface. After grinding and super finishing, the outer surface of rolling element (flat test piece) 24 was shot-peened by a pneumatic shot-peening machine at an air pressure of 0.5 MPa and using steel balls having a Vickers hardness of Hv750 and a mean particle diameter of 0.05 mm.

At this time, the projector nozzle was oscillated in a direction of the axis of rotation of rolling element (flat test piece) 24 while rotating rolling element (flat test piece) 24 so that an amount of ball-projection was substantially uniform over the entire outer surface. Furthermore, the ball-projection time was set at 20 sec. Random recesses and projections were formed in the outer surface of rolling element (flat test piece) 24 by the shot peening. After the shot-peening treatment, the projections in the outer surface were cut away by tape lapping. The traction contact surface of rolling element (flat test piece) 24 was thus formed, which had a microstructure in the form of a combination of dimples and top-flat lands. As a result of the following measuring of the traction contact surface, among the dimples, dimples having a diameter of 5–30 μm and a depth of 0.1–1.0 μm occupied 38% of a reference area of the traction contact surface, and the number of the dimples was 28 per 100 $\mu M^2$. In addition, the arithmetical mean roughness Ra described in JIS B0601-1994 of the traction contact surface was 0.121 μm and the maximum height Ry described in JIS B0601-1994 was 0.780 μm.

The other rolling element (crowning test piece) 22 was made of JIS SCM420H steel subjected to carburizing-quenching-tempering and formed to a cylindrical shape having a diameter of 40 mm and a thickness of 20 mm and a crowning-shaped outer surface having an R (radius) 700 mm which was to be formed as the traction contact surface. The outer surface of rolling element (crowning test piece) 22 was subjected to grinding and super finishing. The traction contact surface of rolling element (crowning test piece) 22 was thus formed, in which the arithmetical mean roughness Ra was 0.021 μm and the maximum height Ry was 0.155 μm.

Figure 2:
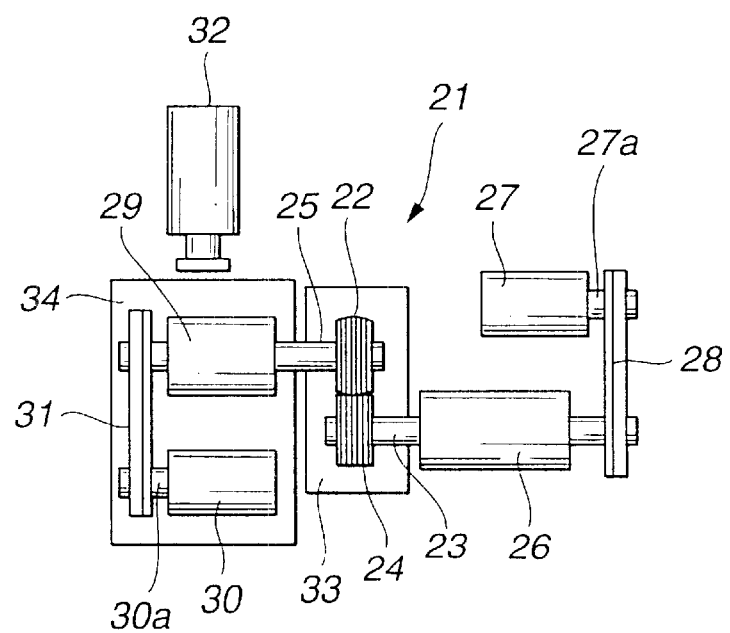
FIG. 2 is a schematic diagram showing a two-cylinder rolling tester used for testing traction contact surfaces of rolling elements of a rotary assembly useable for the traction drive CVT, according to the present invention.
Figure 5:
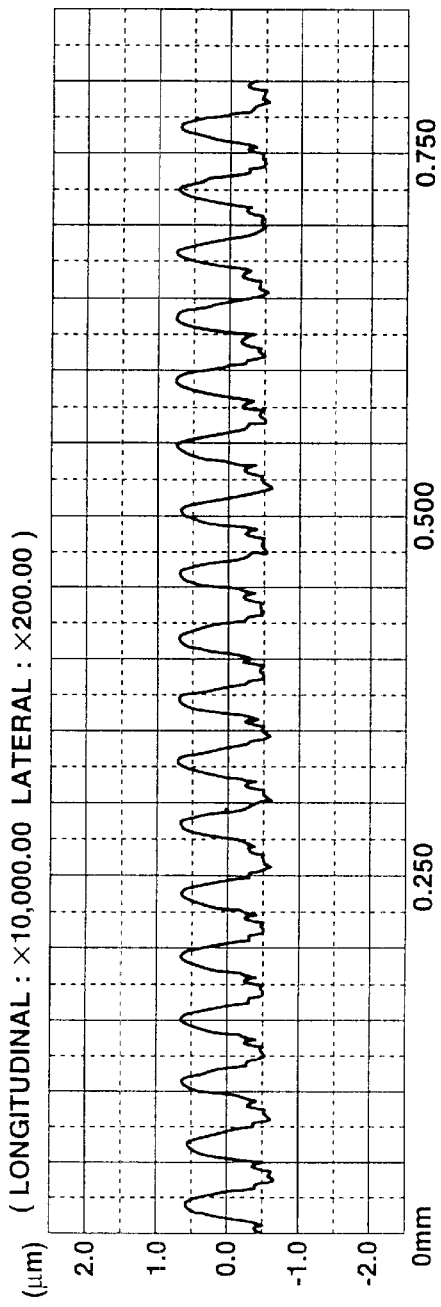
FIG. 5 is a graph showing an unfiltered primary profile curve of the traction contact surface of one of the rolling elements that is used in Example 27.
Figure 6:
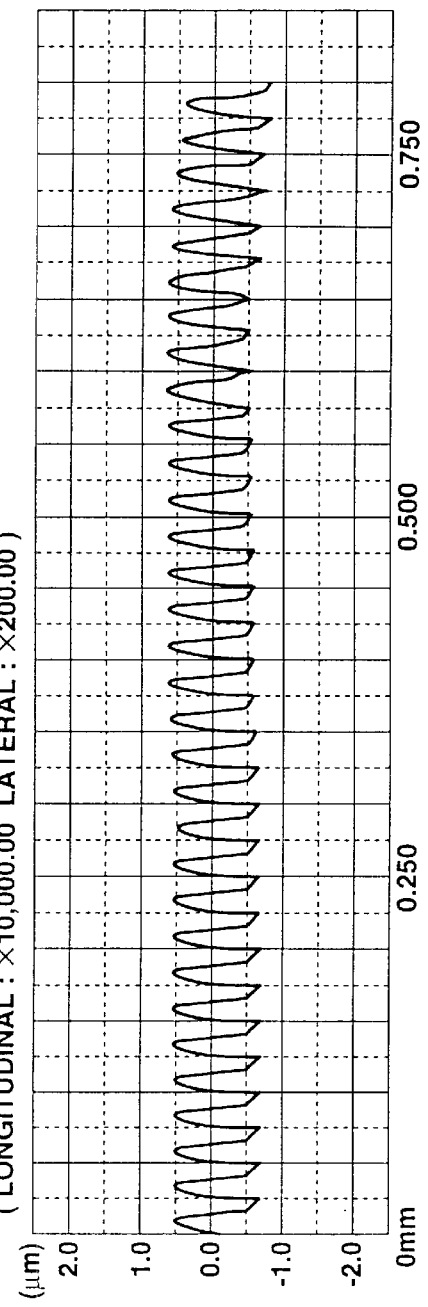
FIG. 6 is a graph showing an unfiltered primary profile curve of the traction contact surface of one of the rolling elements that is used in Example 28.
Figure 13:
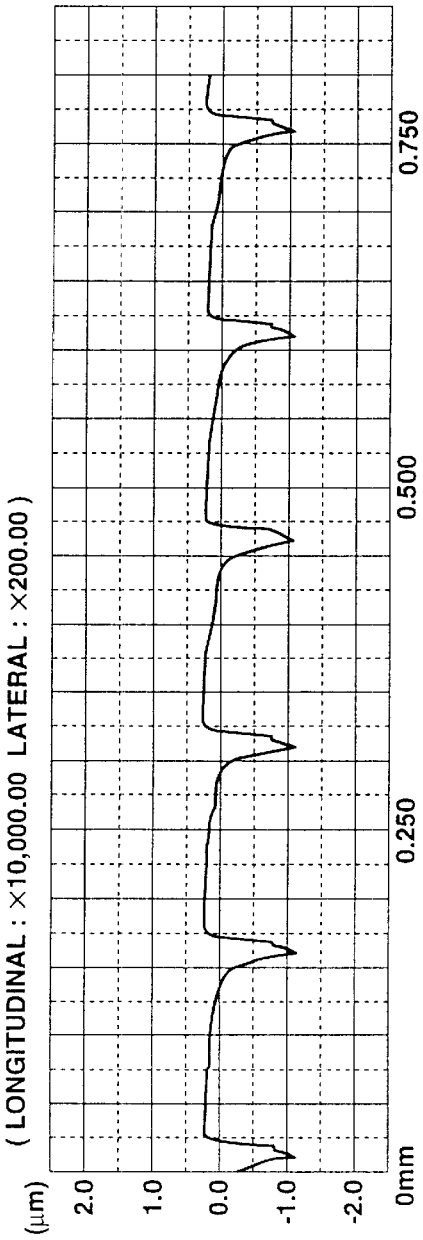
FIG. 13 is a graph showing an unfiltered primary profile curve of the traction contact surface of one of the rolling elements that is used in Example 35.
Figure 14:
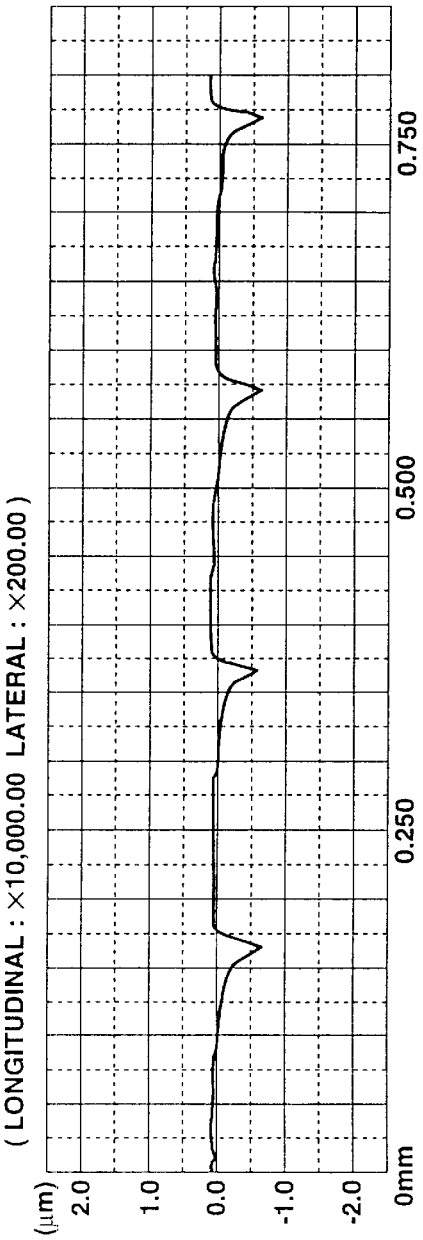
FIG. 14 is a graph showing an unfiltered primary profile curve of the traction contact surface of one of the rolling elements that is used in Comparative Example 8.

Thus-produced rolling elements (test pieces) 22 and 24 were installed in two-cylinder rolling tester 21 shown in FIG. 2 and a rolling slipping test was conducted using two-cylinder rolling tester 21. The traction coefficient in Example 1 at the slide/roll ratio of 5% was calculated. The maximum bearing pressure was 0.53 GPa in a Hertzian contact and the Hertzian contact ellipse had a minor axis diameter, i.e., a length extending parallel to the rotating direction of rolling elements 22 and 24, of 0.18 mm and a major axis diameter, i.e., a length extending perpendicular to the rotating direction of rolling elements 22 and 24, of 2.8 mm.

As illustrated in FIG. 2, two-cylinder rolling tester 21 includes driven shaft 25 that supports rolling element (crowning test piece) 22, and main shaft 23 that supports rolling element (flat test piece) 24. Torque sensor 26 is provided on main shaft 23. Main shaft timing belt 28 is spanned on main shaft 23 and motor shaft 27a of servo motor 27. Driven shaft 25 is fixed on sliding base 34 that is movable in a direction perpendicular to the axial direction through bearing 29. Driven shaft timing belt 31 is spanned on driven shaft 25 and motor shaft 30a of servo motor 30 that is also fixed on sliding base 34 with servo motor 30. Both of rolling elements (test pieces) 22 and 24 make rolling contact by applying pressure to sliding base 34 with air cylinder 32. Traction coefficient can be calculated by measuring the torque generated at main shaft 23 by torque sensor 26 provided in the motive power transmission system (main shaft 23) on the side of rolling element (flat test piece) 24. In the test of Examples 1–10 and Comparative Example 1, the slide/roll ratio was 0–5%, the mean rotation velocity was 5.2 m/s, and the mean shaft rotation number was 500 rpm (the sum of the rotation numbers of main shaft 23 and driven shaft 25 was 1000 rpm), and the rotation velocity was assumed to be constant by uniformly applying a differential to main shaft 23 and driven shaft 25. The rolling contact between one rolling element (crowning test piece) 22 and the other rolling element (flat test piece) 24 was conducted in oil bath 33 containing a traction oil set at 100° C. Nissan CVT fluid KTF-1 (Extroid CVT-exclusive traction fluid) was used as the traction oil. The vertical load generated by the pressure applied by air cylinder 32 was set at 147 N.

Example 2

Both rolling elements (test pieces) 24 and 22 were produced in the same manner as described in Example 1, except for different conditions as listed in Tables 1 and 2. Thus-produced rolling elements (test pieces) 24 and 22 in Example 2 were different from those in Example 1 with respect to the following points. The ratio of a total area of dimples having a diameter of 5–30 $\mu$m and a depth of 0.1–1.0 $\mu$m to a reference area of the traction contact surface of rolling element (flat test piece) 24 was 27%. The number of the dimples per 100 $\mu m^2$ was 22. The arithmetical mean roughness Ra of the traction contact surface of rolling element (flat test piece) 24 was 0.087 $\mu$m and the maximum height Ry thereof was 0.507 $\mu$m. The arithmetical mean roughness Ra of the traction contact surface of rolling element (crowning test piece) 22 was 0.012 $\mu$m and the maximum height Ry thereof was 0.093 $\mu$m. The rolling slipping test was conducted in the same manner as described in Example 1 and the traction coefficient was calculated.

Example 3

Both rolling elements (test pieces) 24 and 22 were produced in the same manner as described in Example 1, except for different conditions as listed in Tables 1 and 2. Thus-produced rolling elements (test pieces) 24 and 22 of Example 3 were different from those of Example 1 with respect to the following points. The ratio of a total area of dimples having a diameter of 5–30 $\mu$m and a depth of 0.1–1.0 $\mu$m to a reference area of the traction contact surface of rolling element (flat test piece) 24 was 18%, and the number of the dimples per 100 $\mu m^2$ was 16. The arithmetical mean roughness Ra of the traction contact surface of rolling element (flat test piece) 24 was 0.093 $\mu$m and the maximum height Ry thereof was 0.502 $\mu$m. The arithmetical mean roughness Ra of the traction contact surface of rolling element (crowning test piece) 22 was 0.015 $\mu$m and the maximum height Ry was 0.100 $\mu$m. The rolling slipping test was conducted in the same manner as described in Example 1 and the traction coefficient was calculated.

Example 4

Both rolling elements (test pieces) 24 and 22 were produced in the same manner as described in Example 1, except for different conditions as listed in Tables 1 and 2. Thus-produced rolling elements (test pieces) 24 and 22 in Example 4 were different from those in Example 1 with respect to the following points. The ratio of a total area of dimples having a diameter of 5–30 $\mu$m and a depth of 0.1–1.0 $\mu$m to a reference area of the traction contact surface of rolling element (flat test piece) 24 was 6%, and the number of the dimples per 100 $\mu m^2$ was 11. The arithmetical mean roughness Ra of the traction contact surface of rolling element (flat test piece) 24 was 0.076 $\mu$m and the maximum height Ry thereof was 0.406 $\mu$m. The arithmetical mean roughness Ra of the traction contact surface of rolling element (crowning test piece) 22 was 0.016 $\mu$m and the maximum height Ry thereof was 0.118 $\mu$m. The rolling slipping test was conducted in the same manner as described in Example 1 and the traction coefficient was calculated.

Example 5

Rolling element (flat test piece) 24 was produced in the same manner as described in Example 2, except that the tape lapping in Example 2 was changed to lapping. The target values were the same as those in Example 2. Rolling element (crowning test piece) 22 was produced in the same manner as described in Example 2. Thus-produced rolling elements (test pieces) 24 and 22 in Example 5 were different from those in Example 2 with respect to the following points. The ratio of a total area of dimples having a diameter of 5–30 $\mu$m and a depth of 0.1–1.0 $\mu$m to a reference area of the traction contact surface of rolling element (flat test piece) 24 was 22% and the number of the dimples per 100 $\mu m^2$ was 19. The arithmetical mean roughness Ra of the traction contact surface of rolling element (flat test piece) 24 was 0.095 $\mu$m and the maximum height Ry thereof was 0.552 $\mu$m. The arithmetical mean roughness Ra of the traction contact surface of rolling element (crowning test piece) 22 was 0.014 $\mu$m and the maximum height Ry thereof was 0.110 $\mu$m. The rolling slipping test was conducted in the same manner as described in Example 1 and the traction coefficient was calculated.

Example 6

Rolling element (flat test piece) 24 was produced in the same manner as described in Example 2, except that the tape lapping in Example 2 was changed to mirror polishing. The (target values were the same as those in Example 2. Rolling element (crowning test piece) 22 was produced in the same manner as described in Example 2. Thus-produced rolling elements (test pieces 24 and 22 in Example 6 were different from those in Example 2 with respect to the following points. The ratio of a total area of dimples having a diameter of 5–30 $\mu$m and a depth of 0.1–1.0 $\mu$m to a reference area of the traction contact surface of rolling element (flat test piece) 24 was 25%, and the number of the dimples per 100 $\mu m^2$ was 20. The arithmetical mean roughness Ra of the traction contact surface of rolling element (flat test piece) 24 was 0.081 $\mu$m and the maximum height Ry thereof was 0.473 $\mu$m. The arithmetical mean roughness Ra of the traction contact surface of rolling element (crowning test piece) 22 was 0.013 $\mu$m and the maximum height Ry thereof was 0.095 $\mu$m. The rolling slipping test was conducted in the same manner as described in Example 1 and the traction coefficient was calculated.

Example 7

Rolling element (flat test piece) 24 was produced in the same manner as described in Example 2, except that the heat treatment of carburization-quenching-tempering in Example 2 was changed to carbonitriding-quenching-tempering. The target values were the same as those in Example 2. Rolling element (crowning test piece) 22 was made of the same material and produced in the same manner as described in Example 2. Thus-produced rolling elements (test pieces) 24 and 22 in Example 7 differed from those in Example 2 with respect to the following points. The ratio of a total area of dimples having a diameter of 5–30 µm and a depth of 0.1–1.0 µm to a reference area of the traction contact surface of rolling element (flat test piece) 24 was 20%, and the number of the dimples per 100 µm$^2$ was 17. The arithmetical mean roughness Ra of the traction contact surface of rolling element (flat test piece) 24 seas 0.088 µm and the maximum height Ry thereof was 0.522 µm. The arithmetical mean roughness Ra of the traction contact surface of rolling element (crowning test piece) 22 was 0.018 µm and the maximum height Ry thereof was 0.099 µm. The rolling slipping test was conducted in the same manner as described in Example 1 and the traction coefficient was calculated.

Example 8

Rolling element (flat test piece) 24 was produced in the same manner as described in Example 2, except that the carburizing-quenching-tempering of JIS SCM420H steel in Example 2 was changed to quenching-tempering of JIS SUJ2 steel (high carbon chromium bearing steel). The target values were the same as those in Example 2. Rolling element (crowning test piece) 22 was made of the same material and produced in the same manner as described in Example 2. Thus-produced rolling elements (test pieces) 24 and 22 in Example 8 differed from those in Example 2 with respect to the following points. The ratio of a total area of dimples having a diameter of 5–30 µm and a depth of 0.1–1.0 µm to a reference area of the traction contact surface of rolling element (flat test piece) 24 was 23%, and the number of the dimples per 100 µm$^2$ was 22. The arithmetical mean roughness Ra of the traction contact surface of rolling element (flat test piece) 24 was 0.073 µm and the maximum height Ry thereof was 0.472 µm. The arithmetical mean roughness Ra of the traction contact surface of rolling element (crowning test piece) 22 was 0.017 µm and the maximum height Ry thereof was 0.104 µm. The rolling slipping test was conducted in the same manner as described in Example 1 and the traction coefficient was calculated.

Example 9

Rolling element (flat test piece) 24 was produced in the same manner as described in Example 8, except that the heat treatment in Example 8 was changed to carbonitriding-quenching-tempering. The target values were the same as those in Example 8. Rolling element (crowning test piece) 22 was produced in the same manner as described in Example 8. Thus-produced rolling elements (test pieces) 24 and 22 in Example 9 differed from those in Example 8 with respect to the following points. The ratio of a total area of dimples having a diameter of 5–30 µm and a depth of 0.1–1.0 µm to a reference area of the traction contact surface of rolling element (flat test piece) 24 was 27%, and the number of the dimples per 100 µm$^2$ was 27. The arithmetical mean roughness Ra of the traction contact surface of rolling element (flat test piece) 24 was 0.095 µm and the maximum height Ry thereof was 0.634 µm. The arithmetical mean roughness Ra of the traction contact surface of rolling element (crowning test piece) 22 was 0.018 µm and the maximum height Ry thereof was 0.110 µm. The rolling slipping test was conducted in the same manner as described in Example 1 and the traction coefficient was calculated.

Example 10

Rolling element (flat test piece) 24 was made of the same material and produced such that the process and the target values were the same as described in Example 2. Rolling element (crowning test piece) 22 was made of the same material as that of rolling element (flat test piece) 24, and produced by the same process as that of rolling element (flat test piece) 24 except that shot peening and tape lapping were conducted after grinding and super finishing. The microstructures of the traction contact surfaces of rolling elements (test pieces) 24 and 22 were the combination of dimples and top-flat lands. Thus-produced rolling elements (test pieces,) 24 and 22 in Example 10 differed from those in Example 2 with respect to the following points. The ratio of a total area of dimples having a diameter of 5–30 µm and a depth of 0.1–1.0 µm to a reference area of the traction contact surface of rolling element (flat test piece) 24 was 21%, and the number of the dimples per 100 µm$^2$ was 22. The arithmetical mean roughness Ra of the traction contact surface of rolling element (flat test piece) 24 was 0.095 µm and the maximum height Ry thereof was 0.487 µm. On the other hand, the ratio of a total area of dimples having a diameter of 5–30 µm and depth of 0.1–1.0 µm to a reference area of the traction contact surface of rolling element (crowning test piece) 22 was 22%, and the number of the dimples per 100 µm$^2$ was 20. The arithmetical mean roughness Ra of the traction contact surface of rolling element (crowning test piece) 22 was 0.087 µm and the maximum height Ry thereof was 0.514 µm. The rolling slipping test was conducted in the same manner as described in Example 1 and the traction coefficient was calculated.

Comparative Example 1

Rolling elements (test pieces) 22 and 24 were made of the same material as described in Example 1. Different from each of Examples 1–10, rolling elements (test pieces) 22 and 24 were merely subjected to super finishing to be formed with smooth traction contact surfaces without dimples therein. The arithmetical mean roughness Ra of the traction contact surface of rolling element (flat test piece) 24 was 0.018 µm and the maximum height Ry thereof was 0.102 µm. The arithmetical mean roughness Ra of the traction contact surface of rolling element (crowning test piece) 22 was 0.021 µm and the maximum height Ry thereof was 0.120 µm. The rolling slipping test was conducted in the same manner as described in Example 1 and the traction coefficient was calculated.

The production conditions and obtained characteristics of rolling elements (flat test pieces) 24 in Examples 1–10 and Comparative Example 1 are shown in Table 1, while the production conditions and obtained characteristics of rolling elements (crowning test pieces) 22 in Examples 1–10 and Comparative Example 1 are shown in Table 2. The ratios of the traction coefficients in respective Examples 1–10 to the traction coefficient in Comparative Example 1 are shown in Table 3 based on the traction coefficients obtained in Examples 1–10 and Comparative Example 1 at the slide/roll ratio of 5%.

TABLE 1

Flat test piece

| | Material & heat treatment *1 | Machining after heat treatment *2 | Shot peening cond. | | Rolling surface micro-structure *5 | Dimples *6 | | Dimple distribution | Surface roughness | | Hv (200 g) *9 |
|---|---|---|---|---|---|---|---|---|---|---|---|
| | | | PD (mm) *3 | AP (MPa) *4 | | AR (%) *7 | No. per 100 μm² *8 | | Ra μm | Ry μm | |
| Ex. 1 | SCM420H C,Q,T | G,SF,SPTL | 0.05 | 0.5 | D-L comb. | 38 | 28 | Uniform | 0.121 | 0.780 | 920 |
| Ex. 2 | SCM420H C,Q,T | G,SF,SPTL | 0.05 | 0.5 | D-L comb. | 27 | 22 | Uniform | 0.087 | 0.507 | 930 |
| Ex. 3 | SCM420H C,Q,T | G,SF,SPTL | 0.05 | 0.5 | D-L comb. | 18 | 16 | Uniform | 0.093 | 0.502 | 930 |
| Ex. 4 | SCM420H C,Q,T | G,SF,SPTL | 0.05 | 0.5 | D-L comb. | 6 | 11 | Uniform | 0.076 | 0.406 | 900 |
| Ex. 5 | SCM420H C,Q,T | G,SF,SPL | 0.05 | 0.5 | D-L comb. | 22 | 19 | Uniform | 0.095 | 0.552 | 890 |
| Ex. 6 | SCM420H C,Q,T | G,SF,SPMP | 0.05 | 0.5 | D-L comb. | 25 | 20 | Uniform | 0.081 | 0.473 | 900 |
| Ex. 7 | SCM420H CN,Q,T | G,SF,SPTL | 0.05 | 0.5 | D-L comb. | 20 | 17 | Uniform | 0.088 | 0.522 | 910 |
| Ex. 8 | SUJ2 Q,T | G,SF,SPTL | 0.05 | 0.5 | D-L comb. | 23 | 22 | Uniform | 0.073 | 0.472 | 890 |
| Ex. 9 | SUJ2 CN,Q,T | G,SF,SPTL | 0.05 | 0.5 | D-L comb. | 27 | 27 | Uniform | 0.095 | 0.634 | 930 |
| Ex. 10 | SCM420H C,Q,T | G,SF,SPTL | 0.05 | 0.5 | D-L comb. | 21 | 22 | Uniform | 0.095 | 0.487 | 930 |
| Com. Ex. 1 | SCM420H C,Q,T | SF | — | — | Cross-hatched grinding marks | — | — | — | 0.018 | 0.102 | 750 |

Note:
*1: C: Carburizing, Q: Quenching, T: Tempering, CN: Carbonitriding
*2: G: Grinding, SF: Super finishing, SP: Shot peening, TL: Tape lapping, L: Lapping, MP: Mirror polishing
*3: Particle diameter (mm)
*4: Air pressure (MPa)
*5: D-L Comb.: Combination of dimples and top-flat lands
*6: Dimples having diameter of 5–30 μm and depth of 0.1–1.0 μm
*7: Ratio of total area of dimples to reference area of traction contact surface
*8: Number of dimples per 100 μm²
*9: Hardness at location having depth of 3 μm

TABLE 2

Crowning test piece

| | Material & heat treatment *1 | Machining after heat treatment *2 | Shot peening cond. | | Rolling surface micro-structure *5 | Dimples *7 | | Dimple distribution | Surface roughness | | Hv (200 g) *9 |
|---|---|---|---|---|---|---|---|---|---|---|---|
| | | | PD (mm) *3 | AP (MPa) *4 | | AR (%) *7 | No. per 100 μm² *8 | | Ra μm | Ry μm | |
| Ex. 1 | SCM420H C,Q,T | G,SF | | | GM | — | — | — | 0.021 | 0.155 | 740 |
| Ex. 2 | SCM420H C,Q,T | G,SF | | | GM | — | — | — | 0.012 | 0.093 | 760 |
| Ex. 3 | SCM420H C,Q,T | G,SF | | — | GM | — | — | — | 0.015 | 0.100 | 750 |
| Ex. 4 | SCM420H C,Q,T | G,SF | — | — | GM | — | — | — | 0.016 | 0.118 | 750 |
| Ex. 5 | SCM420H C,Q,T | G,SF | — | — | GM | — | — | — | 0.014 | 0.110 | 740 |

TABLE 2-continued

Crowning test piece

| Mate-rial & heat treat-ment *1 | Machining after heat treat-ment *2 | Shot peening cond. PD (mm) *3 | Shot peening cond. AP (MPa) *4 | Rolling surface micro-struc-ture *5 | Dimples AR (%) *7 | Dimples No. per 100 μm² *8 | Dimple dis-tri-bution | Surface roughness Ra μm | Surface roughness Ry μm | Hv (200 g) *9 |
|---|---|---|---|---|---|---|---|---|---|---|
| Ex. 6 | SCM420H C,Q,T | G,SF | — | — | GM | — | — | — | 0.013 | 0.095 | 730 |
| Ex. 7 | SCM420H CN,Q,T | G,SF | — | — | GM | — | — | — | 0.018 | 0.099 | 760 |
| Ex. 8 | SCM420H CN,Q,T | G,SF | — | — | GM | — | — | — | 0.017 | 0.104 | 740 |
| Ex. 9 | SCM420H CN,Q,T | G,SF | — | — | GM | — | — | — | 0.018 | 0.110 | 740 |
| Ex. 10 | SCM420H C,Q,T | G,SF,SP TL | 0.05 | 0.5 | D-L comb. | 22 | 20 | Uniform | 0.087 | 0.514 | 910 |
| Com. Ex. 1 | SCM420H C,Q,T | SF | — | — | GM | — | — | — | 0.021 | 0.120 | 750 |

Note:
*1: C: Carburizing, Q: Quenching, T: Tempering
*2: G: Grinding, SF: Super finishing, SP: Shot peening, TL: Tape lapping
*3: Particle diameter (mm)
*4: Air pressure (MPa)
*5: GM: Grinding marks in circumferential direction, D-L Comb.: Combination of dimples and top-flat lands
*6: Dimples having diameter of 5–30 μm and depth of 0.1–1.0 μm
*7: Ratio of total area of dimples to reference area of traction contact surface
*8: Number of dimples per 100 μm²
*9: Hardness at location having depth of 3 μm

TABLE 3

| | Ratio of traction coefficient at slide/roll ratio of 5% |
|---|---|
| Example 1 | 1.70 |
| Example 2 | 1.84 |
| Example 3 | 1.95 |
| Example 4 | 1.41 |
| Example 5 | 1.89 |
| Example 6 | 1.92 |
| Example 7 | 1.86 |
| Example 8 | 1.78 |
| Example 9 | 1.76 |
| Example 10 | 1.97 |
| Comparative Example 1 | 1 |

As be apparent from the results shown in Table 3, satisfactory traction coefficients were exhibited in Examples 1–10. It will be appreciated that the satisfactory traction coefficients can be obtained by producing the microstructure of the traction contact surface of each or one of rolling elements 24 and 22 in the form of the combination of dimples and top-flat lands, making the ratio of the total area of dimples having the diameter of 5–30 μm and the depth of 0.1–1.0 μm to the reference area of the traction contact surface 5–40%, distributing the dimples substantially uniformly over the entire traction contact surface and making the dimples mutually independent and the top-flat lands between the dimples, and further by making the number of the dimples having the diameter of 5–30 μm and the depth of 0.1–1.0 μm within the range of 10–30 per 100 μm² and making the surfaces roughness of the traction contact surface such that the arithmetical mean roughness Ra is 0.07–0.15 μm or the maximum height Ry is 0.4–1.0 μm.

In contrast, in Comparative Example 1, since both rolling elements were subjected to super finishing to be formed with the flat traction contact surfaces, the traction coefficient was exhibited lower than the traction coefficient in any of Examples 1–10.

Next, Examples 11–17 and Comparative Examples 2–6 are explained.

Example 11

Rolling element (flat test piece) 24 was made of JIS SCM420H subjected to carburizing-quenching-tempering and formed to a cylindrical shape having a diameter of 40 mm, a thickness of 20 mm and a flat cylindrical outer surface which was to be formed as the traction contact surface. After grinding and super finishing, the outer surface of rolling element (test piece) 24 was shot-peened by a pneumatic shot-peening machine at an air pressure of 0.5 MPa and using steel balls having a Vickers hardness of Hv750 and a mean particle diameter of 0.05 mm. At this time, the projector nozzle was oscillated in a direction of the axis of rotation of rolling element (flat test piece) 24 while rotating rolling element (flat test piece) 24, so that an amount of ball-projection of the steel balls was substantially uniform over the entire outer surface. The ball-projection time was set at 20 sec. Recesses and projections between the recesses were formed at random in the outer surface of rolling element (flat test piece) 24 by the shot peening. After the shot peening, the projections in the outer surface were machined by tape lapping. The traction contact surface of rolling element (flat test piece) 24 was thus formed, which had a microstructure in the form of a combination of dimples and top-flat lands. The traction contact surface of rolling element (flat test piece) 24 was measured using a tracer type surface roughness tester at a cutoff of 0.08 and a measuring length of 0.4 mm. The surface roughness tester was Surfcom 1400A produced by Tokyo Seimitsu Co., Ltd. The ratio of a total area of the dimples to a reference area of the traction contact surface was determined by image analysis. As a result, among the dimples, dimples having a diameter of 5–30 μm and a depth of 0.1–1.0 μm occupied 38% of the reference area of the traction contact surface. The arithmetical mean roughness Ra of the traction contact surface of rolling element (flat test piece) 24 was 0.121 μm and the maximum height Ry thereof was 0.780 μm.

Rolling element (crowning test piece) 22 was made of JIS SCM420H steel subjected to carburizing-quenching-tempering and formed to a cylindrical shape having a diameter of 40 mm, a thickness of 20 mm and a crowning-shaped outer surface having an R (radius) 700 mm which was to be formed as the traction contact surface. The outer surface of rolling element (crowning test piece) 22 was subjected to grinding and super finishing so as to be formed to the traction contact surface. The thus-formed traction contact surface of rolling element (crowning test piece) 22 had a surface roughness in which the arithmetical mean roughness Ra was 0.021 μm and the maximum height Ry was 0.155 μm.

Thus-produced rolling elements (test pieces) 22 and 24 were installed in two-cylinder rolling tester 21 shown in FIG. 2 and the rolling slipping test thereof was conducted under the same conditions as those in Example 1. The traction coefficient and the oil film formation rate were calculated at the slide/roll ratio of 5%. The maximum bearing pressure was 0.53 GPa in a Hertzian contact and the Hertzian contact ellipse had a minor axis diameter, i.e., a length extending parallel to the rotating direction of rolling elements 22 and 24, of 0.18 mm and a major axis diameter, i.e., a length extending perpendicular to the rotating direction of rolling elements 22 and 24, of 2.8 mm.

Example 12

Rolling element (flat test piece) 24 was produced in the same manner as described in Example 11, except for different condition as listed in Table 4. Thus-produced rolling element (flat test piece) 24 of Example 12 was different from that in Example 11 with respect to the following points. The ratio of a total area of dimples having a diameter of 5–30 μm and a depth of 0.1–1.0 μm to a reference area of the traction contact surface of rolling element (flat test piece) 24 was 30%. The arithmetical mean roughness Ra of the traction contact surface of rolling element (flat test piece) 24 was 0.087 μm and the maximum height Ry thereof was 0.507 μm. On the other hand, rolling element (crowning test piece) 22 was produced in the same manner as described in Example 11. The rolling slipping test and the calculation of traction coefficient and oil film formation rate was conducted in the same manner as described in Example 11.

Example 13

Rolling element (flat test piece) 24 was produced in the same manner as described in Example 11 through the grinding and finishing, but after the grinding and finishing, rolling element (flat test piece) 24 was subjected to ultra-precision cutting using a sintered cubic boron nitride (c-BN) tool having a round end having an R 200 μm under conditions that the cutting speed was 250 m/min, the feeding speed was 0.05 mm/rev, and the cutting depth in the radial direction was 0.003 mm. Thus, circumferential grooves and projections between the circumferential grooves were formed in an outer surface of rolling element (flat test piece) 24. Next, the projections were machined by tape lapping to form top-flat lands so that the circumferential grooves and the top-flat lands were formed in the traction contact surface had. The thus-formed traction contact surface had a microstructure of a combination of the circumferential grooves and the top-flat lands. The ratio of a total area of the grooves to a reference area of the traction contact surface of rolling element (flat test piece) 24 was 25%. The arithmetical mean roughness Ra of the traction contact surface of rolling element (flat test piece) 24 was 0.034 μm and the maximum height Ry thereof was 0.241 μm. Rolling element (crowning test piece) 22 was produced in the same manner as described in Example 11. The rolling slipping test and the calculation of traction coefficient and oil film formation rate were conducted in the same manner as described in Example 11.

Example 14

Rolling element (flat test piece) 24 was produced in the same manner as described in Example 13, except for different conditions of tape lapping. Thus-produced rolling element (flat test piece) 24 in Example 14 was different from that in Example 13 with respect to the following points. The ratio of a total area of circumferential grooves to a reference area of the traction contact surface of rolling element (flat test piece) 24 was 10%. The arithmetical mean roughness Ra of the traction contact surface of rolling element (flat test piece) 24 was 0.084 μm and the maximum height Ry thereof was 0.880 μm. Rolling element (crowning test piece) 22 was produced in the same manner as described in Example 11. The rolling slipping test and the calculation of traction coefficient and oil film formation rate were conducted in the same manner as described in Example 11.

Examples 15–17 and Comparative Examples 2 and 4–6

Rolling elements flat test pieces) 24 were produced in the same manner as described in Example 11, except that the shot peening step and the tape lapping step after the super finishing step were omitted and a time of the super finishing was changed. Grinding marks formed in the grinding step was removed by the super finishing. Thus-produced rolling elements (flat test pieces) 24 in Examples 15–17 and Comparative Examples 2 and 4–6 were different from that in Example 11. In Example 15, the arithmetical means roughness Ra of the traction contact surface was 0.026 μm and the maximum height Ry thereof was 0.180 μm. In Example 16, the arithmetical mean roughness Ra of the traction contact surface was 0.020 μm and the maximum height Ry thereof was 0.134 μm. In Example 17, the arithmetical mean roughness Ra of the traction contact surface was 0.033 μm and the maximum height Ry thereof was 0.313 μm. In Comparative Example 2, the arithmetical mean roughness Ra of the traction contact surface was 0.017 μm and the maximum height Ry thereof was 0.102 μm. In Comparative Example 4, the arithmetical mean roughness of the traction contact surface was 0.033 μm and the maximum height Ry thereof was 0.275 μm. In Comparative Example 5, the arithmetical mean roughness Ra of the traction contact surface was 0.068 μm and the maximum height Ry thereof was 0.203 μm. In Comparative Example 6, the arithmetical mean roughness Ra of the traction contact surface was 0.054 μm and the maximum height Ry thereof was 0.313 μm.

Rolling elements (crowning test pieces) 22 were produced in the same manner as described in Example 11. The rolling slipping test and the calculation of traction coefficients and oil film formation rates were conducted in the same manner as described in Example 11.

Comparative Example 3

Rolling element (flat test piece) 24 was produced in the same manner as described in Example 11 except that the tape lapping step after the shot peening step was omitted. The arithmetical mean roughness Ra of the traction contact surface of thus-produced rolling element (flat test piece) 24 was 0.125 μm and the maximum height Ry thereof was 0.686 μm. Rolling element (crowning test piece) 22 was produced in the same manner as described in Example 11. The rolling slipping test and the calculation of traction coefficient and oil film formation rate were conducted in the same manner as described in Example 11.

The production conditions and obtained characteristics of rolling elements (flat test pieces) 24 in Example 11–17 and Comparative Examples 2–6 are shown in Table 4, while the production conditions and obtained characteristics of rolling elements (crowning test pieces) 22 therein are shown in Table 5. The ratios of the traction coefficients in respective Examples 11–17 and Comparative Examples 2–6 to the traction coefficient in Comparative Example 2 are shown in Table 4 based on the traction coefficients obtained in Examples 11–17 and Comparative Examples 2–6 at the slide/roll ratio of 5%. The ratios of the oil film formation rates in respective Examples 11–17 and Comparative Examples 2–6 to the oil film formation rate in Comparative Example 2 are also shown in Table 4 based on the oil film formation rates obtained in Examples 11–17 and Comparative Example 2–6 at the slide/roll ratio of 5%.

TABLE 4

| | | Flat test piece | | | | | | | | | | | |
|---|---|---|---|---|---|---|---|---|---|---|---|---|---|
| | | Machining steps after heat treatment *1 | Shot peening | | Surface micro- structure *4 | D/G AR (%) *5 | Surface roughness | | | | | | TCR vs. Com. Ex. 2 *6 | OFFR vs. Com. Ex. 2 *7 |
| | | | PD (mm) *2 | AP (MPa) *3 | | | Ra (μm) | Ry (μm) | K | Vo mm³/mm² | Sm μm | Sm/a | | |
| Ex. | 11 | G,SF,SP,TL | 0.05 | 0.5 | D-L Comb. | 38 | 0.121 | 0.780 | 1.10 | 2.0E-05 | 34.7 | 0.0243 | 2.0 | 1.2 |
| | 12 | G,SF,SP,TL | 0.05 | 0.3 | D-L Comb. | 30 | 0.087 | 0.507 | 1.40 | 2.2E-05 | 115.0 | 0.0804 | 1.3 | 1.0 |
| | 13 | G,UPC,TL | — | — | G-L Comb. | 25 | 0.034 | 0.241 | 1.40 | 1.1E-05 | 15.2 | 0.0106 | 1.8 | 1.3 |
| | 14 | G,UPC,TL | — | — | G-L Comb. | 10 | 0.084 | 0.880 | 1.20 | 1.8E-05 | 35.0 | 0.0245 | 1.9 | 1.2 |
| | 15 | G,SF | — | — | DC GM | — | 0.026 | 0.180 | 1.30 | 6.0E-05 | 16.0 | 0.0112 | 1.4 | 1.2 |
| | 16 | G,SF | — | — | DC GM | — | 0.020 | 0.134 | 1.75 | 9.5E-05 | 21.2 | 0.0148 | 1.4 | 1.0 |
| | 17 | G,SF | — | — | DC GM | — | 0.033 | 0.313 | 1.76 | 7.2E-05 | 31.2 | 0.0218 | 1.4 | 1.2 |
| Com. Ex. | 2 | G,SF | — | — | DC GM | — | 0.017 | 0.102 | 0.83 | 2.3E-05 | 8.0 | 0.0056 | 1.0 | 1.0 |
| | 3 | G,SF,SP | 0.05 | 0.5 | Dimples | — | 0.125 | 0.686 | 0.54 | 1.1E-05 | 28.9 | 0.0202 | 2.5 | 0.1 |
| | 4 | G,SF | — | — | DC GM | — | 0.033 | 0.275 | 0.73 | 5.0E-05 | 11.3 | 0.0079 | 2.3 | 0.2 |
| | 5 | G,SF | — | — | DC GM | — | 0.068 | 0.203 | 0.42 | 5.4E-05 | 9.0 | 0.0063 | 2.7 | 0.1 |
| | 6 | G,SF | — | — | DC GM | — | 0.054 | 0.313 | 0.67 | 7.7E-05 | 20.7 | 0.0145 | 2.5 | 0.0 |

Note:
*1: G: Grinding, SF: Super finishing, SP: Shot peening, TL: Tape lapping, UPC: Ultra-precision cutting
*2: Particle diameter (mm)
*3: Air pressure (MPa)
*4: D-L Comb.: Combination of dimples and lands, G-L Comb.: Combination of circumferential grooves and top-flat lands, DC GM: Discontinuous grinding marks
*5: Dimple and groove area ratio
*6: Traction coefficient ratio: Example vs Comparative Example 2
*7: Oil film formation ratio: Example vs. Comparative Example 2

TABLE 5

| | Crowning test piece | | | | | | | | |
|---|---|---|---|---|---|---|---|---|---|
| | Mach. step aft. HT *1 | SP cond. *3 | | Rolling surface micro- structure | Surface roughness *7 | | | | |
| | | PD (mm) *4 | AP (MPa) *5 | | AR *8 (%) | Ra (μm) | Ry (μm) | K | Vo mm³/mm² |
| Ex. 11–17 Com. Ex. 2–6 | G,SF *2 | — | — | GM in cir. dirct. *6 | — | 0.021 | 0.155 | 0.63 | 1.6E-06 |

Note:
*1: Machining step after heat treatment
*2: G: Grinding, SF: Super finishing
*3: Shot peening conditions
*4: Particle diameter (mm)
*5: Air pressure (MPa)
*6: Grinding marks in circumferential direction
*7: Surface roughness for dimples having diameter of 5–30 μm and depth of 0.1–1.0 μm
*8: Ratio of total area of dimples to reference area of traction contact surface As be apparent from Table 4, in Examples 11–17, the oil retention volume Vo of the traction contact surface (the parameter of the special bearing curve according to DIN EN ISO 13565-1 and DIN EN ISO 13565-2) was within the range of $7\times10^{-6}$ (mm$^3$/mm$^2$) to $3\times10^{-4}$ (mm$^3$/mm$^2$), and the oil retention depth ratio K was within the range of 0.9–2.0. The oil retention volume Vo and the oil retention depth ratio K are expressed by the following formulas:

$$Vo=[(100-Mr2)\times Rvk(\mu m)]/200000 (mm^3/mm^2) \quad K=Rvk/Rk$$

wherein Mr2 indicates material portion, Rvk indicates reduced valley depth, and Rk indicates core roughness depth, as defined by DIN EN ISO 13565-2. Further, the satisfactory traction coefficients were exhibited.

In addition, as be apparent from Table 4, in Examples 11–14, it has been found that the traction coefficient can be improved while holding metal contact to a low level by employing the combination of dimples and top-flat lands or the combination of circumferential grooves and top-flat lands for the microstructure of the traction contact surface of the rolling element.

Moreover, as be apparent from Table 4, in Examples 13 and 14, it has been found that the traction coefficient can be further improved by making the ratio Sm/a of the mean space Sm between the irregularities of the traction contact surface as described as the parameter according to JIS B0601-1994, to a half a of a major axis diameter of a Hertzian contact ellipse, 0.08 or less.

In contrast, in Comparative Examples 2–6, the oil retention volume Vo was less than $7\times10^{-6}$ (mm$^3$/mm$^2$) and the oil retention depth ratio K was less than 0.9. As a result, the traction coefficients in Comparative Examples 2–6 were lower than those in Examples 11–17.

Next, Examples 18–24 and Comparative Example 7 are explained.

Examples 18–24

Rolling elements (flat test pieces) 24 were made of JIS SCM420H steel subjected to carburizing-quenching-tempering and formed to have a cylindrical shape having a diameter of 40 mm, a thickness of 20 mm and a flat cylindrical outer surface. After grinding and super finishing, the outer surface of each rolling elements (flat test pieces) 24 was subjected to ultra-precision cutting using a sintered cubic boron nitride (c-BN) tool having a round end having an R (radius) 200 $\mu$m under conditions that the cutting speed was 250 m/min, the feeding speed was 0.01–0.03 mm/rev, and the cutting depth in the radial direction was 0.003 mm. Subsequently, projections formed on the ground outer surface were machined by tape lapping to form the traction contact surface with the microstructure in the form of a combination of circumferential grooves parallel to the rotating direction of rolling element (flat test piece) 24 and top-flat lands. The production conditions and obtained characteristics of the traction contact surface of rolling element (flat test piece) 24 are shown in Table 6.

Rolling elements (crowning test pieces) 22 were made of JIS SCM420H steel subjected to carburizing-quenching-tempering and formed to a cylindrical shape having a diameter of 40 mm, a thickness of 20 mm and a crowning-shaped outer surface having an R 700 mm. The outer surface of each rolling element (crowning test piece) 22 was subjected to grinding and super finishing to form the traction contact surface which had an arithmetical mean roughness Ra of 0.021 $\mu$m and a maximum height Ry of 0.155 $\mu$m as shown in Table 7.

Thus-produced rolling elements (test pieces) 24 and 22 in Examples 18–24 were installed in the two-cylinder rolling tester 21 shown in FIG. 2 and the rolling slipping test was conducted under the same conditions as those in Example 1. The traction coefficients and oil film formation rates in Examples 18–24 were calculated at the slide/roll ratio of 5%. The maximum bearing pressure was 0.53 GPa in a Hertzian contact and the Hertzian contact ellipse had a minor axis diameter, i.e., a length extending parallel to the rotating direction of rolling elements 22 and 24, of 0.18 mm and a major axis diameter, i.e., a length extending perpendicular to the rotating direction of rolling elements 22 and 24, of 2.8 mm.

Comparative Example 7

Rolling element (flat test piece) 24 was produced in the same manner as described in Example 18 except that the ultra-precision cutting and tape lapping steps after the super finishing step were omitted. The arithmetical mean roughness Ra of the traction contact surface of thus-produced rolling element (flat test piece) 24 and the maximum height Ry thereof are shown in Table 6. Rolling element (crowning test piece) 22 was produced in the same manner as described in Example 18. The rolling slipping test and the calculation of traction coefficient and oil film formation rate were conducted in the same manner as described in Examples 18–24.

The ratios of the traction coefficients in respective Examples 18–24 to the traction coefficient in Comparative Example 7 are shown in Table 6 based on the traction coefficients obtained in Examples 18–24 and Comparative Example 7 at the slide/roll ratio of 5%. The ratios of the oil film formation rates in respective Examples 18–24 to the oil film formation rate in Comparative Example 7 are also shown in Table 6 based on the oil film formation rates obtained in Examples 18–24 and Comparative Example 7 at the slide/roll ratio of 5%.

TABLE 6

| | | | | | | | | | | | | TCR ratio vs. Com. | OFFR ratio vs. Com. |
|---|---|---|---|---|---|---|---|---|---|---|---|---|---|
| | Machining steps after heat treatment *1 | Surface microstructure *2 | Surface roughness Ra ($\mu$m) | Ry ($\mu$m) | K | Vo mm$^3$/mm$^2$ | Groove width ($\mu$m) | Groove pitch ($\mu$m) | Groove depth ($\mu$m) | Groove area ratio % | | Ex. 7 *3 | Ex. 7 *4 |
| Ex. 18 | G,SF,UPC,TL | G-L Comb. | 0.040 | 0.240 | 1.40 | 4.0E-05 | 2 | 10 | 0.4 | 20.0 | | 1.8 | 1.2 |
| Ex. 19 | G,SF,UPC,TL | G-L Comb. | 0.053 | 0.373 | 1.20 | 5.3E-05 | 4 | 15 | 0.4 | 26.7 | | 1.8 | 1.0 |

TABLE 6-continued

Flat test piece

|  | Machining steps after heat treatment *1 | Surface micro-structure *2 | Surface roughness Ra (μm) | Surface roughness Ry (μm) | K | Vo mm³/mm² | Groove width (μm) | Groove pitch (μm) | Groove depth (μm) | Groove area ratio % | TCR ratio vs. Com. Ex. 7 *3 | OFFR ratio vs. Com. Ex. 7 *4 |
|---|---|---|---|---|---|---|---|---|---|---|---|---|
| Ex. 20 | G,SF,UPC,TL | G-L Comb. | 0.088 | 0.613 | 1.30 | 8.8E-05 | 5 | 20 | 0.7 | 25.0 | 1.8 | 1.3 |
| Ex. 21 | G,SF,UPC,TL | G-L Comb. | 0.033 | 0.200 | 1.75 | 3.3E-05 | 5 | 15 | 0.2 | 33.3 | 1.7 | 1.1 |
| Ex. 22 | G,SF,UPC,TL | G-L Comb. | 0.150 | 1.275 | 1.30 | 1.5E-04 | 6 | 20 | 1.0 | 30.0 | 1.4 | 1.2 |
| Ex. 23 | G,SF,UPC,TL | G-L Comb. | 0.032 | 0.288 | 1.50 | 3.2E-05 | 8 | 25 | 0.2 | 32.0 | 1.5 | 1.0 |
| Ex. 24 | G,SF,UPC,TL | G-L Comb. | 0.033 | 0.333 | 1.76 | 3.3E-05 | 10 | 30 | 0.2 | 33.3 | 1.4 | 1.1 |
| Comp. Ex. 7 | G,SF | DC GM | 0.017 | 0.102 | 0.63 | 2.3E-06 | — | — | — | — | 1.0 | 1.0 |

Note:
*1: G: Grinding, SF: Super finishing, UPC: Ultra-precision cutting, TL: Tape lapping
*2: G-L: Combination of circumferential grooves and lands, DC GM: Discontinuous grinding marks
*3: Traction coefficient ratio: Example vs. Comparative Example 7
*4: Oil film formation rate ratio: Example vs. Comparative Example 7

TABLE 7

Crowning test piece

|  | Machining steps after heat treatment | Rolling surface micro-structure | Surface roughness Ra (μm) | Surface roughness Ry (μm) | K | Vo mm³/mm² |
|---|---|---|---|---|---|---|
| Ex. 18–24, Com. Ex. 7 | Grinding, Super finishing | Circumferential grinding marks | 0.021 | 0.155 | 0.63 | 1.6E-06 |

As be apparent from Table 6, in Examples 18–24, the microstructure of the traction contact surface of rolling element (flat test piece) 24 was in the form of the combination of circumferential grooves parallel with the rotating direction of rolling element (flat test piece) 24 and top-flat lands. The circumferential grooves had the width of 2–10 μm, the pitch of 10–30 μm and the depth of 0.1–1.0 μm. The oil retention volume Vo was within the range of $7 \times 10^{-6}$ to $3 \times 10^{-4}$ (mm³/mm²), and the oil retention depth ratio K was within the range of 0.9–2.0. Thus, the satisfactory traction coefficients were exhibited.

In addition, as a result of the surface roughness of the traction contact surface being such that the arithmetical mean roughness Ra is 0.03–0.13 μm or the maximum height Ry is 0.2–0.9 μm, the traction coefficient can be further improved and the effects can be sustained over time.

In contrast, in Comparative Example 7, the microstructure of the traction contact surface of rolling element (flat test piece) 24 was in the form of discontinuous grooves, the oil retention volume Vo was less than $7 \times 10^{-6}$ (mm³/mm²), and the oil retention depth ratio K was less than 0.9. The traction coefficient was exhibited as lower than those in Examples 18–24.

Next, Examples 25–35 and Comparative Examples 8–12 are explained.

Examples 25–35 and Comparative Examples 8–11

Rolling elements (flat test pieces) 24 were made of JIS SCr420H steel (chromium steel) subjected to carburizing-quenching-tempering, JIS SCM420 steel subjected to carburizing-quenching-tempering, JIS SCM420H steel subjected to carbonitriding-quenching-tempering, JIS SUJ2 steel subjected to quenching-tempering and JIS SUJ2 steel subjected to carbonitriding-quenching-tempering. Rolling elements (flat test pieces) 24 were formed to a cylindrical shape having a diameter of 40 mm, a thickness of 20 mm and a flat cylindrical outer surface. After grinding, the outer surfaces of rolling elements (flat test pieces) 24 were subjected to precision groove cutting using polycrystalline c-BN tools having tool blade tips as indicated in Table 8, to form circumferential grooves and projections between the grooves therein. The circumferential grooves were in the form of a spiral groove extending along the rotating direction of rolling element (flat test piece) 24 at equal intervals. Subsequently, the projections formed on the outer surface were machined by tape lapping to form top-flat lands of a desired shape. The traction contact surface of rolling element (flat test piece) 24 was thus obtained.

Rolling elements (crowning test pieces) 22 were made of JIS-SUJ2 steel subjected to quenching-tempering and formed to a cylindrical shape having a diameter of 40 mm, a thickness of 20 mm and a crowning-shaped outer surface having an R (radius) 700 mm. After grinding, the outer surface was finished by tape lapping to form a traction contact surface that had an arithmetical mean roughness Ra of 0.01 μm and a maximum height Ry of 0.1 μm.

The unfiltered primary profile curves of the traction contact surfaces of rolling elements (test pieces) 24 and 22 in Examples 25–35 and Comparative Examples 8–11 were measured using the surface roughness tester as used in Example 11, which was set at equal longitudinal and lateral magnifications. The unfiltered primary profile curves of the traction contact surfaces of rolling elements (flat test pieces) 24 in Examples 25–35 are shown in FIGS. 3–13, while the unfiltered primary profile curves of the traction contact surfaces of rolling elements (flat test pieces) 24 in Comparative Examples 8–11 are shown in FIGS. 14–17. In addition, the unfiltered primary profile curves of the traction contact surfaces of rolling elements (crowning test pieces) 22 in Examples 25–35 end Comparative Examples 8–11 are shown in FIG. 18.

Thus-produced rolling elements (test pieces) 22 and 24 in Examples 25–35 and Comparative Examples 8–11 were subjected to the rolling slipping test using two-cylinder rolling tester 21 shown in FIG. 2. The structure of two-cylinder rolling tester 21 is described above and therefore a detailed explanation thereof is omitted. In the test, the slide/roll ratio was 0–5%, the mean rotation velocities were 1.1 m/s and 5.2 m/s, and the mean shaft rotation numbers were 500 rpm and 2500 rpm (the sum of the rotation numbers of main shaft 23 and driven shaft 25 were 1000 rpm and 5000 rpm, respectively), and the rotation velocity was constant by uniformly applying a differential to main shaft 23 and driven shaft 25. The rolling contact between both rolling elements (test pieces) 22 and 24 was conducted in oil bath 33 containing a traction oil set at 100° C. Nissan CVT fluid KTF-1 (Extroid CVT-exclusive traction fluid) was used as the traction oil. The vertical load generated by the pressure applied by air cylinder 32 was set at 150 N. The maximum bearing pressure was 0.53 GPa in a Hertzian contact and the Hertzian contact ellipse had a minor axis diameter, i.e., a length extending parallel to the rotating direction of rolling elements 22 and 24, of 0.18 mm and a major axis diameter, i.e., et length extending perpendicular to the rotating direction of rolling elements 22 and 24, of 2.8 mm. The traction coefficients in Examples 25–35 and Comparative Examples 8–11 were calculated at the slide/roll ratio of 5%.

Comparative Example 12

Rolling element (flat test piece) 24 was made of JIS SUJ2 steel subjected to quenching-tempering and formed to a cylindrical shape having a diameter of 40 mm, a thickness of 20 mm and a flat cylindrical outer surface. After grinding, the outer surface was subjected to super finishing to form a traction contact surface. The unfiltered primary profile curve of the traction contact surface of rolling element (flat test piece) 24 was obtained in the same manner as described in Examples 25–35 and Comparative Examples 8–11. The unfiltered primary profile curve is shown in FIG. 19.

Rolling element (crowning test piece) 22 was made of JIS SUJ2 steel subjected to quenching-tempering and formed to a cylindrical shape having a diameter of 40 mm, a thickness of 20 mm and a crowning-shaped outer surface having an R (radius) 700 mm. After grinding, the outer surface was subjected to super finishing to form a traction contact surface. The unfiltered primary profile curve of the traction contact surface of the traction contact surface of rolling element (crowning test piece) 22 was obtained in the same manner as described in Examples 25–35 and Comparative Examples 8–11. The unfiltered primary profile curve is shown in FIG. 20. The rolling slipping test and the calculation of traction coefficient were conducted in the same manner as described in Examples 25–35 and Comparative Examples 8–11.

The production conditions and obtained characteristics of rolling element (flat test piece) 24 in Examples 25–35 and Comparative Examples 8–12 are shown in Table 8. The production conditions and obtained characteristics of rolling element (crowning test piece) 22 in Examples 25–35 and Comparative Examples 8–12 are shown in Table 9. The traction coefficients obtained in Examples 25–35 and Comparative Examples 8–12 at the slide/roll ratio of 5% also are shown in Table 9.

TABLE 8

| | Flat test piece | | | | | | | | | |
|---|---|---|---|---|---|---|---|---|---|---|
| | Machining | | | | Unfiltered primary profile curve shape/dimensions | | | | | |
| | Material | Heat treatment *1 | *2 | Tool blade tip shape during groove cutting *3 | Abrasive grain diameter during tape lapping (μm) | Shape above center line | Depth *4 (μm) | Ry (μm) | Proportion of recesses *5 (%) | LL/LR ratio *6 | Adjacent recesses pitch *7 (μm) |
| Ex. 25 | SUJ2 | Q,T | G,PGC,TL | R tip chamfered, R of curv. 0.05 mm | 2 | Sinusoidal or chamfered | 0.9 | 0.88 | 41 | 1.4 | 44 |
| Ex. 26 | SCM420 | C,Q,T | G,PGC,TL | R tip chamfered, R of curv. 0.05 mm | 2 → 0.5 | Chamfered trapezoid | 1.2 | 1.12 | 29 | 2.5 | 87 |
| Ex. 27 | SCr420H | C,Q,T | G,PGC,TL | R tip chamfered, R of curv. 0.05 mm, worn by approx. 0.5 μm | 2 | Sinusoidal | 1.2 | 1.18 | 57 | 0.8 | 44 |
| Ex. 28 | SUJ2 | CN,Q,T | G,PGC,TL | C tip chamfered, chamfer width 0.01 mm | 2 | Sinusoidal | 1.2 | 1.27 | 48 | 1.1 | 25 |
| Ex. 29 | SCM420H | CN,Q,T | G,PGC,TL | R tip chamfered, R of curv. 0.05 mm | 2 | Rounded triangle | 1.1 | 1.15 | 49 | 1.1 | 37 |
| Ex. 30 | SUJ2 | Q,T | G,PGC,TL | R tip chamfered, R of curv. 0.05 mm | 2 | Rounded triangle | 1.7 | 1.45 | 52 | 0.9 | 52 |
| Ex. 31 | SUJ2 | Q,T | G,PGC,TL | R tip chamfered, R of curv. 0.05 mm | 2 → 1 | Rounded triangle | 0.6 | 0.63 | 39 | 1.5 | 33 |
| Ex. 32 | SUJ2 | Q,T | G,PGC,TL | C tip chamfered, chamfer width 0.01 mm | 2 → 1 | Chamfered trapezoid | 1.5 | 1.2 | 30 | 2.3 | 99 |
| Ex. 33 | SUJ2 | Q,T | G,PGC,TL | C tip chamfered, chamfer width 0.01 mm | 2 | Rounded triangle | 0.5 | 0.44 | 56 | 0.8 | 68 |
| Ex. 34 | SUJ2 | Q,T | G,PGC,TL | R tip chamfered, R of curv. 0.05 mm | 2 → 0.5 | Chamfered trapezoid | 1.5 | 0.95 | 23 | 3.4 | 131 |
| Ex. 35 | SUJ2 | Q,T | G,PGC,TL | C tip chamfered, chamfer width 0.01 mm | 2 | Chamfered trapezoid | 1.3 | 0.84 | 17 | 5.0 | 149 |
| Com. Ex. 8 | SUJ2 | Q,T | G,PGC,TL | R tip chamfered, R of curv. 0.05 mm | 2 → 1 | Chamfered trapezoid | 0.75 | 0.309 | 13 | 7.0 | 200 |
| Com. Ex. 9 | SUJ2 | Q,T | G,PGC,TL | C tip chamfered, chamfer width 0.01 mm | 2 → 1 | Circular arc | 0.2 | 0.22 | 33 | 2.0 | 42 |

TABLE 8-continued

| | | | | | | | | | | | |
|---|---|---|---|---|---|---|---|---|---|---|---|
| Com. Ex. 10 | SUJ2 | Q,T | G,PGC, TL | R tip chamfered, R of curv. 0.05 mm | 2 | Rounded triangle | 0.15 | 0.11 | 35 | 1.8 | 71 |
| Com. Ex. 11 | SUJ2 | Q,T | G,PGC, TL | C tip chamfered, chamfer width 0.01 mm | 2 → 0.5 | Circular arc | 0.1 | 0.14 | 29 | 2.5 | 21 |
| Com. Ex. 12 | SUJ2 | Q,T | G,SF (Ra 0.02 μm) | — | — | — | — | 0.098 | — | — | — |

Flat test piece

Unfiltered primary profile curve shape/dimensions

| | Rz of top of land *8 (nm) | Recess width *9 (μm) | Direction of grooves | Groove length | Radius of curvature (mm) |
|---|---|---|---|---|---|
| Ex. 25 | 33 | 18 | Substantially parallel (spiral) | Completely continuous | 0.96 |
| Ex. 26 | 43 | 25 | Substantially parallel (spiral) | Completely continuous | 9.01 |
| Ex. 27 | 27 | 25 | Substantially parallel (spiral) | Completely continuous | 0.6 |
| Ex. 28 | 53 | 12 | Substantially parallel (spiral) | Completely continuous | 0.3 |
| Ex. 29 | 44 | 18 | Substantially parallel (spiral) | Completely continuous | 0.2 |
| Ex. 30 | 60 | 27 | Substantially parallel (spiral) | Completely continuous | 0.1 |
| Ex. 31 | 32 | 13 | Substantially parallel (spiral) | Completely continuous | 0.24 |
| Ex. 32 | 55 | 30 | Substantially parallel (spiral) | Completely continuous | 4.5 |
| Ex. 33 | 23 | 38 | Substantially parallel (spiral) | Completely continuous | 2 |
| Ex. 34 | 29 | 30 | Substantially parallel (spiral) | Completely continuous | 170 |
| Ex. 35 | 48 | 25 | Substantially parallel (spiral) | Completely continuous | 98 |
| Com. Ex. 8 | 28 | 25 | Substantially parallel (spiral) | Completely continuous | 267 |
| Com. Ex. 9 | 37 | 14 | Substantially parallel (spiral) | Completely continuous | 4 |
| Com. Ex. 10 | — | 25 | Substantially parallel (spiral) | Completely continuous | 20 |
| Com. Ex. 11 | — | 6 | Substantially parallel (spiral) | Completely continuous | 3.03 |
| Com. Ex. 12 | — | — | — | — | — |

Note:
*1: C: Carburizing, Q: Quenching, T: Tempering, CN: Carbonitriding
*2: G: Grinding, PGC: Precision groove cutting, TL: Tape lapping, SF: Super finishing
*3: R of curv.: Radius of curvature
*4: Depth from top of top-flat land to bottom of recess
*5: Proportion of recesses when cut on center line
*6: LL: length of top-flat land, LR: length of recess
*7: Interval between adjacent recesses
*8: Ten-point mean roughness Rz of top of top-flat land
*9: Length of recesses (grooves) when cut on center line

TABLE 9

| | | | | | Performance test results of crowing test piece | | | | | |
|---|---|---|---|---|---|---|---|---|---|---|
| | | | | | Test conditions | | | | | |
| | | | | | Bearing pressure: 0.5 GPa, Oil temp.: 100° C., Rolling speed: 5.2 m/s | | Bearing pressure: 0.5 GPa, Oil temp.: 100° C., Rolling speed: 1.1 m/s, Slide/roll ratio: 5% | | Bearing pressure: 1.2 GPa, Oil temp.: 140° C., Rolling speed: 5.2 m/s, Slide/roll ratio: 5% | |
| | Crowning test piece | | | | | Divisional ratio of | | Divisional ratio of | | Divisional ratio of |
| | Material | Heat treatment *1 | Machining *2 | Surface roughness | Traction coefficient | voltage (%) | Traction coefficient | voltage (%) | Traction coefficient | voltage (%) |
| Ex. 25 | SUJ2 | Q,T | G,TL (2 μm) | Ra 0.01 μm | 0.0903 | 86 | 0.0968 | 83.1 | 0.0957 | 63.2 |
| Ex. 26 | SUJ2 | Q,T | G,TL (2 μm) | Ra 0.01 μm | 0.0721 | 77 | 0.0804 | 75.9 | 0.0842 | 77.1 |
| Ex. 27 | SUJ2 | Q,T | G,TL (2 μm) | Ra 0.01 μm | 0.0981 | 41.8 | 0.1063 | 40.7 | 0.0965 | 40.8 |
| Ex. 28 | SUJ2 | Q,T | G,TL (2 μm) | Ra 0.01 μm | 0.1031 | 56.3 | 0.1073 | 67.4 | 0.0967 | 56.5 |
| Ex. 29 | SUJ2 | Q,T | G,TL (2 μm) | Ra 0.01 μm | 0.1006 | 60.8 | 0.1092 | 72.9 | 0.0965 | 40.3 |
| Ex. 30 | SUJ2 | Q,T | G,TL (2 μm) | Ra 0.01 μm | 0.0982 | 65.9 | 0.1016 | 76.9 | — | — |
| Ex. 31 | SUJ2 | Q,T | G,TL (2 μm) | Ra 0.01 μm | 0.0645 | 90.9 | 0.0987 | 84 | — | — |
| Ex. 32 | SUJ2 | Q,T | G,TL (2 μm) | Ra 0.01 μm | 0.0634 | 92.1 | 0.0707 | 88.5 | — | — |
| Ex. 33 | SUJ2 | Q,T | G,TL (2 μm) | Ra 0.01 μm | 0.0511 | 92.8 | 0.0654 | 89.1 | — | — |
| Ex. 34 | SUJ2 | Q,T | G,TL (2 μm) | Ra 0.01 μm | 0.0517 | 92.8 | 0.0541 | 90.3 | — | — |
| Ex. 35 | SUJ2 | Q,T | G,TL (2 μm) | Ra 0.01 μm | 0.0541 | 95.2 | 0.0536 | 91.2 | — | — |
| Com. Ex. 8 | SUJ2 | Q,T | G,TL (2 μm) | Ra 0.01 μm | 0.0438 | 97.7 | 0.0417 | 94.9 | — | — |
| Com. Ex. 9 | SUJ2 | Q,T | G,TL (2 μm) | Ra 0.01 μm | 0.0295 | 90.9 | 0.0406 | 92 | — | — |
| Com. Ex. 10 | SUJ2 | Q,T | G,TL (2 μm) | Ra 0.01 μm | 0.0248 | 97.1 | 0.0339 | 94.7 | — | — |
| Com. Ex. 11 | SUJ2 | Q,T | G,TL (2 μm) | Ra 0.01 μm | 0.0232 | 96.2 | 0.0281 | 83.3 | — | — |
| Com. Ex. 12 | SUJ2 | Q,T | G,SF (Ra 0.02 μm) | Ra 0.02 μm | 0.0317 | 98.7 | 0.0358 | 88.4 | 0.0688 | 84 |

Note:
*1: Q: Quenching, T: Tempering,
*2: G: Grinding, TL: Tape lapping, SF: Super finishing As be apparent from Table 8, the height difference between the top of each top-flat land and the bottom of each recess of the unfiltered primary profile curve in Examples 25–35 was within a range of 0.5–2.5 μm. The radius of curvature at the top portion of each top-flat land of the unfiltered primary profile curve in Examples 25–35 was within a range of 0.1–170 mm. The radius of curvature is preferably within a range of 0.8–170 mm, and more preferably within a range of 0.8–10 mm.

As be apparent from Table 9, the satisfactory traction coefficients were exhibited in Examples 25–35. In contrast, the traction coefficients lower than those in Examples 25–35 were exhibited in Comparative Examples 8–12.

Next, Examples 36–41 and Comparative Example 13 are explained.

Examples 36–39

Driven-side rolling elements (flat test pieces) 52 were made of JIS SUJ2 steel subjected to quenching-tempering, JIS SCM420 steel subjected to carburizing-quenching-tempering, JIS SCr420H steel subjected to carburizing-quenching-tempering, JIS SUJ2 steel subjected to carbonitriding-quenching-tempering, respectively, as shown in Table 10. Driven-side rolling elements (flat test pieces) 52 were formed to a cylindrical shape having a diameter of 60 mm, a thickness of 10 mm and a flat cylindrical outer surface. After grinding, the outer surfaces of driven-side rolling elements (flat test pieces) 52 were subjected to precision groove cutting using polycrystalline c-BN tools having tool blade tips as indicated in Table 10, respectively, to form circumferential grooves and projections between the grooves therein. The circumferential grooves were spirally formed along the rotating direction of rolling element (flat test pieces) 52 at equal intervals, after which the projections were machined by tape lapping to form top-flat lands of desired shapes as indicated in Table 10. The traction contact surfaces of rolling elements (flat test pieces) 52 were thus obtained. The unfiltered primary profile curves of the traction contact surfaces of driven-side rolling elements (flat test pieces) 52 in Examples 35–39 are shown in FIGS. 33–36.

Drive-side rolling elements (crowning test pieces) 54a–54c were made of JIS-SUJ2 steel subjected to quenching-tempering and formed to a cylindrical shape having a diameter of 60 mm, a thickness of 10 mm and a crowning-shaped outer surface having an R (radius) 30 mm. After grinding, the outer surface was finished by tape lapping to form a, traction contact surface that had an arithmetical mean roughness Ra of 0.01 μm. The traction contact surfaces of rolling elements (crowning test pieces) 54a–54c were thus obtained.

Figure 37:
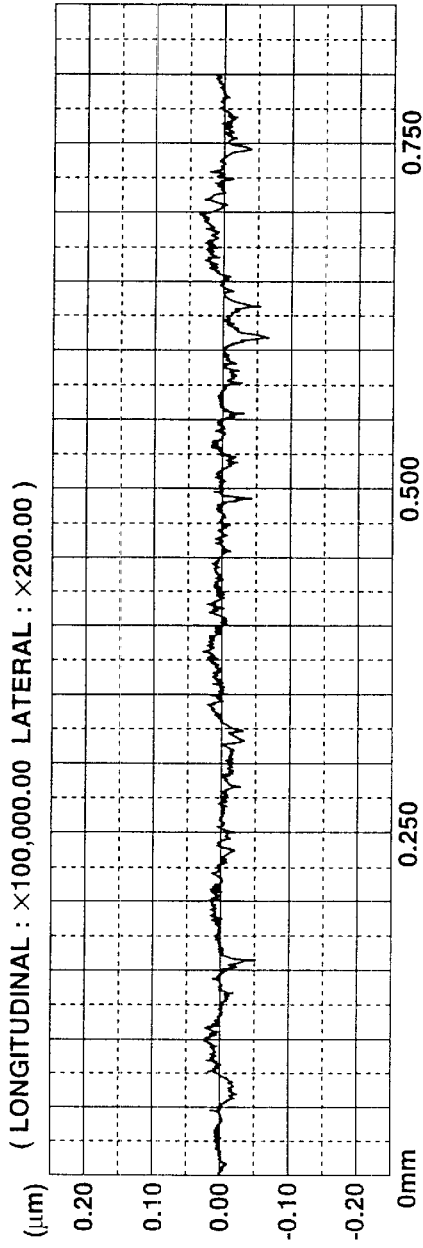
FIG. 37 is a graph showing an unfiltered primary profile curve of the traction contact surface of the other of the rolling elements in Examples 36–39.

The unfiltered primary profile curve of the traction contact surface of one of drive-side rolling elements (crowning test pieces) 54a–54c in Examples 36–39 is shown in FIG. 37.

Figure 32:
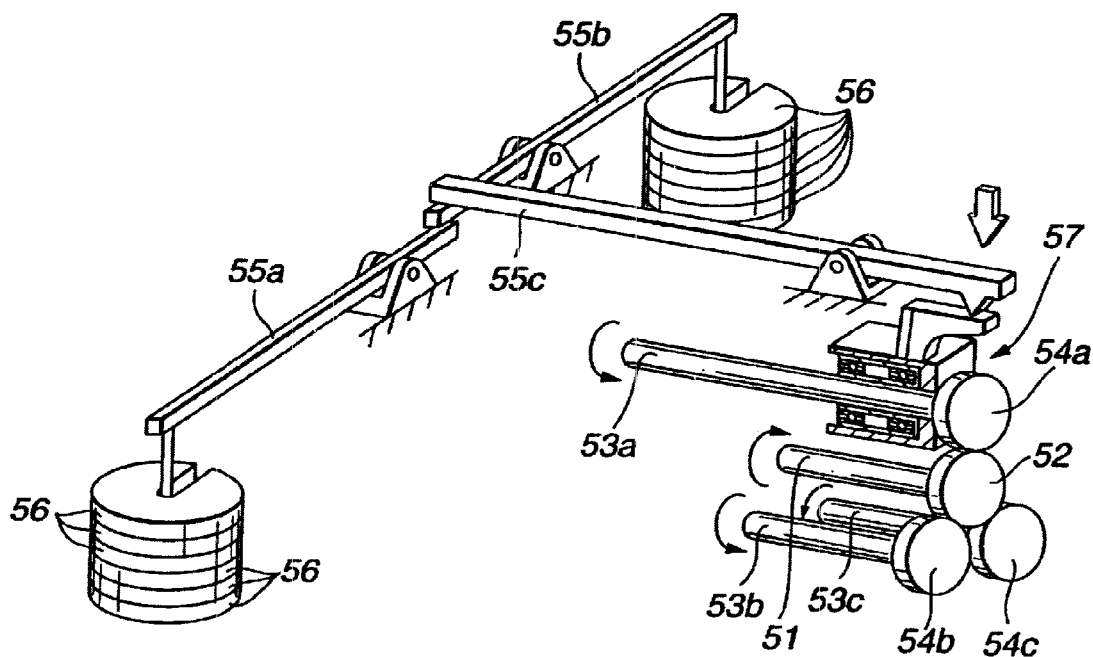
FIG. 32 is a schematic diagram showing a four-cylinder rolling tester used for testing the traction contact surfaces of the rolling elements.
Figure 35:
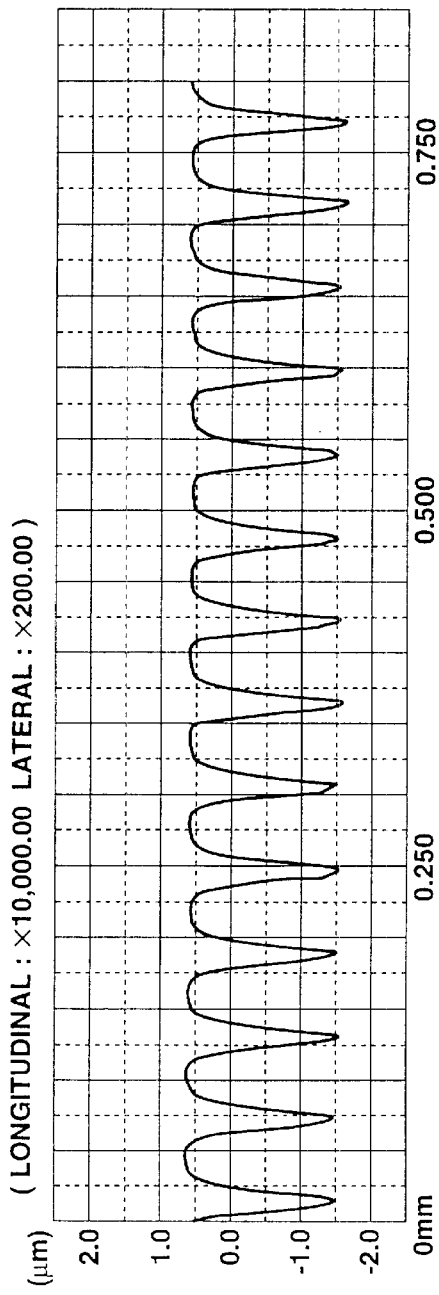
FIG. 35 is a graph showing an unfiltered primary profile curve of the traction contact surface of one of the rolling elements in Example 38.
Figure 36:
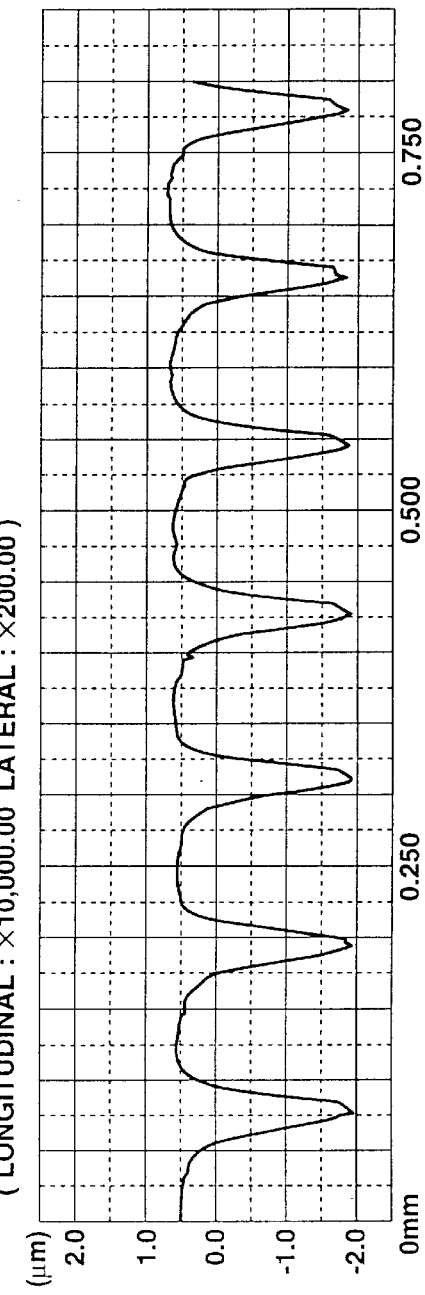
FIG. 36 is a graph showing an unfiltered primary profile curve of the traction contact surface of one of the rolling elements in Example 39.

Thus-produced rolling elements (test pieces) 52 and 54a–54c in Examples 36–39 were subjected to the rolling slipping test using four-cylinder rolling tester shown in FIG. 32. The traction coefficients in Examples 36–39 were calculated at the slide/roll ratios of 1% and 3%.

As illustrated in FIG. 32, the four-cylinder rolling tester includes rotating shaft 51 supporting driven-side rolling element 52, and three parallel rotating shafts 53a–53c respectively supporting three drive-side rolling elements 54a–54c. An outer circumferential surface of driven-side rolling element 52 is urged to be in contact with outer circumferential surfaces of drive-side rolling elements 54a–54c by applying load to one (rotating shaft 53a) of rotating shafts 53a–53c using a pressure-applying mechanism. The pressure-applying mechanism includes three arms 55a–55c arranged to form a T-shape and swingably supported in a vertical direction. Two arms 55a and 55b are linearly disposed such that inner ends thereof are mutually overlapped in alignment relation. Outer ends of arms 55a and 55b suspend weights 56. Remaining arm 55c has one end disposed on an upper side of the overlapped inner ends of arms 55a and 55b and an opposite end contacted with pressure-applying portion 57 provided on rotating shaft 53a supporting drive-side rolling element 54a. In the thus-constructed four-cylinder rolling tester, right and left weights 56 as viewed in FIG. 32 act on pressure-applying portion 57 via arms 55a–55c so that drive-side rolling elements 54a–54c are pressed onto the outer circumferential surface of driven-side rolling element 52. The traction coefficient can be calculated by measuring the torque generated on rotating shaft 51 supporting driven-side rolling element 52. In the test of Examples 35–39, the rotation velocity was 30 m/s, the shaft rotation number was 10000 rpm and the slide/roll ratio was 0–3% and a differential was applied to the driven side. The maximum bearing pressure was 2.82 GPa in a Hertzian contact and the Hertzian contact ellipse had a minor axis diameter, i.e., a length extending parallel to the rotating direction of rolling elements 52 and 54a–54c, of 1.3 mm and a major axis diameter, i.e., a length extending perpendicular to the rotating direction rolling elements 52 and 54a–54c, of 2.1 mm. The oil temperature of Nissan CVT fluid KTF-1 (Extroid CVT-exclusive traction fluid) was 150° C.

Example 40

Figure 40:
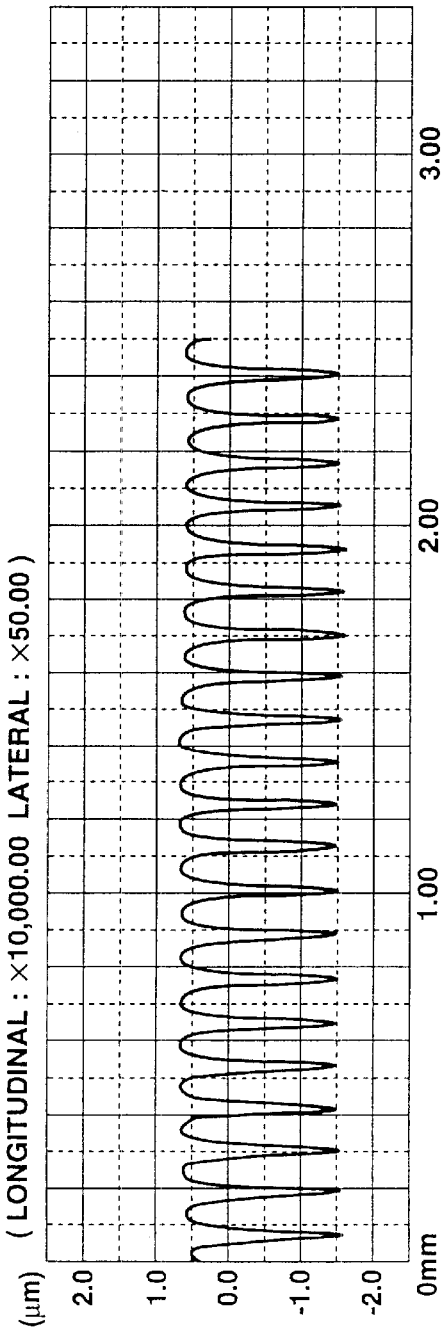
FIG. 40 is a graph showing an unfiltered primary profile curve of the traction contact surface of one of the rolling elements in Example 40.
Figure 41:
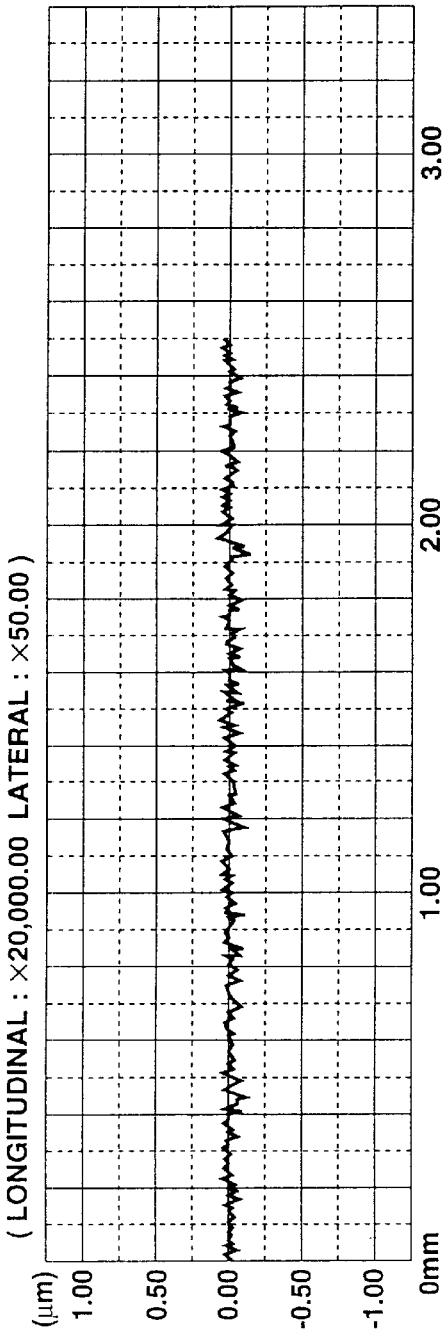
FIG. 41 is a graph showing an unfiltered primary profile curve of the traction contact surface of the other of the rolling elements in Example 40.
Figure 42:
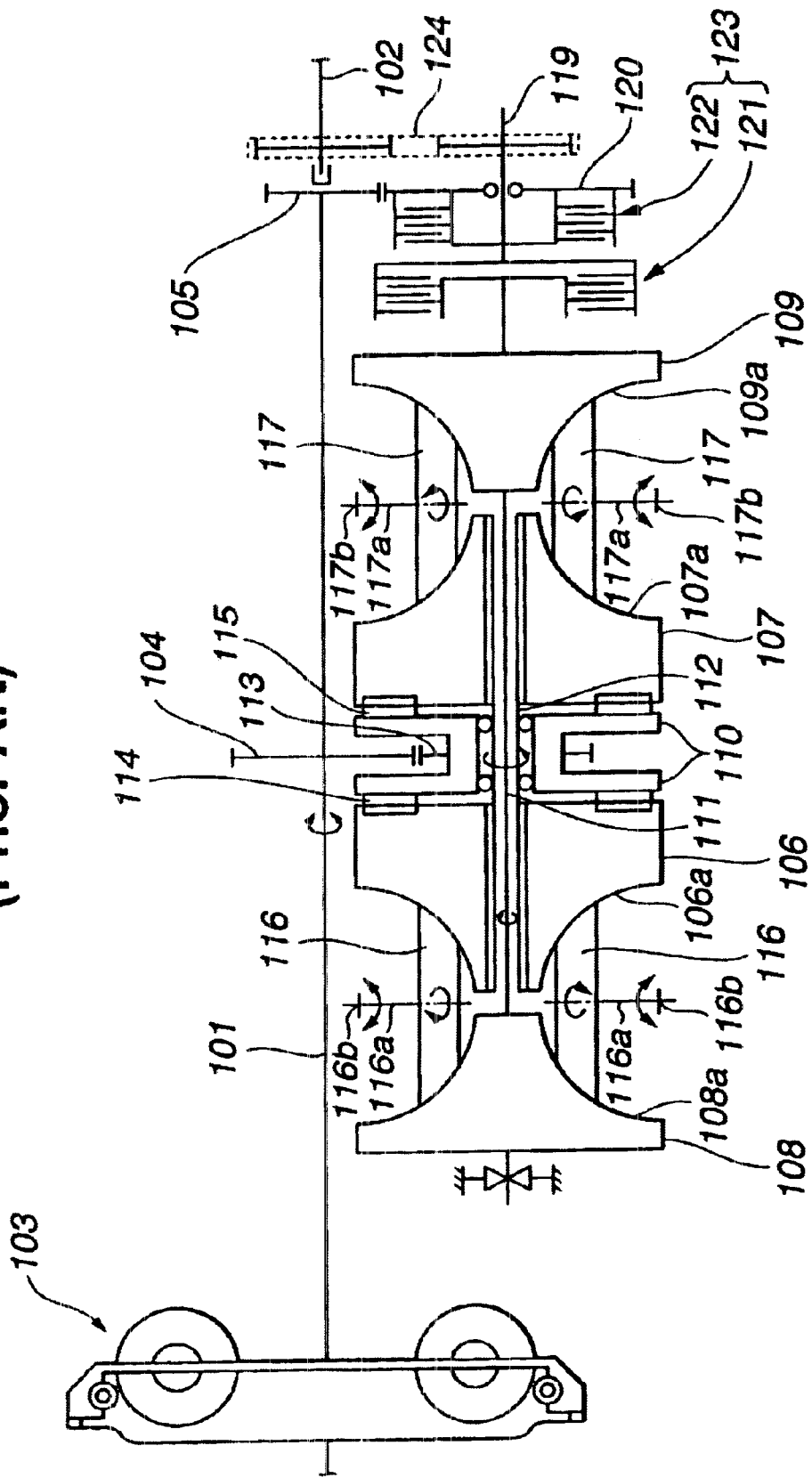
FIG. 42 is an explanatory diagram showing a toroidal type CVT.

Driven-side rolling element (flat test piece) 52 was made of JIS SCM420H steel subjected to carburizing-quenching-tempering and produced in the same manner as indicated in Example 39 in Table 10. The traction contact surface of driven-side rolling element (flat test piece) 52 was thus obtained. The unfiltered primary profile curve of the traction contact surface of driven-side rolling element (flat test piece) 52 is shown in FIG. 40. Drive-side rolling elements (crowning test pieces) 54a–54c were made of the same material as that of driven-side rolling element (flat test piece) 52 and produced in the same manner as in Examples 36–39 except that the outer surface was subjected to super finishing after grinding so that the traction contact surface had an arithmetical mean roughness Ra of 0.03 μm. The traction contact surfaces of drive-side rolling elements (crowning test pieces) 54a–54c were thus obtained. One of the unfiltered primary profile curves of the traction contact surfaces of drive-side rolling elements (crowning test pieces) 54a–54c is shown in FIG. 41. The rolling slipping test and the calculation of traction coefficients were conducted in the same manner as described in Examples 36–39.

Example 41

Driven-side rolling element (flat test piece) 52 was made of the same material as that used in Example 40 and produced in the same manner as described in Example 40. The traction contact surface of driven-side rolling element (flat test piece) 52 was thus obtained. Drive-side rolling elements (crowning test pieces) 54a–54c were made of the same material as that of driven-side rolling element (flat test piece) 52 and produced in the same manner as described in Example 40 except that the traction contact surface had an arithmetical mean roughness Ra of 0.05 μm by the super finishing after grinding. The traction contact surfaces of drive-side rolling elements (crowning test pieces) 54a–54c were thus obtained. The rolling slipping test and the calculation of traction coefficients were conducted in the same manner as described in Examples 36–39.

Comparative Example 13

Figure 38:
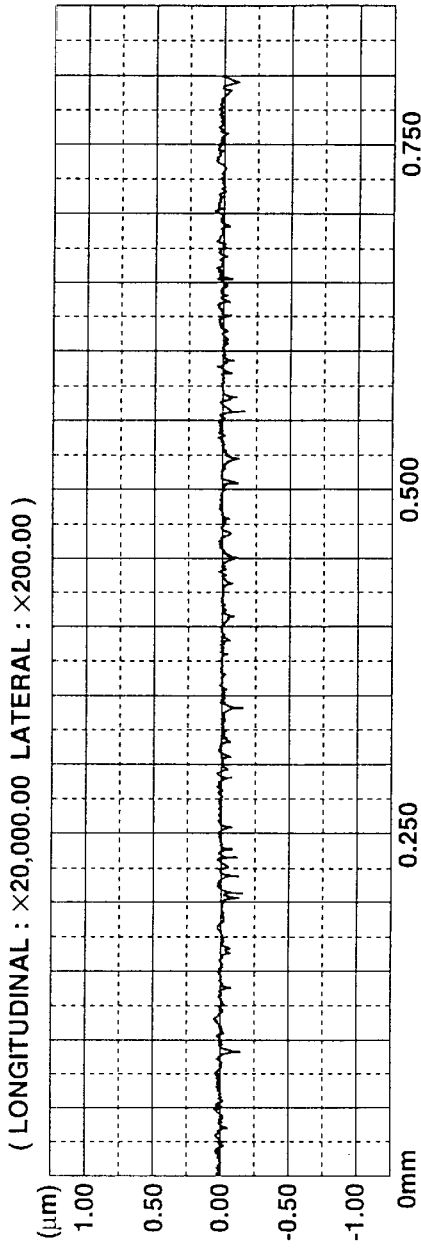
FIG. 38 is a graph showing an unfiltered primary profile curve of the traction contact surface of one of the rolling elements in Comparative Example 13.
Figure 39:
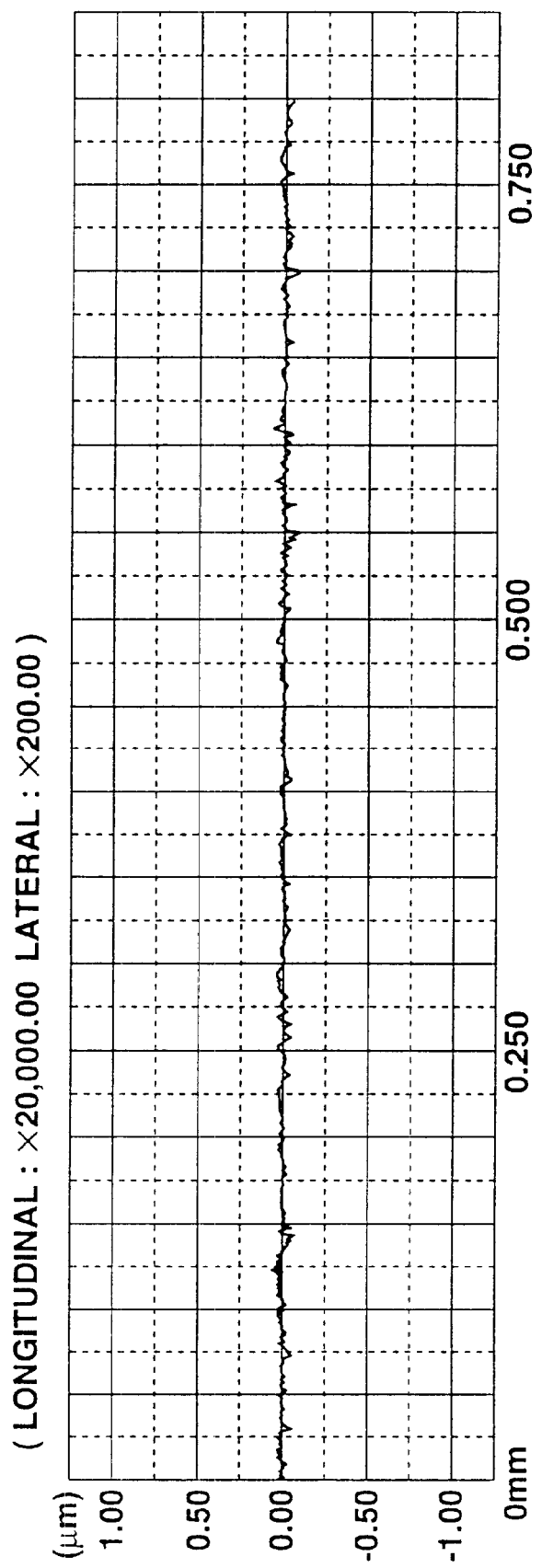
FIG. 39 is a graph showing an unfiltered primary profile curve of the traction contact surface of the other of the rolling elements in Comparative Example 13.

Driven-side rolling element (flat test piece) 52 was made of JIS SUJ2 steel subjected to quenching-tempering and formed to a cylindrical shape having a diameter of 60 mm, a thickness of 10 mm and a flat cylindrical outer surface. After grinding, the outer surface was subjected to super finishing to form a traction contact surface. The unfiltered primary profile curve of the traction contact surface of rolling element (flat test piece) 52 is shown in FIG. 38. Drive-side rolling elements (crowning test pieces) 54a–54c were made of JIS-SUJ2 steel subjected to quenching-tempering and formed to a cylindrical shape having a diameter of 60 mm, a thickness of 10 mm and a crowning-shaped outer surface having an R 30 mm. After grinding, the outer surface was subjected to super finishing to form a traction contact surface. One of the unfiltered primary profile curves of the traction contact surfaces of rolling elements (crowning test pieces) 54a–54c is shown in FIG. 39. The rolling slipping test and the calculation of traction coefficients were conducted in the same manner as described in Examples 36–39.

The production conditions, obtained characteristics and traction coefficients in Examples 36–41 and Comparative Example 13 are shown in Table 10.

TABLE 10

| | | | | | Flat test piece | | | | | | |
|---|---|---|---|---|---|---|---|---|---|---|---|
| | | | | Machining | | | | | | | |
| | | | | | | Abrasive grain | Unfiltered primary profile curve shape/dimensions | | | | |
| | Material | Heat treatment *1 | *2 | Tool blade tip shape during groove cutting *3 | | diameter during tape lapping (μm) | Shape above center line | Depth *4 (μm) | Ry (μm) | Proportion of recesses *5 (%) | LL/LR ratio *6 | Adjacent recesses pitch *7 (μm) |
| Ex. 36 | SUJ2 | Q,T | G,PGC, TL | C tip chamfered, chamfer width 0.01 mm | | 2 | Crowning or chamfered trapezoid | 2 | 2.01 | 28 | 2.6 | 43 |
| Ex. 37 | SCM420 | C,Q,T | G,PGC, TL | R tip chamfered, R of curv. 0.05 mm | | 2 | Elliptic arc or sinusoidal | 2.5 | 1.63 | 34 | 1.9 | 88 |

TABLE 10-continued

| | | | | | | | | | | |
|---|---|---|---|---|---|---|---|---|---|---|
| Ex. 38 | SCr420H | C,Q,T | G,PGC, TL | C tip chamfered, chamfer width 0.01 mm | 2 | Crowning or chamfered trapezoid | 2.2 | 1.81 | 34 | 1.9 | 58 |
| Ex. 39 | SUJ2 | CN,Q,T | G,PGC, TL | R tip chamfered, R of curv. 0.05 mm | 2 | Chamfered trapezoid | 2.5 | 1.35 | 32 | 2.1 | 117 |
| Ex. 40 | SCM420H | C,Q,T | G,PGC, TL | R tip chamfered, R of curv. 0.05 mm | 2 | Chamfered trapezoid | 2.2 | 2.3 | 32 | 2.1 | 117 |
| Ex. 41 | SCM420H | C,Q,T | G,PGC, TL | R tip chamfered, R of curv. 0.05 mm | 2 | Chamfered trapezoid | 2.2 | 2.3 | 32 | 2.1 | 117 |
| Com. Ex. 13 | SUJ2 | Q,T | G,SF (Ra 0.02 μm) | — | — | — | — | 0.098 | — | — | — |

| | Flat test piece | | | | Crowning test piece Ratio of recess (groove) to diameter of Hertzian contact ellipse | | |
|---|---|---|---|---|---|---|---|
| | Unfiltered primary profile curve shape/dimensions | | | | Recess pitch/ major axis diameter *10 (%) | Recess length/ major axis diameter *11 (%) | Recess length/ minor axis diameter *12 (%) |
| | Rz of top of land *8 (nm) | Recess width *9 (μm) | Direction of grooves | Groove length | | | |
| Ex. 36 | 32 | 12 | Substantially parallel (spiral) | Completely continuous | 2.1 | 0.6 | 0.9 |
| Ex. 37 | 39 | 30 | Substantially parallel (spiral) | Completely continuous | 4.3 | 1.4 | 2.3 |
| Ex. 38 | 49 | 20 | Substantially parallel (spiral) | Completely continuous | 2.8 | 1.0 | 1.6 |
| Ex. 39 | 55 | 38 | Substantially parallel (spiral) | Completely continuous | 5.7 | 1.8 | 3.0 |
| Ex. 40 | 43 | 38 | Substantially parallel (spiral) | Completely continuous | 5.7 | 1.8 | 3.0 |
| Ex. 41 | 43 | 38 | Substantially parallel (spiral) | Completely continuous | 5.7 | 1.8 | 3.0 |
| Com. Ex. 13 | — | — | — | — | — | — | — |

| | Crowning test piece | | | | Performance test results of crowning test piece Test conditions | |
|---|---|---|---|---|---|---|
| | | | | | Bearing pressure: 2.8 GPa, Oil temp.: 150° C., Rolling speed: 30 m/s Slide/roll ratio: 1% Traction coefficient | Bearing pressure: 2.8 GPa, Oil temp.: 150° C., Rolling speed: 30 m/s, Slide/roll ratio: 3% Traction coefficient |
| | Material | Heat treatment *13 | Machining *14 | Surface roughness | | |
| Ex. 36 | SUJ2 | Q,T | G,TL (2 μm) | Ra 0.01 μm | 0.09 | 0.084 |
| Ex. 37 | SUJ2 | O,T | G,TL (2 μm) | Ra 0.01 μm | 0.087 | 0.08 |
| Ex. 38 | SUJ2 | Q,T | G,TL (2 μm) | Ra 0.01 μm | 0.088 | 0.082 |
| Ex. 39 | SUJ2 | Q,T | G,TL (2 μm) | Ra 0.01 μm | 0.087 | 0.078 |
| Ex. 40 | SCM420H | C,Q,T | G,SF (Ra 0.03 μm) | Ra 0.03 μm | 0.088 | 0.079 |
| Ex. 41 | SCM420H | C,Q,T | G,SF (Ra 0.05 μm) | Ra 0.05 μm | 0.088 | 0.079 |
| Com. Ex. 13 | SUJ2 | Q,T | G,SF (Ra 0.02 μm) | Ra 0.02 μm | 0.081 | 0.068 |

Note:
*1: C: Carburizing, Q: Quenching, T: Tempering, CN: Carbonitriding
*2: G: Grinding, PGC: Precision groove cutting, TL: Tape lapping, SF: Super finishing
*3: R of curv.: Radius of curvature
*4: Depth from top of top-flat land to bottom of recess
*5: Proportion of recesses when cut on center line
*6: LL: length of top-flat land, LR: length of recess
*7: Interval between adjacent recesses
*8: Ten-point mean roughness Rz of top of top-flat land
*9: Length of recess (groove) when cut on center line
*10: Ratio of pitch of grooves to major axis diameter extending perpendicular to rotating direction of crowing test piece
*11: Ratio of length of groove to major axis diameter extending perpendicular to rotating direction of crowing test piece
*12: Ratio of length of gooove to minor axis diameter extending parallel to rotating direction of crowing test piece
*13: C: Carburizing, Q: Quenching, T: Tempering
*14: G: Grinding, TL: Tape lapping, SF: Super finishing As be seen from Table 10, the good traction coefficients in Examples 36–41 were exhibited and the traction coefficients in Comparative Example 13 which were lower than those in Examples 36–41 were exhibited. Further, it has been found that the ratio of the pitch of the grooves to the major axis diameter of the Hertzian contact ellipse made at the maximum load, which extends perpendicular to the rotating direction of the rolling element, is within the range of 1.2–9%. The ratio of the pitch of the grooves to the major axis diameter of the Hertzian contact ellipse made at the maximum load is preferably within a range of 2.4–6%. It has been also found that, with respect to the center line separated into segments by crossing with the unfiltered primary profile curve, the ratio of the length of each segment corresponding to the groove to the major axis diameter of the Hertzian contact ellipse made at the maximum load, which extends perpendicular to the rotating direction of the rolling element, is within the range of 0.6–2%. Further, it has been found that the ratio of the length of the segment corresponding to the groove to the minor axis diameter of the Hertzian contact ellipse made at the maximum load, which extends parallel to the rotating direction of the rolling element, is within the range of 0.8–3.2%. Furthermore, it has been noted that the recesses extend longer than at least the minor axis diameter of the Hertzian contact ellipse.

Example 42 now is explained.

Example 42

Two driven-side rolling elements (flat test pieces) 52 were produced so as to have a cylindrical shape having a flat cylindrical outer surface. One of driven-side rolling elements 52 was subjected to super finishing to ford a traction contact surface having an arithmetical mean roughness Ra of 0.08. The other of driven-side rolling elements 52 was subjected to super finishing to form the outer surface having an arithmetical mean roughness Ra of 0.1–0.12. After that, the outer surface of the other of driven-side rolling elements 52 was subjected to roller burnishing and observed at intervals with respect to the surface roughness and repeatedly subjected to roller burnishing until the arithmetical mean roughness Ra thereof became 0.08. The other of driven-side rolling elements 52 had thus-formed traction contact surface having the arithmetical mean roughness Ra of 0.08. Drive-side rolling elements (crowning test pieces) 54a–54c were produced so as to have the crowning-shaped traction contact surface having an R 5 mm and the arithmetical mean roughness Ra of 0.02.

The rolling slipping test was conducted using the four-cylinder rolling tester shown in FIG. 32 under the following conditions. The mean bearing pressure was 0.71 GPa. The traction oil temperature was 150° C. The rotation velocity was 30 m/s. The slide/roll ratio was 3%. The traction coefficients in rolling elements (test pieces) 52 and 54a–54c were calculated. As a result, the traction coefficient in one of driven-side rolling elements (flat test pieces) 52 was 0.059, while the traction coefficient in the other of driven-side rolling elements (flat test pieces) 52 was 0.08. It has been found that the traction coefficient can be improved by forming the traction contact surface smoothened by roller burnishing.

In addition, an endurance test of Example 42 was conducted using the four-cylinder rolling tester shown in FIG. 32. The test conditions were that the mean bearing pressure was 3.51 GPa, the traction oil temperature was 120° C., the rotation velocity was 30 m/s, and the slide/roll ratio was 3%. As a result, it has been found that the life of the other of driven-side rolling elements (flat test pieces) 52 was 1.4 times the life of one of driven-side rolling elements (flat test pieces) 52.

Figure 21:
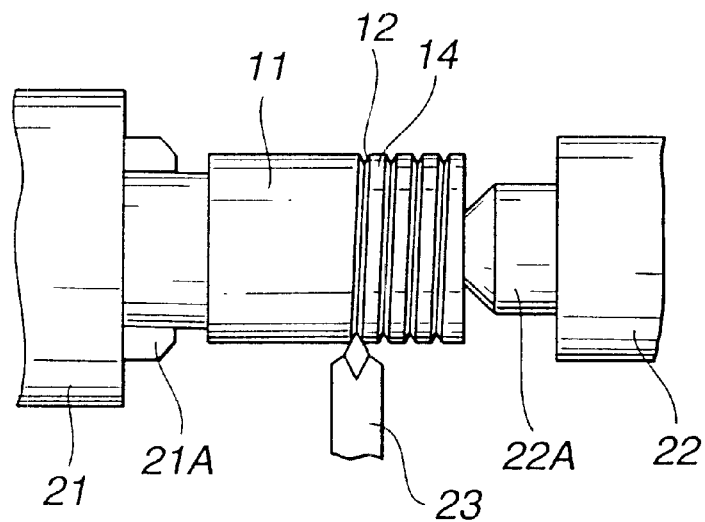
FIG. 21 is a side view of an apparatus that forms recesses in an outer surface of the rolling element in one embodiment of the present invention.
Figure 22:
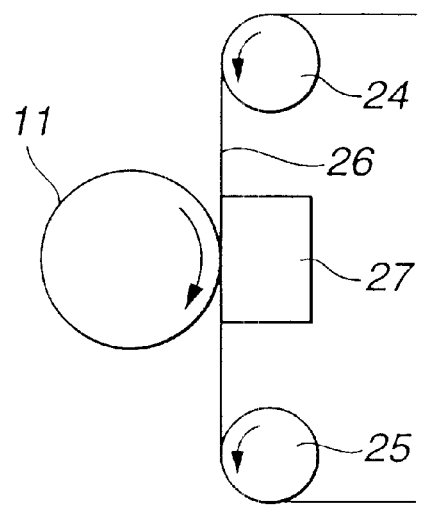
FIG. 22 is a side view of an apparatus that machines projections in the outer surface of the rolling element.
Figure 23A:
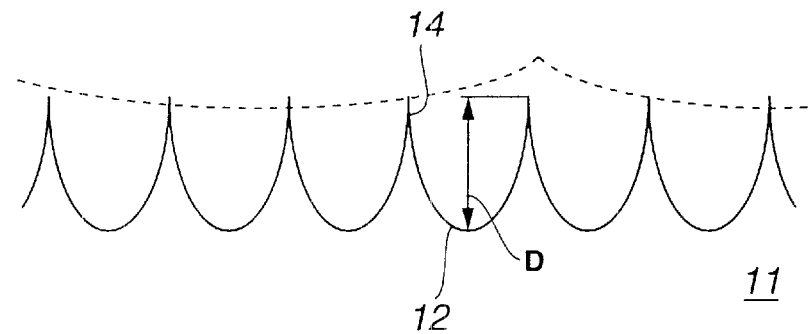
FIG. 23A is an explanatory diagram showing a profile of the recesses and projections formed with the apparatus shown in FIG. 21.
Figure 23B:
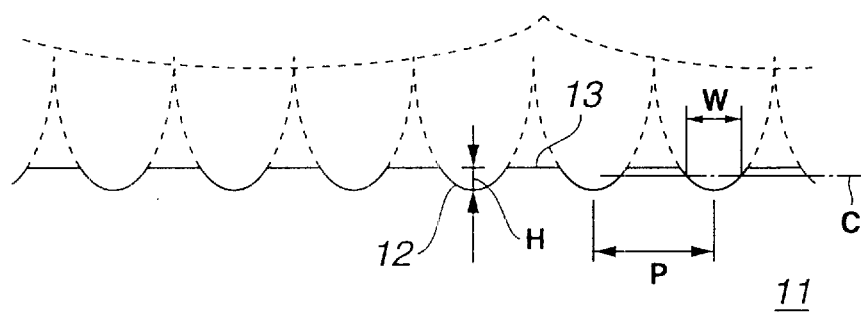
FIG. 23B is an explanatory diagram showing a profile of the recesses and top-flat lands formed with the apparatus shown in FIG. 22.

FIGS. 21, 22, 23A and 23B show one embodiment of the rolling element of the traction drive rotary assembly of the invention and a process for the rolling element, according to the present invention. In FIGS. 21–23B, rolling element 11 is in the form of a cylinder an outer circumferential surface of which is formed into a traction contact surface. FIG. 23A shows a schematic profile of the outer circumferential surface of rolling element 11 and FIG. 23B shows a schematic profile of the traction contact surface of rolling element 11.

As illustrated in FIG. 23A, recesses 12 having a depth D are formed at equal intervals in the outer circumferential surface of rolling element 11. The depth D is 10 μm or less. Alternately arranged recesses 12 and projections 14 are thus formed. Specifically, as shown in FIG. 21, one end of rolling element 11 is rotatably supported by chuck 21A of main pillow block 21, and the other end of rolling element 11 is rotatably supported by center 22A of tail stock 22. Tool 23 for cutting or grinding is fed at a constant speed in the direction of a center axis of rolling element 11, while rotating rolling element 11 around the center axis. To this end, recesses 12 are formed in a spiral groove shape in the outer circumferential surface of rolling element 11. Thus, recesses 12 and projections 14 are alternately formed at equal intervals in the outer circumferential surface of rolling element 11. At this time, a polycrystalline c-BN tool having a sharp blade tip end (e.g., R (radius) 50 μm), diamond tool or coating tool covered with TiN or the like, may be used as tool 23. The blade tip end of tool 23 may be of at least one shape selected from a single R (radius), a trapezoidal shape, a V-shape and a complex R. Tool 23 may have a width of 4–150 μm at a location spaced from the blade tip end by 0.5–2.5 μm. Tool 23 also may have a round blade tip end having R of 0.2 mm or less. Although recesses 12 and projections 14 are shown to an enlarged scale in FIG. 21, they are actually fine irregularities. The broken lines in FIGS. 23A and 23B denote the profile of the outer circumferential surface before recesses 12 and projections 14 are formed.

Subsequently, projections 14 of the outer circumferential surface of rolling element 11 are machined to form top-flat lands 13 such that the height difference H shown in FIG. 23B, between recesses 12 and top-flat lands 13 is 0.5–2.5 μm, and preferably 0.8–1.2 μm. Specifically, as shown in FIG. 22, lapping film 26 having aluminum oxide particles having a particle diameter of 3 μm is stretched over a pair of feed rollers 24 and 25. The outer circumferential surface of rolling element 11 is brought into contact with lapping film 26, and at the same time lapping film 26 is pressed against rolling element 11 by back shoe 27. Rolling element 11 is rotated around the center axis as indicated by the arrows in FIG. 22, while lapping film 26 is fed in one direction indicated by the arrows, by feed rollers 24 and 25. To this end, the traction contact surface having recesses 12 and top-flat lands 13 is formed on rolling element 11. By the grinding using lapping film 26, the top portion of each land 13 may of a flat profile shape or a crowning profile shape on one side thereof. If necessary, the profile shape of top-flat lands 13 can be suitably adjusted by reversing the feeding direction of lapping film 26 or the rotating direction of rolling element 11.

In the traction contact surface of thus-obtained rolling element 11, recesses 12 and top-flat lands 13 are continuously formed along the direction of rotation of rolling element 11, namely, the circumferential direction thereof, and recesses 12 and top-flat lands 13 are alternately formed at equal intervals. In the alternate arrangement, the height difference between recesses 12 and top-flat lands 13, is 0.5–2.5 μm. Recesses 12 are formed such that, with respect to center line C shown in FIG. 23B, which is separated into segments by crossing with the unfiltered primary profile curve, a ratio of a total length of the segments corresponding to the recesses 12 to a reference length of center line C, is within the range of 15–60%. Center line C is a line drawn at an average height determined by integrating the unfiltered primary profile curve in the direction of length. Further, recesses 12 are formed such that pitch P thereof shown in FIG. 23B is 10–150 μm and length (width) W thereof shown in FIG. 23B is 10–40 μm. Pitch P is a length extending between bottoms of adjacent recesses 12 along center line C. Length W is a length of the segment of center line C which corresponds to recess 12 of the unfiltered primary profile curve. Top-flat lands 13 are formed such that the top portions have a ten-point mean roughness Rz of 100 nm or less, and more preferably 40 nm or less. As a result, in comparison with conventional rolling elements which have on their surface random grinding marks formed by machining such as super finishing, rolling element 11 has excellent traction characteristics allowing the transmission of large motive power.

Further, in the case of this embodiment, recesses 12 are formed in a spiral groove shape in advance of the following grinding. The formation of spiral groove-shaped recesses 12 can facilitate crushing and dropping of abrasive particles along with discharge of cuttings during the subsequent grinding step so that the grinding also can be conducted efficiently with a good cutting edge at all times. Moreover, the trapezoidal lands 13 having chamfered corners and crowning-shaped lands 13 can be formed with high accuracy without being affected by the magnitude of the intervals between recesses 12.

Figure 24:
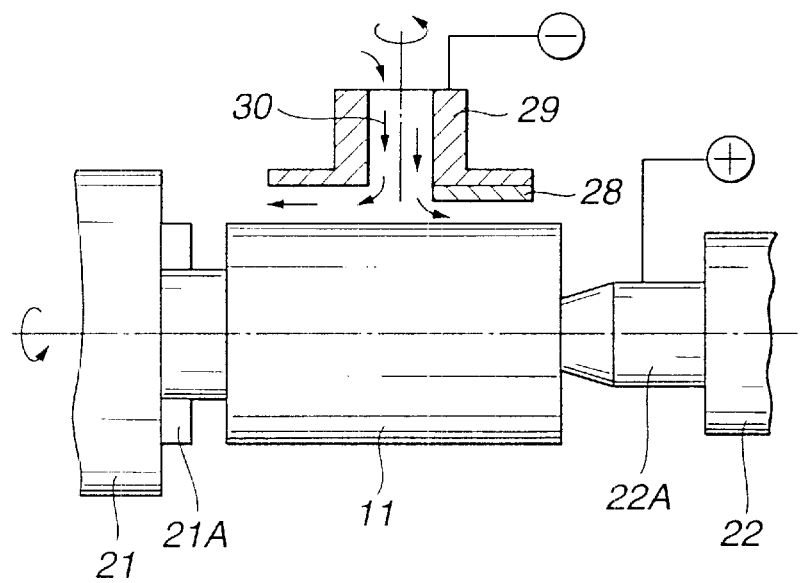
FIG. 24 is an explanatory diagram showing a side view of an apparatus that performs electrolytic polishing on the outer surface of the rolling element in another embodiment of the present invention.
Figure 25:
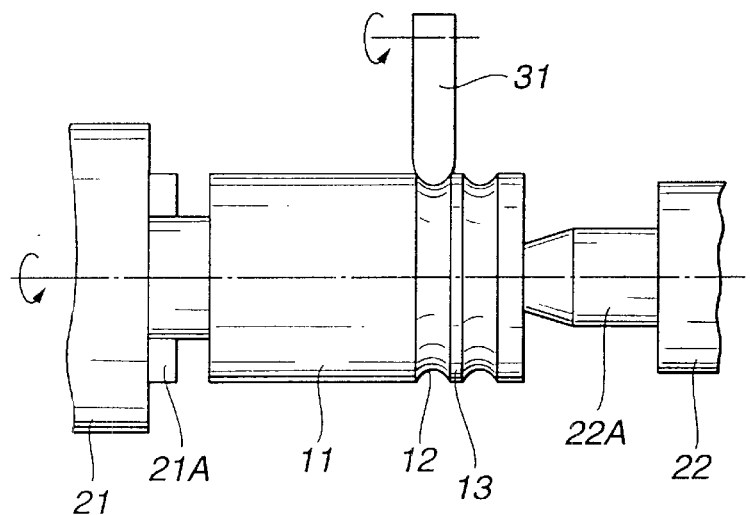
FIG. 25 is an explanatory diagram showing a side view of an apparatus that forms the recesses in the outer surface of the rolling element after the electrolytic polishing of FIG. 24.

FIGS. 24 and 25 illustrate another embodiment of the rolling element arid a process therefor, according to the present invention.

As shown in FIG. 24, the outer circumferential surface of rolling element 11 is formed by electrolytic polishing so as to have a ten-point mean roughness Rz of 100 nm or less, and preferably 40 nm or less. Specifically, rolling element 11 is rotatably supported by chuck 21A of main pillow block 21 and center 22A of :ail stock 22 and disposed on the anode side. Electrolyte 30 is supplied to the outer circumferential surface of rolling element 11 from electrolyte supply unit 29 with grindstone 28 on the cathode side. The outer circumferential surface of rolling element 11 thus is subjected to mirror polishing. In this case, the surface roughness of the outer circumferential surface of rolling element 11 is measured with an interatomic microscope. By thus forming the outer circumferential surface of rolling element 11, top-flat lands 13 to be formed in the following recess-forming step, have top portions having a ten-point mean roughness Rz of not more than 100 nm or not more than 40 nm.

Subsequently, as shown in FIG. 25, recesses 12 are formed in the outer circumferential surface of rolling element 11. Recesses 12 are formed at equal intervals in the direction of the center axis of rolling element 11 using, for example, thin-blade grindstone 31 having a generally circular arc shape in section, such that recesses 12 have a depth of 0.5–2.5 μm. Rolling element 11 and grindstone 31 are moved relative to each other in the direction of the center axis of rolling element 11 and in the direction perpendicular to the center axis, while rolling element 11 is rotated around the axis of rotation with chuck 21A of main pillow block 21 and center 22A of tail stock 22. The generally circular arc shape may include arc portions of two circles having different centers and joined together. In FIG. 25, each recess 12 is in the form of a groove continuously extending in the circumferential direction of rolling element 11. Recess 12 may also be in the form of a spiral groove. The traction contact surface having alternately arranged recesses 12 and top-flat lands 13 thus is formed in rolling element 11.

Rolling element 11 of the traction drive rotary assembly thus can be obtained in this embodiment, which has excellent traction characteristics as well as the above-described embodiment does.

Figure 26A:
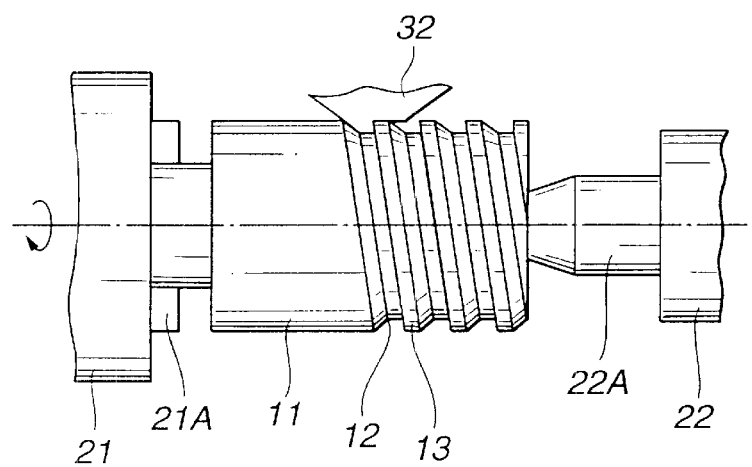
FIG. 26A is an explanatory diagram showing a side view of an apparatus and a tool which are used for simultaneously forming the recesses and the top-flat lands in the outer surface of the rolling element in still another embodiment of the present invention.
Figure 26B:
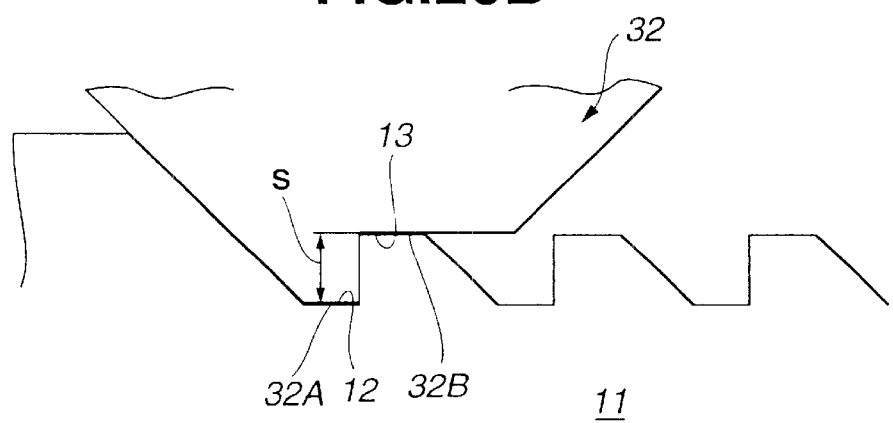
FIG. 26B is an enlarged side view of a blade tip portion of the tool.

FIGS. 26A and 26B show still another embodiment of the rolling element and a process therefor, according to the present invention.

As illustrated in FIG. 26A, recesses 12 and top-flat lands 13 are simultaneously formed in a spiral shape in an outer circumferential surface of rolling element 11 using tool 32 having cutting blades 32A and 32B shown in FIG. 26B, respectively corresponding to recesses 12 and top-flat lands 13, while rotating rolling element 11 around the axis of rotation with chuck 21A of main pillow block 21 and center 22A of tail stock 22. As illustrated in FIG. 26B, there is a step S between cutting blades 32A and 32B. The step S is 0.5–2.5 μm and extends in a direction perpendicular to the center axis of rolling element 11. In this embodiment, rolling element 11 having excellent traction characteristics can be obtained as described in the above embodiments and recesses 12 and top-flat lands 13 having a predetermined dimensional relationship can be efficiently formed in a short period of time.

Figure 27:
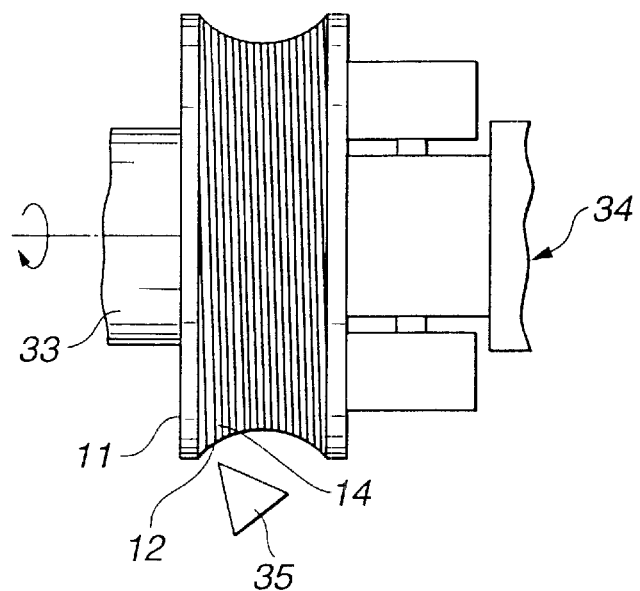
FIG. 27 is an explanatory diagram showing a side view of an apparatus that forms the recesses in the outer surface of the rolling element in still another embodiment of the present invention.
Figure 28:
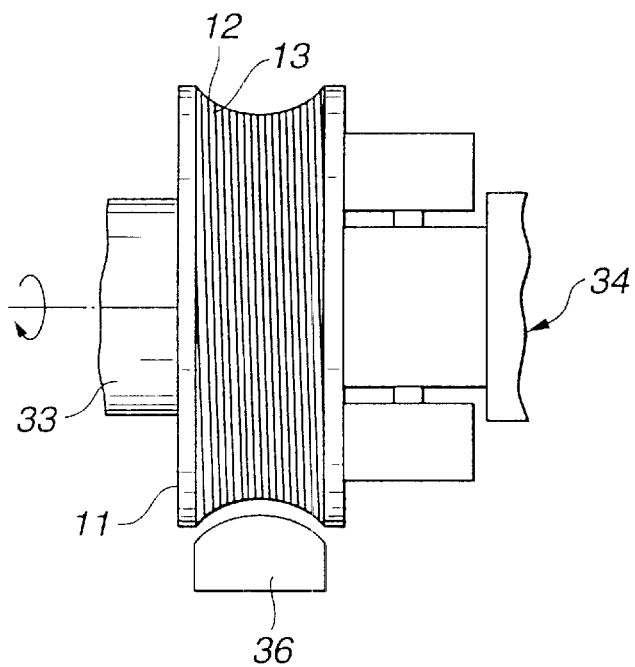
FIG. 28 is an explanatory diagram showing a side view of an apparatus that machines the projections after the formation of the recesses in FIG. 27.
Figure 29A:
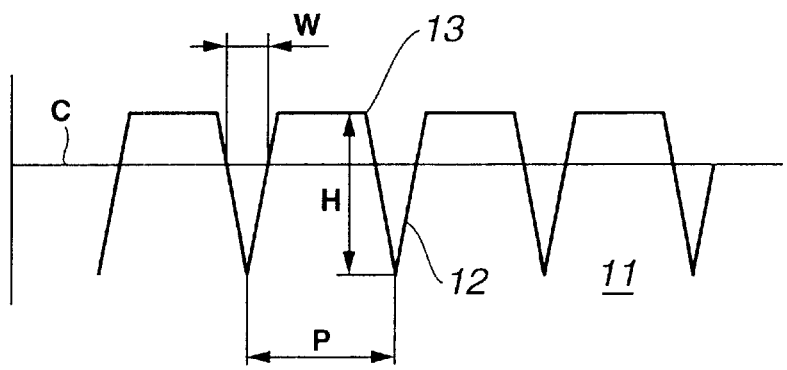
FIGS. 29A–29C are explanatory diagrams showing different shapes of the profile of the traction contact surface of the rolling element.
Figure 29B:
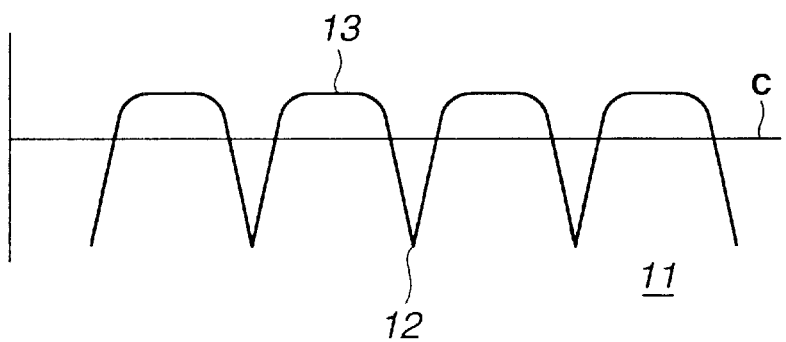
Figure 29C:
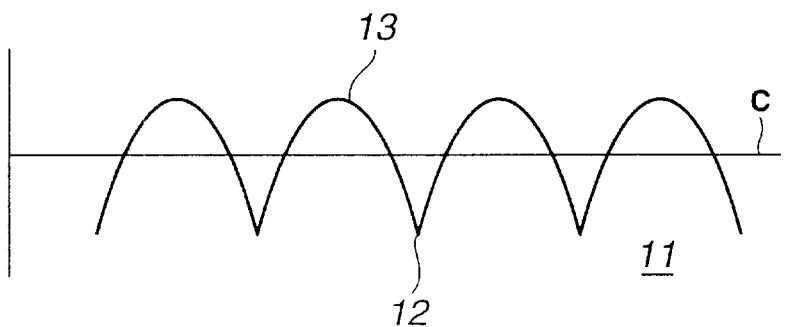
Figure 30A:
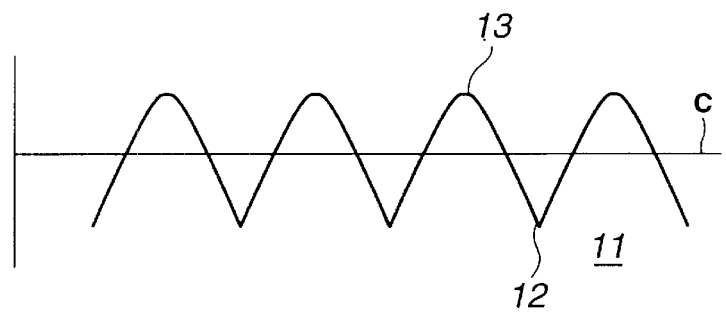
FIGS. 30A–30B are explanatory diagrams similar to those of FIGS. 29A–29C, but showing further different shapes of the profile of the traction contact surface of the rolling element.
Figure 30B:
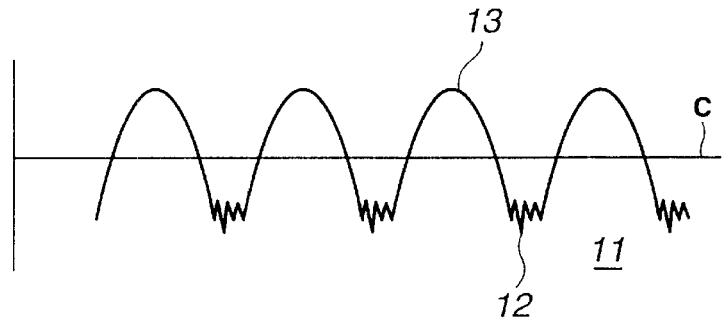
Figure 31A:
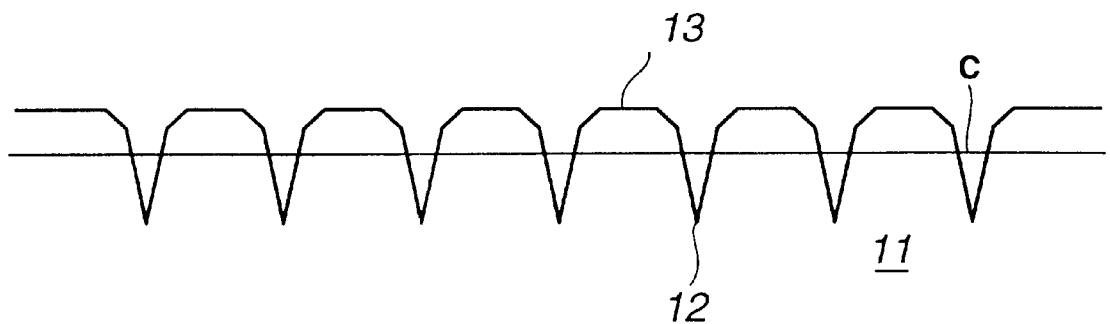
FIGS. 31A–31C are explanatory diagrams similar to those of FIGS. 29A–29C and 30A–30C, but showing still further different shapes of the profile of the traction contact surface of the rolling element.
Figure 31B:
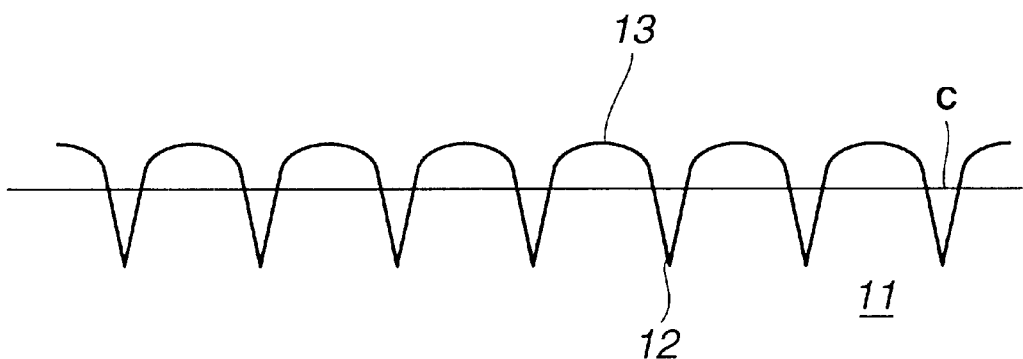
Figure 31C:
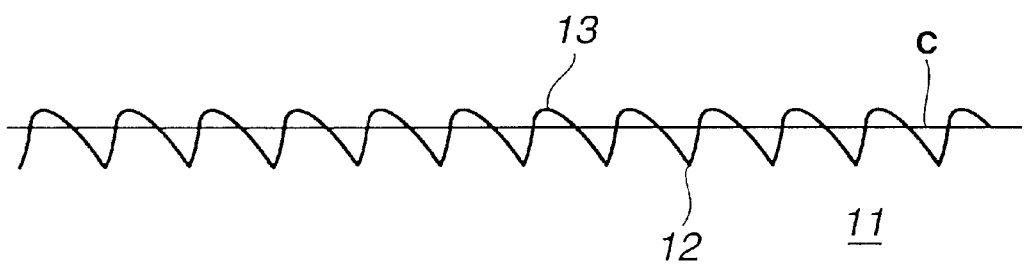

FIGS. 27 and 28 show still another embodiment of the rolling element and a process therefor, according to the present invention.

Rolling element 11 has an outer circumferential surface having an arcuate cross-section recessed toward the center axis of rolling element 11. As shown in FIG. 27, rolling element 11 is rotatably supported on both sides thereof by a pair of holders 33 and 34. Recesses 12 are formed in a spiral groove shape in the outer circumferential surface of rolling element 11 using a cutting or grinding tool 35. Grinding tool 35 and rolling element 11 are relatively moved in the direction of the center axis of rolling element 11 with keeping the contact therebetween, while rolling element 11 is rotated around the axis of rotation. To this end, projections 14 are formed between recesses 12 on the outer circumferential surface of rolling element 11. Subsequently, projections 14 are subjected to super finishing using elastic grindstone 36 shown in FIG. 28, containing a phenol-based binder and having a mean abrasive grain diameter of 12 μm, while rotating rolling element 11 around the axis of rotation with holders 33 and 34. Thus, top-flat lands 13 are formed and the traction contact surface having alternately arranged recesses 12 and top-flat lands 13. Similar to the above-explained embodiments, rolling element 11 produced in this embodiment can exhibit excellent traction characteristics.

The process for recesses 12 and top-flat lands 13 are not limited to the processes described in the above embodiments. Recesses 12 may be formed by shot peening, grinding, cutting, blasting, laser machining or etching. Top-flat lands 13 may be formed by lapping, mirror polishing, super finishing, cutting, grinding, electrolytic, polishing or roller burnishing. In particular, top-flat lands 13 may be formed using a fixed abrasive grain tool, such as a grindstone or lapping film, having abrasive grains of a mean grain diameter of 9 μm or less, or using an elastic grindstone bound with rubber or an elastic grindstone bound with a resin such as epoxy resin or PVA, having a mean abrasive grain diameter of 30 μm or less.

FIGS. 29A–31C show examples of shapes of recesses 12 and top-flat lands 13 of the unfiltered primary profile curve of the traction contact surface of rolling element 11. Examples of shapes of top-flat lands 13 located higher than center line C include a generally trapezoidal shape shown in FIG. 29A, a generally trapezoidal shape with rounded corners shown in FIG. 29B, a generally elliptic arc or sinusoidal shape shown in FIG. 29C, and a generally triangular shape with a rounded apex shown in FIG. 30A. Examples of shapes of top-flat lands 13 also include a generally trapezoidal shape with chamfered corners shown in FIG. 31A, a generally crowning shape shown in FIG. 31B, and the one-sided crowning shape formed by lapping shown in FIG. 31C. There are no limitations on a shape of bottoms of recesses 12, and the shape of bottoms thereof may have fine irregularities shown in FIG. 30B.

Further, in the traction contact surface of rolling element 11, the height difference H between the top of top-flat land 13 and the bottom of recess 12 of the unfiltered primary profile curve is 0.5–2.5 μm, and preferably 0.8–1.2 μm, and also preferably 2.0–2.5 μm. With respect to center line C separated into segments by crossing with the unfiltered primary profile curve, the ratio of a total length of the segments corresponding to recesses 12 to a reference length of center line C is within a range of 15–60%, preferably 30–57%, more preferably 25–40% and further more preferably 27–30%. The pitch P of recesses 12 along center line C is within a range of 10–150 μm, and preferably 40–120 μm. The surface roughness of top portions of top-flat lands 13 is within a range of Rz 100 nm or less, and preferably Rz 40 nm or less. The length (width) W of recess 12, namely, a length of the segment of center line C, which corresponds to recess 12, is 10–40 μm. With the arrangement of recesses 12 and top-flat lands 13 as described above, rolling elements 11 can transmit a large motive power and exhibit excellent traction characteristics.

This application is based on Japanese Patent Applications No. 11-2512574 filed on Sep. 7, 1999, No. 2000-147364 filed on May 19, 2000, and No. 2000-258160 filed on Aug. 28, 2000, the entire contents of which, inclusive of the specification, claims and drawings, are hereby incorporated by reference herein.

Although the invention has been described above by reference to certain examples and embodiments of the invention, the invention is not limited to the examples and embodiments described above. Modifications and variations of the examples and embodiments described above will occur to those skilled in the art, in light of the above teachings. The scope of the invention is defined with reference to the following claims.

What is claimed is:

1. A rotary assembly for traction drives, comprising:
   a plurality of rolling elements having a rotation axis and traction contact surfaces around the rotation axis and associating with each other to transmit a motive power between the rolling elements via a traction oil film formed between the traction contact surfaces;
   at least one of said traction contact surfaces having a microstructure with irregularities which sizes are larger than a thickness of the traction oil film,
   wherein the microstructure is represented by an unfiltered primary profile curve including alternately arranged recesses and top-flat lands,
   wherein the unfiltered primary profile curve is measured using a surface roughness tester, each of said lands of the unfiltered primary profile curve including a portion located higher than a center line with respect to the unfiltered primary profile curve where the center line is drawn at an average height determined by integrating the unfiltered primary profile curve in the direction of length, said portion having either one shape selected from a generally trapezoidal shape, a generally trapezoidal shape with rounded corners, a generally trapezoidal shape with chamfered corners, a generally crowning shape, a generally elliptic arc shape, a generally sinusoidal shape and a generally triangular shape with a rounded apex,
   wherein a height difference between a top of each land and a bottom of each recess is within a range of 0.5–2.5 μm.

2. A rotary assembly as claimed in claim 1, wherein with respect to the center line separated into segments by crossing with the unfiltered primary profile curve, a ratio of a total length of the segments corresponding to the recesses to a reference length of the center line is 15–60%.

3. A rotary assembly as claimed in claim 2, wherein with respect to the center line separated into segments by crossing with the unfiltered primary profile curve, a ratio of a total length of the segments corresponding to the recesses to a reference length of the center line is 25–40%.

4. A rotary assembly as claimed in claim 3, wherein the ratio of a total length of the segments corresponding to the recesses to the reference length of the center line is 27–35%.

5. A rotary assembly as claimed in claim 2, wherein the ratio of a total length of the segments corresponding to the recesses to the reference length of the center line is 30–57%.

6. A rotary assembly as claimed in claim 1, wherein with respect to the center line separated into segments by crossing with the unfiltered primary profile curve, a pitch of the recesses is within a range of 10–150 μm.

7. A rotary assembly as claimed in claim 6, wherein a pitch of the recesses is within a range of 40–120 μm.

8. A rotary assembly as claimed in claim 1, wherein the top-flat land includes a top portion having a ten-point mean roughness (Rz) of 100 nm or less.

9. A rotary assembly as claimed in claim 8, wherein the top-flat land includes a top portion having a ten-point mean roughness (Rz) of 40 nm or less.

10. A rotary assembly as claimed in claim 1, wherein with respect to the center line separated into segments by crossing with the unfiltered primary profile curve, a length of each segment corresponding to each recess is within a range of 10–40 μm.

11. A rotary assembly as claimed in claim 1, wherein a ratio of a pitch of the recesses to a major axis diameter of a Hertzian contact ellipse made at a maximum load, which extends perpendicular to the rotating direction of the rolling element, is within a range of 1.2–9%.

12. A rotary assembly as claimed in claim 11, wherein the ratio of a pitch of the recesses to the major axis diameter of the Hertzian contact ellipse made at a maximum load is within a range of 2.4–6%.

13. A rotary assembly as claimed in claim 1, wherein with respect to the center line separated into segments by crossing with the unfiltered primary profile curve, a ratio of a length of each segment corresponding to each recess to a major axis diameter of a Hertzian contact ellipse made at a maximum load, which extends perpendicular to the rotating direction of the rolling element, is within a range of 0.6–2%.

14. A rotary assembly as claimed in claim 1, wherein with respect to the center line separated into segments by crossing with the unfiltered primary profile curve, a ratio of a length of each segment corresponding to each recess to a minor axis diameter of a Hertzian contact ellipse made at a maximum load, which extends parallel to the rotating direction of the rolling element, is within a range of 0.8–3.2%.

15. A rotary assembly as claimed in claim 1, wherein the recesses are grooves which are disposed substantially parallel to the rotating direction of the rolling element.

16. A rotary assembly as claimed in claim 1, wherein the recesses are grooves which spirally extend along the rotating direction of the rolling element.

17. A rotary assembly as claimed in claim 1, wherein the recesses extend longer than at least a minor axis diameter of a Hertzian contact ellipse.

18. A rotary assembly as claimed in claim 1, wherein a top portion of each top-flat land of the unfiltered primary profile curve measured by the surface roughness tester that is set at equal longitudinal and lateral magnifications, has a radius of curvature of 0.1–170 mm.

19. A rotary assembly as claimed in claim 18, wherein a top portion of each top-flat land of the unfiltered primary profile curve measured by the surface roughness tester that is set at equal longitudinal and lateral magnifications, has a radius of curvature of 0.8–170 mm.

20. A rotary assembly as claimed in claim 17, wherein a top portion of each top-flat land of the unfiltered primary profile curve measured by the surface roughness tester that is set at equal longitudinal and lateral magnifications, has a radius of curvature of 0.8–10 mm.

21. A rotary assembly as claimed in claim 1, wherein the rolling elements include a drive-side rolling element and a driven-side rolling element, the traction contact surface of one of the drive-side and driven-side rolling elements has the microstructure and the traction contact surface of the other of the drive-side and driven-side rolling elements has a surface roughness expressed by an arithmetical mean roughness (Ra) of 0.05 μm or less.

22. A rotary assembly as claimed in claim 11, wherein the rotary assembly is an element of a half-toroidal type continuously variable transmission, said rotary assembly including rotatably and coaxially arranged input and output disks having opposed and annular concaved traction contact surfaces and power rollers juxtaposed between the traction contact surfaces of the input and output disks and formed with annular convexed traction contact surfaces rotatable relative to the traction contact surfaces of the input and output disks, each of said power rollers having an axis of rotation inclinable relative to an axis of rotation of the input and output disks.

23. A rotary assembly as claimed in claim 1, wherein the recesses and the top-flat lands are simultaneously formed using a tool having cutting blades corresponding to the recesses and the top-flat lands, respectively, said cutting blades having a difference therebetween in a direction perpendicular to the center axis of the rolling element within a range of 0.5–2.5 μm.

24. A rotary assembly for traction drives, comprising:
a plurality of rolling elements having a rotation axis and traction contact surfaces around the rotation axis and associating with each other to transmit a motive power between the rolling elements via a traction oil film formed between the traction contact surfaces;
at least one of said traction contact surfaces having a microstructure with irregularities which sizes are larger than a thickness of the traction oil film,
wherein the microstructure is represented by an unfiltered primary profile curve including alternately arranged recesses and top-flat lands,
wherein the unfiltered primary profile curve is measured using a surface roughness tester, each of said lands of the unfiltered primary profile curve including a portion located higher than a center line with respect to the unfiltered primary profile curve, said portion having either one shape selected from a generally trapezoidal shape, a generally trapezoidal shape with rounded corners, a generally trapezoidal shape with chamfered corners, a generally crowning shape, a generally elliptic arc shape, a generally sinusoidal shape and a generally triangular shape with a rounded apex,
wherein a height difference between a top of each land and a bottom of each recess is within a range of 2.0–2.5 μm.

25. A rotary assembly as claimed in claim 24, wherein with respect to the center line separated into segments by crossing with the unfiltered primary profile curve, a ratio of a total length of the segments corresponding to the recesses to a reference length of the center line is 15–60%.

26. A rotary assembly as claimed in claim 25, wherein with respect to the center line separated into segments by crossing with the unfiltered primary profile curve, a ratio of a total length of the segments corresponding to the recesses to a reference length of the center line is 25–40%.

27. A rotary assembly as claimed in claim 26, wherein the ratio of a total length of the segments corresponding to the recesses to the reference length of the center line is 27–35%.

28. A rotary assembly as claimed in claim 25, wherein the ratio of a total length of the segments corresponding to the recesses to the reference length of the center line is 30–57%.

29. A rotary assembly as claimed in claim 24, wherein with respect to the center line separated into segments by crossing with the unfiltered primary profile curve, a pitch of the recesses is within a range of 10–150 μm.

30. A rotary assembly as claimed in claim 29, wherein a pitch of the recesses is within a range of 40–120 μm.

31. A rotary assembly as claimed in claim 24, wherein the top-flat land includes a top portion having a ten-point mean roughness (Rz) of 100 nm or less.

32. A rotary assembly as claimed in claim 31, wherein the top-flat land includes a top portion having a ten-point mean roughness (Rz) of 40 nm or less.

33. A rotary assembly as claimed in claim 24, wherein with respect to the center line separated into segments by crossing with the unfiltered primary profile curve, a length of each segment corresponding to each recess is within a range of 10–40 μm.

34. A rotary assembly as claimed in claim 24, wherein a ratio of a pitch of the recesses to a major axis diameter of a Hertzian contact ellipse made at a maximum load, which extends perpendicular to the rotating direction of the rolling element, is within a range of 1.2–9%.

35. A rotary assembly as claimed in claim 34, wherein the ratio of a pitch of the recesses to the major axis diameter of the Hertzian contact ellipse made at a maximum load is within a range of 2.4–6%.

36. A rotary assembly as claimed in claim 24, wherein with respect to the center line separated into segments by crossing with the unfiltered primary profile curve, a ratio of a length of each segment corresponding to each recess to a major axis diameter of a Hertzian contact ellipse made at a maximum load, which extends perpendicular to the rotating direction of the rolling element, is within a range of 0.6–2%.

37. A rotary assembly as claimed in claim 24, wherein with respect to the center line separated into segments by crossing with the unfiltered primary profile curve, a ratio of a length of each segment corresponding to each recess to a minor axis diameter of a Hertzian contact ellipse made at a maximum load, which extends parallel to the rotating direction of the rolling element, is within a range of 0.8–3.2%.

38. A rotary assembly as claimed in claim 24, wherein the recesses are grooves which are disposed substantially parallel to the rotating direction of the rolling element.

39. A rotary assembly as claimed in claim 24, wherein the recesses are grooves which spirally extend along the rotating direction of the rolling element.

40. A rotary assembly as claimed in claim 24, wherein the recesses extend longer than at least a minor axis diameter of a Hertzian contact ellipse.

41. A rotary assembly as claimed in claim 24, wherein a top portion of each top-flat land of the unfiltered primary profile curve measured by the surface roughness tester that is set at equal longitudinal and lateral magnifications, has a radius of curvature of 0.1–170 mm.

42. A rotary assembly as claimed in claim 41, wherein a top portion of each top-flat land of the unfiltered primary profile curve measured by the surface roughness tester that is set at equal longitudinal and lateral magnifications, has a radius of curvature of 0.8–170 mm.

43. A rotary assembly as claimed in claim 42, wherein a top portion of each top-flat land of the unfiltered primary profile curve measured by the surface roughness tester that is set at equal longitudinal and lateral magnifications, has a radius of curvature of 0.8–10 mm.

44. A rotary assembly as claimed in claim 24, wherein the rolling elements include a drive-side rolling element and a driven-side rolling element, the traction contact surface of one of the drive-side and driven-side rolling elements has the microstructure and the traction contact surface of the other of the drive-side and driven-side rolling elements has a surface roughness expressed by an arithmetical mean roughness (Ra) of 0.05 μm or less.

45. A rotary assembly as claimed in claim 24, wherein the rotary assembly is an element of a half-toroidal type continuously variable transmission, said rotary assembly including rotatably and coaxially arranged input and output disks having opposed and annular concaved traction contact surfaces and power rollers juxtaposed between the traction contact surfaces of the input and output disks and formed with annular convexed traction contact surfaces rotatable relative to the traction contact surfaces of the input and output disks, each of said power rollers having an axis of rotation inclinable relative to an axis of rotation of the input and output disks.

46. A rotary assembly as claimed in claim 24, wherein the recesses and the top-flat lands are simultaneously formed using a tool having cutting blades corresponding to the!recesses and the top-flat lands, respectively, said cutting blades having a difference therebetween in a direction perpendicular to the center axis of the rolling element within a range of 0.5–2.5 μm.

47. A rotary assembly for traction drives, comprising:
a plurality of rolling elements having a rotation axis and traction contact surfaces around the rotation axis and associating with each other to transmit a motive power between the rolling elements via a traction oil film formed between the traction contact surfaces;
at least one of said traction contact surfaces having a microstructure with irregularities which sizes are larger than a thickness of the traction oil film,
wherein the microstructure is represented by an unfiltered primary profile curve including alternately arranged recesses and top-flat lands,
wherein the unfiltered primary profile curve is measured using a surface roughness tester, each of said lands of the unfiltered primary profile curve including a portion located higher than a center line with respect to the unfiltered primary profile curve, said portion having either one shape selected from a generally trapezoidal shape, a generally trapezoidal shape with rounded corners, a generally trapezoidal shape with chamfered corners, a generally crowning shape, a generally elliptic arc shape, a generally sinusoidal shape and a generally triangular shape with a rounded apex,
wherein a height difference between a top of each land and a bottom of each recess is within a range of 0.8–1.2 μm.

48. A rotary assembly as claimed in claim 47, wherein with respect to the center line separated
into segments by crossing with the unfiltered primary profile curve, a ratio of a total length of the segments corresponding to the recesses to a reference length of the center line is 15–60%.

49. A rotary assembly as claimed in claim 48, wherein with respect to the center line separated
into segments by crossing with the unfiltered primary profile curve, a ratio of a total length of the segments corresponding to the recesses to a reference length of the center line is 25–40%.

50. A rotary assembly as claimed in claim 49, wherein the ratio of a total length of the segments corresponding to the recesses to the reference length of the center line is 27–35%.

51. A rotary assembly as claimed in claim 48, wherein the ratio of a total length of the segments corresponding to the recesses to the reference length of the center line is 30–57%.

52. A rotary assembly as claimed in claim 47, wherein with respect to the center line separated into segments by crossing with the unfiltered primary profile curve, a pitch of the recesses is within a range of 10–150 μm.

53. A rotary assembly as claimed in claim 52, wherein a pitch of the recesses is within a range of 40–120 μm.

54. A rotary assembly as claimed in claim 47, wherein the top-flat land includes a top portion having a ten-point mean roughness (Rz) of 100 nm or less.

55. A rotary assembly as claimed in claim 54, wherein the top-flat land includes a top portion having a ten-point mean roughness (Rz) of 40 nm or less.

56. A rotary assembly as claimed in claim 47, wherein with respect to the center line separated into segments by crossing with the unfiltered primary profile curve, a length of each segment corresponding to each recess is within a range of 10–40 μm.

57. A rotary assembly as claimed in claim 47, wherein a ratio of a pitch of the recesses to a major axis diameter of a Hertzian contact ellipse made at a maximum load, which extends perpendicular to the rotating direction of the rolling element, is within a range of 1.2–9%.

58. A rotary assembly as claimed in claim 51, wherein the ratio of a pitch of the recesses to the major axis diameter of the Hertzian contact ellipse made at a maximum load is within a range of 2.4–6%.

59. A rotary assembly as claimed in claim 47, wherein with respect to the center line separated into segments by crossing with the unfiltered primary profile curve, a ratio of a length of each segment corresponding to each recess to a major axis diameter of a Hertzian contact ellipse made at a maximum load, which extends perpendicular to the rotating direction of the rolling element, is within a range of 0.6–2%.

60. A rotary assembly as claimed in claim 47, wherein with respect to the center line separated into segments by crossing with the unfiltered primary profile curve, a ratio of a length of each segment corresponding to each recess to a minor axis diameter of a Hertzian contact ellipse made at a maximum load, which extends parallel to the rotating direction of the rolling element, is within a range of 0.8–3.2%.

61. A rotary assembly as claimed in claim 47, wherein the recesses are grooves which are disposed substantially parallel to the rotating direction of the rolling element.

62. A rotary assembly as claimed in claim 47, wherein the recesses are grooves which spirally extend along the rotating direction of the rolling element.

63. A rotary assembly as claimed in claim 47, wherein the recesses extend longer than at least a minor axis diameter of a Hertzian contact ellipse.

64. A rotary assembly as claimed in claim 47, wherein a top portion of each top-flat land of the unfiltered primary profile curve measured by the surface roughness tester that is set at equal longitudinal and lateral magnifications, has a radius of curvature of 0.1–170 mm.

65. A rotary assembly as claimed in claim 64, wherein a top portion of each top-flat land of the unfiltered primary profile curve measured by the surface roughness tester that is set at equal longitudinal and lateral magnifications, has a radius of curvature of 0.8–170 mm.

66. A rotary assembly as claimed in claim 65, wherein a top portion of each top-flat land of the unfiltered primary profile curve measured by the surface roughness tester that is set at equal longitudinal and lateral magnifications, has a radius of curvature of 0.8–10 mm.

67. A rotary assembly as claimed in claim 47, wherein the rolling elements include a drive-side rolling element and a driven-side rolling element, the traction contact surface of one of the drive-side and driven-side rolling elements has the microstructure and the traction contact surface of the other of the drive-side and driven-side rolling elements has a surface roughness expressed by an arithmetical mean roughness (Ra) of 0.05 μm or less.

68. A rotary assembly as claimed in claim 47, wherein the rotary assembly is an element of a half-toroidal type continuously variable transmission, said rotary assembly including rotatably and coaxially arranged input and output disks having opposed and annular concaved traction contact surfaces and power rollers juxtaposed between the traction contact surfaces of the input and output disks and formed with annular convexed traction contact surfaces rotatable relative to the traction contact surfaces of the input and output disks, each of said power rollers having an axis of rotation inclinable relative to an axis of rotation of the input and output disks.

69. A rotary assembly as claimed in claim 47, wherein the recesses and the top-flat lands are simultaneously formed using a tool having cutting blades corresponding to the recesses and the top-flat lands, respectively, said cutting blades having a difference therebetween in a direction perpendicular to the center axis of the rolling element within a range of 0.5–2.5 μm.

\* \* \* \* \*

UNITED STATES PATENT AND TRADEMARK OFFICE
CERTIFICATE OF CORRECTION

PATENT NO.     : 6,629,906 B1
DATED          : October 7, 2003
INVENTOR(S)    : Chiba et al.

It is certified that error appears in the above-identified patent and that said Letters Patent is hereby corrected as shown below:

Title page,
Item [*] Notice, should read, -- Subject to any disclaimer, the term of this patent is extended or adjusted under 35 U.S.C. 154(b) by 111 days. --

Signed and Sealed this

Twelfth Day of April, 2005

JON W. DUDAS
*Director of the United States Patent and Trademark Office*